US007640108B2

United States Patent
Shimizu et al.

(10) Patent No.: US 7,640,108 B2
(45) Date of Patent: Dec. 29, 2009

(54) VEHICLE DRIVE ASSIST SYSTEM

(75) Inventors: Toshihiro Shimizu, Kobe (JP);
Kazuhiro Sakiyama, Kobe (JP);
Kazuya Sako, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 11/504,013

(22) Filed: Aug. 15, 2006

(65) Prior Publication Data
US 2006/0287826 A1 Dec. 21, 2006

Related U.S. Application Data

(62) Division of application No. 09/598,270, filed on Jun. 21, 2000, now Pat. No. 7,366,595.

(30) Foreign Application Priority Data

| Jun. 25, 1999 | (JP) | ................... 11-179718 |
| Jun. 29, 1999 | (JP) | ................... 11-183446 |
| Jun. 29, 1999 | (JP) | ................... 11-183447 |
| Jun. 29, 1999 | (JP) | ................... 11-183448 |
| Jun. 29, 1999 | (JP) | ................... 11-183449 |

(51) Int. Cl.
*B60R 21/0132* (2006.01)
*B60R 21/0134* (2006.01)
*G01S 17/66* (2006.01)
*G01S 17/87* (2006.01)
*G05D 1/02* (2006.01)

(52) U.S. Cl. .................. 701/301; 701/211; 340/436; 340/438; 180/204

(58) Field of Classification Search ................. 340/937, 340/932.2; 701/301, 207, 211, 216, 223; 180/204
See application file for complete search history.

(56) References Cited

U.S. PATENT DOCUMENTS

| 3,073,407 | A | * | 1/1963 | Yates et al. .................. 180/204 |
| 3,117,642 | A | * | 1/1964 | Larinoff ...................... 180/204 |
| 3,240,287 | A | * | 3/1966 | Lepore et al. ............... 180/202 |
| 4,566,032 | A | * | 1/1986 | Hirooka et al. ............. 348/119 |
| 4,735,274 | A | * | 4/1988 | Good et al. .................. 180/204 |
| 4,908,611 | A | * | 3/1990 | Iino .............................. 345/7 |
| 4,931,930 | A | * | 6/1990 | Shyu et al. .................... 701/36 |

(Continued)

FOREIGN PATENT DOCUMENTS

DE 31 21 684 A1 12/1982

(Continued)

*Primary Examiner*—Eric Bolda
*Assistant Examiner*—Ari M Diacou
(74) *Attorney, Agent, or Firm*—Oliff & Berridge, PLC

(57) ABSTRACT

A vehicle drive assist system comprises a camera for picking up an image of an area existing in an advancing direction of a vehicle; display means for displaying the image picked up by the camera; steering angle detecting means for detecting a steering angle for steering the vehicle; traveling path predicting means for predicting a traveling path of the vehicle on the basis of the steering angle detected by the steering angle detecting means; and drive assist means for overlaying on the display means drive assist information containing the vehicle predictive traveling path predicted by the traveling path predicting means and guide lines prolonged from the lines defining the width of the vehicle body on the image of the area existing in the vehicle advancing direction.

2 Claims, 45 Drawing Sheets

U.S. PATENT DOCUMENTS

| | | | |
|---|---|---|---|
| 5,101,351 A * | 3/1992 | Hattori ........................ 701/27 |
| 5,122,957 A * | 6/1992 | Hattori ........................ 701/27 |
| 5,155,426 A * | 10/1992 | Kurami ....................... 318/587 |
| 5,163,002 A * | 11/1992 | Kurami ....................... 701/28 |
| 5,172,315 A * | 12/1992 | Asanuma et al. ............. 701/28 |
| 5,172,317 A * | 12/1992 | Asanuma et al. ............. 701/28 |
| 5,227,785 A * | 7/1993 | Gann et al. ................ 340/932.2 |
| 5,233,527 A * | 8/1993 | Shinnosuke ................. 701/28 |
| 5,243,524 A * | 9/1993 | Ishida et al. .................. 701/28 |
| 5,245,422 A * | 9/1993 | Borcherts et al. ........... 348/119 |
| 5,289,321 A * | 2/1994 | Secor ......................... 359/896 |
| 5,297,650 A * | 3/1994 | Gandiglio et al. ........... 180/204 |
| 5,406,395 A * | 4/1995 | Wilson et al. ................ 359/15 |
| 5,414,461 A * | 5/1995 | Kishi et al. ................. 348/115 |
| 5,414,624 A * | 5/1995 | Anthonyson .................... 701/1 |
| 5,445,021 A | 8/1995 | Cattoen et al. |
| 5,485,378 A * | 1/1996 | Franke et al. ................. 701/41 |
| 5,530,330 A * | 6/1996 | Baiden et al. ............... 318/580 |
| 5,530,771 A | 6/1996 | Maekawa |
| 5,561,883 A * | 10/1996 | Landry et al. ................. 15/302 |
| 5,589,901 A * | 12/1996 | Means ......................... 396/12 |
| 5,602,542 A * | 2/1997 | Widmann .................... 340/903 |
| 5,646,614 A | 7/1997 | Abersfelder et al. |
| 5,737,710 A * | 4/1998 | Anthonyson .................... 701/1 |
| 5,742,141 A * | 4/1998 | Czekaj ........................ 318/587 |
| 5,764,015 A * | 6/1998 | Shimizu et al. ............. 318/587 |
| 5,841,368 A * | 11/1998 | Bryant ...................... 340/932.2 |
| 5,854,987 A | 12/1998 | Sekine et al. |
| 5,864,125 A * | 1/1999 | Szabo ......................... 235/384 |
| 5,864,285 A | 1/1999 | Wieder et al. |
| 5,892,855 A * | 4/1999 | Kakinami et al. ........... 382/291 |
| 5,910,817 A * | 6/1999 | Ohashi et al. ................ 348/159 |
| 5,913,375 A * | 6/1999 | Nishikawa .................. 180/168 |
| 5,945,799 A * | 8/1999 | Shimizu ....................... 318/587 |
| 5,949,331 A * | 9/1999 | Schofield et al. ............. 340/461 |
| 5,969,969 A * | 10/1999 | Ejiri et al. ..................... 701/41 |
| 6,009,377 A * | 12/1999 | Hiwatashi .................... 701/301 |
| 6,018,692 A * | 1/2000 | Shimizu et al. ............... 701/41 |
| 6,032,098 A * | 2/2000 | Takahashi et al. ........... 701/210 |
| 6,049,288 A * | 4/2000 | Kawasaki ................ 340/815.4 |
| 6,061,002 A * | 5/2000 | Weber et al. ............. 340/932.2 |
| 6,085,131 A * | 7/2000 | Kim .............................. 701/28 |
| 6,134,491 A * | 10/2000 | Kawagoe et al. .............. 701/43 |
| 6,138,062 A * | 10/2000 | Usami .......................... 701/23 |
| 6,170,591 B1 * | 1/2001 | Sakai et al. .................. 180/204 |
| 6,178,365 B1 * | 1/2001 | Kawagoe et al. .............. 701/41 |
| 6,222,447 B1 * | 4/2001 | Schofield et al. ............. 340/461 |
| 6,223,847 B1 * | 5/2001 | Shimizu et al. ............. 180/204 |
| 6,226,570 B1 * | 5/2001 | Hahn ............................ 701/1 |
| 6,226,592 B1 * | 5/2001 | Luckscheiter et al. ....... 701/301 |
| 6,243,645 B1 * | 6/2001 | Moteki et al. ............... 701/211 |
| 6,263,270 B1 * | 7/2001 | Sato et al. ..................... 701/41 |
| 6,265,968 B1 * | 7/2001 | Betzitza et al. .............. 340/436 |
| 6,275,754 B1 * | 8/2001 | Shimizu et al. ............... 701/41 |
| 6,285,317 B1 * | 9/2001 | Ong ....................... 342/357.13 |
| 6,285,393 B1 * | 9/2001 | Shimoura et al. ........... 348/119 |
| 6,285,778 B1 * | 9/2001 | Nakajima et al. ........... 382/104 |
| 6,411,867 B1 * | 6/2002 | Sakiyama et al. ............... 701/1 |
| 6,421,081 B1 * | 7/2002 | Markus ....................... 348/148 |
| 6,567,726 B2 * | 5/2003 | Sakiyama et al. ............... 701/1 |
| 6,577,334 B1 * | 6/2003 | Kawai et al. ................ 348/148 |
| 2001/0017591 A1 * | 8/2001 | Kuriya et al. ............. 340/932.2 |
| 2002/0005779 A1 * | 1/2002 | Ishii et al. .................... 340/436 |
| 2003/0080877 A1 * | 5/2003 | Takagi et al. .............. 340/932.2 |
| 2003/0146831 A1 * | 8/2003 | Berberich et al. ........... 340/461 |

FOREIGN PATENT DOCUMENTS

| | | |
|---|---|---|
| DE | 197 41 896 A1 | 4/1999 |
| EP | 354562 A2 * | 2/1990 |
| EP | 409642 A2 * | 1/1991 |
| EP | 0 835 796 A2 | 4/1998 |
| EP | 0 841 648 A2 | 5/1998 |
| EP | 0 846 593 A2 | 6/1998 |
| EP | 0 900 712 A2 | 3/1999 |
| EP | 0 949 818 A2 | 10/1999 |
| EP | 1 022 903 | 7/2000 |
| GB | 2 268 608 A | 1/1994 |
| GB | 2 320 326 A | 6/1998 |
| JP | 57-150044 | 9/1982 |
| JP | 59120877 A * | 7/1984 |
| JP | 64-4700 | 1/1989 |
| JP | A-64-14700 | 1/1989 |
| JP | A 1-168538 | 7/1989 |
| JP | 01251209 A * | 10/1989 |
| JP | 01300311 A * | 12/1989 |
| JP | 02308313 A * | 12/1990 |
| JP | 03191403 A * | 8/1991 |
| JP | 04012142 A * | 1/1992 |
| JP | 04373004 A * | 12/1992 |
| JP | 5-14389 | 1/1993 |
| JP | 5-143894 | 6/1993 |
| JP | 6-239400 | 8/1994 |
| JP | 6-255423 | 9/1994 |
| JP | 7-19219 | 1/1995 |
| JP | 7-44799 | 2/1995 |
| JP | A 9-71176 | 3/1997 |
| JP | A-10-151991 | 6/1998 |
| JP | 10-257482 | 9/1998 |
| JP | 10-283592 | 10/1998 |
| WO | WO 96/38319 | 12/1996 |

\* cited by examiner

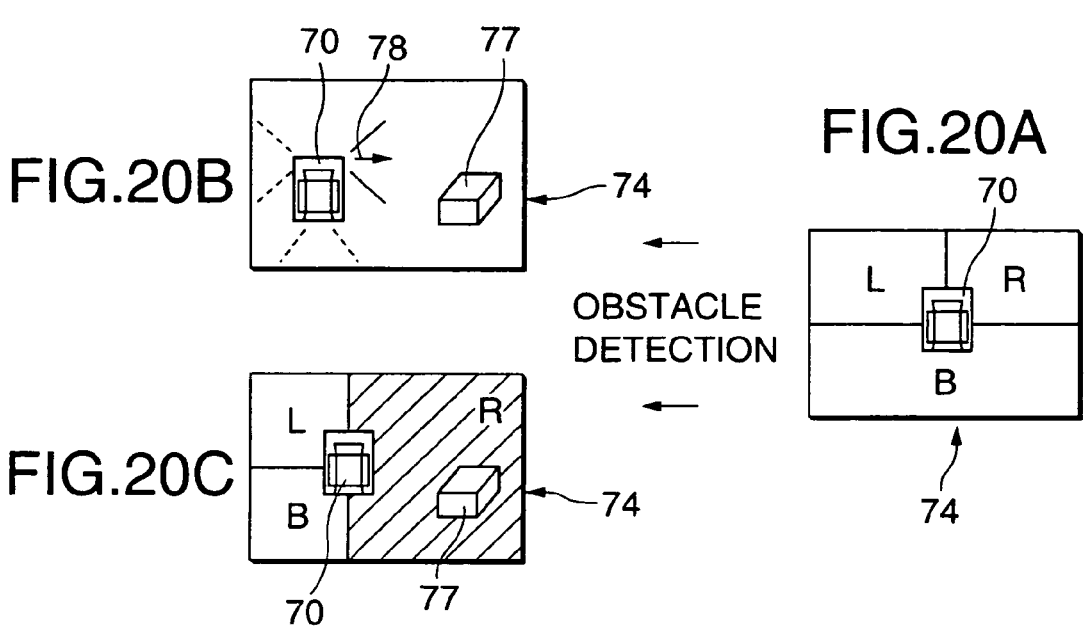
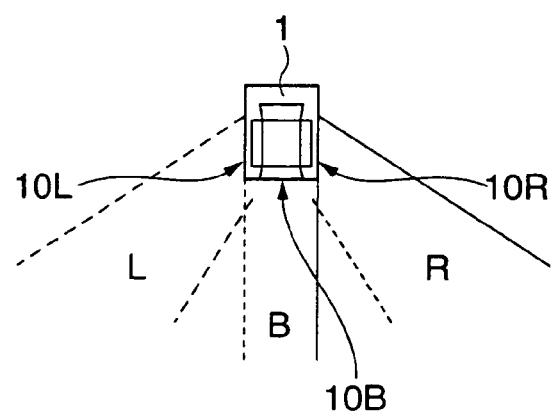
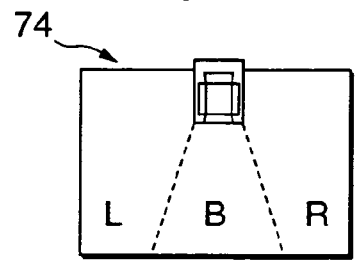
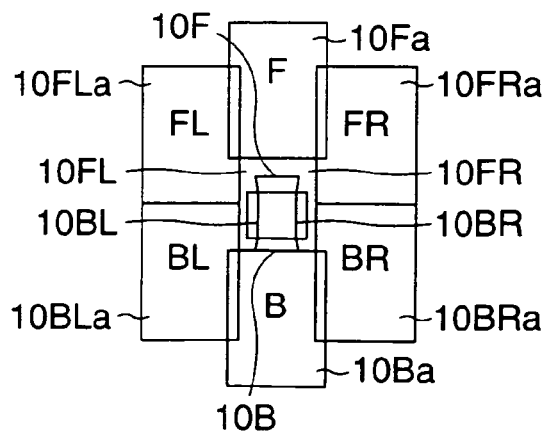
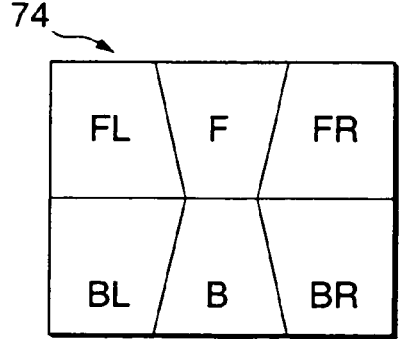

VEHICLE DRIVE ASSIST SYSTEM

This is a Division of application Ser. No. 09/598,270 filed Jun. 21, 2000. The disclosure of the prior application is hereby incorporated by reference herein in its entirety.

BACKGROUND OF THE INVENTION

1. Field of the Invention

The present invention relates to a vehicle parking assist device for assisting a driver in his driving by use of an image obtained by taking a scene of an area around a vehicle.

2. Description of the Related Art

To drive a vehicle, e.g., automobile, in safety, the driver needs to look traffic conditions around the vehicle attentively. The driver constantly watches the environment of the vehicle and makes efforts to grasp environmental conditions of the vehicle, while driving the vehicle. When the grasping effort depends on only the sense, there is a limit in perfectly grasping the environmental conditions. The human visual sensation is very important in grasping the environmental conditions. However, it is effective only in a direction in which the driver looks. The driver must drive the vehicle under the condition that areas that are shaded by the vehicle and from driver's view, i.e., the dead spaces, inevitably exist.

Major dead spaces as viewed from the driver are areas near the wheels and just before and after the vehicle body. In the dead spaces near the wheels, the driver cannot check the orientations of the wheels per se whose running directions change in accordance with a turn of a steering wheel. The steering wheel may be turned by plural turns in one direction. Accordingly, if the steering wheel is apparently at a neutral position, it is unknown whether or not the wheels are oriented for a straight drive. Further, visibility is limited in the backward area of the vehicle, so that the driver takes much care when he backs the vehicle into a narrow space.

Particularly, the parking technique is one of the most difficult driving techniques when a normal driver drives a vehicle. In parking the vehicle, the driver must steer the vehicle so that the vehicle moves into a narrow parking space without touching of his car with another vehicle or an obstructive object or without being mired in a ditch. The obstructive object and the other vehicle which the vehicle driven by the driver may touch usually exist in an area existing within a dead angle when viewed from the driver. Accordingly, the driver must steer the vehicle while exactly grasping relative positional relationship of the vehicle body to other objects.

In the technique to park the vehicle, particularly, particular the technique to park the vehicle in a parking space between the adjacent vehicles of those being parked in a row in a back-to-front fashion (this parking will be referred to as a "series parking") is one of the most difficult driving techniques when a normal driver drives the vehicle. In the series parking, the driver must back the vehicle into a narrow parking space and reversely turns the steering wheel. Further, since the driver backs the vehicle, a parking space in which the vehicle is to be parked is the dead space when viewed from the driver and the driver insufficiently knows the environment around the parking space. In this state, the driver must parks the vehicle in the parking space A drive assist technique in which when the vehicle is moved backward, it is disclosed in JP-A-1-14700 that an image of the backward or sideward area of the vehicle and a predictive traveling path curve are displayed. In the background technique, a predictive traveling path of the vehicle, which is predicted depending on a steering angle in the vehicle, is laid over an image of the backward area of the vehicle. Therefore, the driver can check both the steering angle of the steering wheel and safety in the driving in the backward area. According to the drive assistance of JP-A-1-14700, a steering angle of a steering wheel is detected by a steering sensor, a predictive traveling path corresponding to a steering angle of the steering wheel when the vehicle backs is overlaid on the image picked up by the camera, and frames are depicted in a state that those are equidistantly arrayed along the predictive traveling path or a simplified vehicle is depicted, whereby the driver easily understands in sense the predictive traveling path.

A drive assist technique which detects a length of a parking space by various sensors, and assists the driver in his parking by use of the detection result, is disclosed in JP-A-7-44799. According to JP-A-7-44799, when the vehicle passes the side of a series parking space, the vehicle parking assist device measures the parking space, and calculates an amount of steering operation, a time of depressing the accelerator or a time of depressing a brake pedal by using the parking space information measured and vehicle information, and guides the driver for the series parking.

A drive assist technique for assisting the driver in his driving by use of an image produced by picking up a scene around the vehicle is disclosed in JP-A-10-283592, JP-A-10-257482, JP-A-6-255423, JP-A-239400, JP-A-5-143894, JP-A-7-192199, and JP-A-57-150044U.

According to JP-A-10-283592, based on three dimensional analysis of an image picked up by a camera, it is judges whether or not the self vehicle touches an obstructive object, and the driver is informed of the judgement result while at the same time displays a relation between the self vehicle and the obstructive object.

JP-A-10-257482 discloses the drive assist technique which seamlessly composes an image of the backward area of the vehicle, an image of the left side of the vehicle, and an image of the right side of the same, and displays the composed image.

JP-A-6-255423 discloses a drive assist technique which displays an image picked up by a camera together with a distance scale for the drive assist.

JP-A-4-23940 discloses a drive assist technique in which a camera, which maybe horizontally turned over a range of 360°, is attached to the ceiling of the vehicle with the aid of a turntable, a scene in areas existing in desired directions around the vehicle are picked up by the camera, and the images thus picked up are converted and composed for ease of watching by the driver, and the resultant image is used for drive assist.

JP-A-5-14389 discloses a drive assist technique in which scenes of the areas in the front left, front and front right of the vehicle are picked up by three cameras, and varies the segmental display areas or windows of the screen on which the images from the three cameras are displayed, thereby effecting the drive assist.

JP-A-7-19219 discloses a drive assist technique in which when the vehicle passes though a narrow road, an obstructive object is detected from an image produced by picking up a scene of the frontward area, and a gap between it and the obstructive object, thereby effecting the drive assist.

JP-A-57-150044U discloses a drive assist technique in which when an abnormality occurs, the contents of a display by a display device is changed from the display contents for a normal mode to the display contents for a normal mode, thereby effecting the drive assist.

However, as in the drive assist technique of JP-A-7-44799, a length of the parking space is estimated on the basis of a detected distance, and the drive assist is carried out for a garage parking and a series parking. In this technique, an image of the dead space for the driver is not displayed for the drive assist. Therefore, the technique fails to completely remove an anxiety of the driver.

In the background art of the JP-A-64-4700, a three-dimensional display along a predictive traveling path is used for enhancing the illusion of depth of a predictive traveling path image. The technique to merely display 3-dimensional images equidistantly arrayed along the traveling path predicted on the basis of a steering angle or move them along the traveling path is almost ineffective in checking a possibility that the vehicle will touch an obstructive object located near the predictive traveling path, because the driver must judge whether or not a steering angle of the steering wheel is proper.

Moreover, the information display device for displaying the images, usually installed to the vehicle, must be mounted in a narrow space near the driver seat. Therefore, the screen of the information display device is not large. For this reason, when the driver watches the display containing the backward area and the predictive traveling path curve, and judges if the predictive traveling path is proper, it is difficult for the driver to exactly judge if the predictive traveling path is proper.

Where the technique, as disclosed in JP-A-7-44799, to merely make an exact measurement of the parking space is used, it enables the drive to check if the parking space is sufficiently large, but it can unsatisfactorily assist the driver in the driving operation, which is necessary for the advancing of the vehicle to the parking space. The publication of JP-A-7-44799 describes in detail the measurement of the parking space, and refers to only the instructions of the driving operations for parking that is given to the driver. However, specific instructions are unclear in the description of the publication.

The parking assist technique, as disclosed in JP-A-10-283592, which merely judges if the self vehicle touches the obstructive object from the three-dimensional analysis of the image, fails to effect such a parking assist as guide the vehicle to a predetermined parking space.

On summarizing the above, in the drive assist technique in which the image picked up by the camera is used for the drive assist, an image of the dead space for the driver is used for watching the dead space. Therefore, the driver may check the environment conditions around the vehicle by watching the image, and the driver may take a feeling of security. However, those related techniques do not always provide proper drive guide information having a simple construction.

SUMMARY OF THE INVENTION

Accordingly, an object of the present invention to provide a vehicle parking assist device which assists the driver in his driving, using a simple image display or simple voice system.

According to the present invention, there is provided a vehicle drive assist system comprising;

a camera for picking up an image of an area existing in the advancing direction of a vehicle;

display means for displaying an image picked up by the camera;

steering angle detecting means for detecting a steering angle for steering a vehicle;

traveling path predicting means for predicting a traveling path of a vehicle on the basis of a steering angle detected by the steering angle detecting means; and drive assist means for overlaying drive assist information containing a vehicle predictive traveling path predicted by the traveling path predicting means and guide lines prolonged from the lines defining the width of the vehicle body on the image of the area existing in the vehicle advancing direction, which is displayed by the display means.

In the invention, a vehicle predictive traveling path predicted on the basis of a steering angle of the vehicle and guide lines prolonged from the lines defining the width of the vehicle body are overlaid on the image of the area existing in the vehicle advancing direction, which is displayed by the display means, for example. Therefore, the vehicle parking assist device appropriately compensates for the lack of the visual sensation in the vehicle drive.

In the vehicle drive assist device, the drive assist means selects a display of the predictive traveling path and/or guide lines.

The invention selects a display of the predictive traveling path and/or guide lines. Therefore, the image from the camera and the predictive traveling path curve or one of the guide lines, or that image, the predictive traveling path curve and the guide lines are displayed, thereby performing a proper drive assist.

In the vehicle parking assist device, the drive assist means varies a brightness of a display of the predictive traveling path and/or guide lines in accordance with a brightness of the environment.

In the invention, a brightness of a display of the predictive traveling path and/or guide lines may be varied in accordance with a brightness of the environment.

In the vehicle drive assist device, the drive assist means varies a color arrangement of a display of the predictive traveling path and/or guide lines in accordance with a color arrangement of the environment.

In the invention, a color arrangement of a display of the predictive traveling path is varied in accordance with a color arrangement of the environment. Therefore, an easy-to-understand guide display is presented to the driver, whereby a proper drive assist is performed.

In the vehicle drive assist device, the vehicle includes a brightness sensor for sensing a brightness of the environment to select an illumination system, and the drive assist means varies a brightness or a color arrangement of a display of the predictive traveling path and/or guide lines in accordance with a brightness sensed by the brightness sensor.

In the invention, a brightness sensor attached to the vehicle senses a brightness of the environment, and a brightness or a color arrangement of a display of the predictive traveling path and/or guide lines is varied in accordance with a color arrangement of the environment. Therefore, a display which is easy for the driver to understand is automatically performed.

In the vehicle drive assist device, the drive assist means varies a color arrangement of a display of the predictive traveling path and/or guide lines in accordance with a background color of an image picked up by the camera.

In the invention, a color arrangement of a display of the predictive traveling path and/or guide lines is varied in accordance with a background color of an image picked up by the camera. With this feature, when the background color is bright, the predictive traveling path curve and the guide lines may be displayed using a dark color. When the background color is dark, the latter displayed may be bright in color. Therefore, an easy-to-understand drive assist may be presented to the driver.

In the vehicle drive assist device, said drive assist means includes parking drive judging means for judging whether or not the drive of the vehicle is a parking drive, parking end judging means arranged such that when said parking drive judging means judges that the vehicle drive is a parking drive, said parking end judging means judges whether or not the parking drive ends, storing means arranged such that when said parking end judging means judges that the parking drive ends, said storing means stores a select condition for displaying said predictive traveling path and/or guide lines, and select means arranged such that when said parking drive judging means judges that the vehicle drive is a parking drive, said select means selects a display condition of said drive assist information in accordance with the contents of said storing means.

In the invention, the final display condition at the end of the parking assist is stored, and when the next parking drive is performed, the display condition is changed to the stored one. Therefore, there is eliminated the work by the driver to change the display condition to another. The parking assist is carried out with a display which is easy for the driver to understand.

In the vehicle drive assist device, said camera picks up an image by a wide angle field, and said drive assist displays said guide lines curved in accordance with a distortion of a wide angle image picked up by said camera.

In the invention, said guide lines, when displayed, are curved in accordance with a distortion of a wide angle image picked up by said camera. Therefore, the guide lines exactly correspond to the lines respectively prolonged from the lines defining the width of the vehicle body.

In the vehicle drive assist device, the drive assist means displays the predictive traveling path and/or guide lines except the portions thereof near the vehicle.

In the invention, in displaying the predictive traveling path curve and the guide lines, the vehicle body is present on this side of them in the region near the vehicle. Therefore, the width is not coincident with the back width of the vehicle apparently. In the invention, the non-coincident portion is not displayed, and the driving for this portion depends on the driver's judgement, whereby an unnatural display is avoided.

In the vehicle drive assist device, the drive assist means displays the predictive traveling path and/or guide lines such that the portions thereof near the vehicle are broadened.

In the invention, portions of the predictive traveling path and/or guide lines, which are near the vehicle, are broadened. Therefore, a safety is secured.

In the vehicle drive assist device, the drive assist means displays a line indicative of a stop position of the vehicle at a position on the predictive traveling path and/or guide lines a line indicative of a stop position of the vehicle, which is located near the vehicle.

In the invention, a line indicative of a stop position of the vehicle is displayed at a position on the predictive traveling path or the guide lines, which is located near the vehicle. Therefore, an easy parking drive assist is secured in a manner that when the moving vehicle frame reaches the stop line, the vehicle is stopped.

In the vehicle drive assist device, the drive assist displays the guide lines when braking is effected.

In the invention, when the driver operates the brake, the guide lines are displayed. Therefore, when the operator operates the brake and checks if the predictive traveling path is parallel to the guide lines, and when the traveling path is parallel to the guide lines, the steering wheel is at the center position.

In the vehicle drive assist device, the drive assist displays the guide lines in the form of dotted lines.

In the invention, the guide lines are displayed by dotted lines. Therefore, the guide lines may be made unnoticeable. When the predictive traveling path is additionally displayed, the predictive traveling path is intensified in brightness on display. Accordingly, the drive guide with a marked display of the predictive traveling path is presented to the driver.

The vehicle drive assist device further comprises an obstacle sensor for detecting presence or absence of an obstructive object on a vehicle traveling path, and wherein the drive assist varies a length of the guide lines in accordance with a distance ranging to an obstructive object detected by the obstacle sensor.

In the invention, a length of the guide lines is varied in accordance with a distance ranging to an obstructive object detected by the obstacle sensor, such as a back sonar. Therefore, the display gives the driver a drive feeling resembling an actual driving feeling. A driver assist which is easy for the driver to understand is provided.

In the vehicle drive assist device, the drive assist means displays the guide lines in a state that the width of the guide lines, when displayed, is wider than the width of the vehicle.

In the invention, the width of the guide lines displayed is wider than the width of the vehicle. Therefore, the drive assist is carried out with an easy-to-handle operation. For example, when one of the guide lines lies on one side of the parking frame, the driver returns the steering wheel to the center position.

According to the present invention, there is provided a vehicle drive assist system comprising;

a camera for picking up an image of an area existing in the advancing direction of a vehicle;

display means for displaying an image picked up by the camera;

reverse gear mode detecting means for detecting as to whether or not a transmission of the vehicle is set to a reverse gear mode; and drive assist means arranged such that when the reverse gear mode detecting means judges that the transmission is set to the reverse gear mode, the drive assist means changes a display by the display means and informs the driver that the transmission is in a reverse gear mode, thereby effecting the drive assist.

When the transmission is set to the reverse gear mode, a display by the display means changes. The driver is informed of the transmission being in a reverse gear mode. Therefore, an accident which will occur when a gear position of the transmission has slipped from the driver's memory can be prevented.

According to the present invention, there is provided a vehicle drive assist system comprising;

a camera for picking up an image of an area existing in the advancing direction of a vehicle;

display means for displaying an image picked up by the camera;

an obstacle sensor for detecting presence or absence of an obstructive object in a backward area of the vehicle;

drive assist means arranged such that when an obstructive object is detected by the obstacle sensor, the drive assist means informs the driver of presence of an obstructive object by changing a display by the display means.

In the invention, when an obstructive object is detected by the obstacle sensor such as a back sonar or corner sensors, a display by the display means is changed to inform the driver of the presence of the obstructive object. The display calls the driver's attention to the obstructive object, thereby preventing the vehicle from touching the obstructive object.

In the vehicle drive assist device, the drive assist means displays information in the form of character telop for the drive assist.

In the invention, the drive assist information is displayed in the form of character telop. Therefore, driver's attention is reliably called to avoid a dangerous accident.

In the vehicle drive assist device, the drive assist means displays information in the form of a color change of the entire display.

Thus, driver's attention is attracted by a color change of the entire display.

According to the present invention, there is provided a vehicle drive assist system comprising;

a camera for picking up an image of an area existing in the advancing direction of a vehicle;

display means for displaying an image picked up by the camera;

drive assist means arranged such that the drive assist means detects a drive condition and judges whether or not the drive mode is a parking drive mode, and when the drive mode is a parking drive mode, the drive assist means causes said display means to display an image display of the display means and an image display for parking drive assist; and safety check means for displaying a telop to urge the driver to make a safety check on the image for the parking drive assist by the drive assist means.

In the invention, when the drive mode is a parking drive mode, the image for the parking assist and a telop for urging the driver to make a safety check by the eye are displayed. Therefore, it is prevented that the driver is riveted to the display by the display means.

According to the present invention, there is provided a vehicle parking assist device comprising:

a camera for picking up an image of a backward area of a vehicle;

display means for displaying an image picked up by the camera;

obstacle sensor for detecting presence or absence of an obstacle in the backward area of the vehicle;

drive assist means arranged such that the drive assist detects a drive condition and checks if the vehicle backs for parking, and when the vehicle backs, the drive assist means displays drive assist information for parking; and safety check means arranged such that the safety check means checks the parking drive ends on the basis of the result of the obstacle detection by the obstacle sensor, and when the parking drive ends, the safety check means causes the display means to display the end of the parking drive.

In the invention, the safety check means checks the parking drive ends on the basis of the result of the obstacle detection by the obstacle sensor, such as a back sonar, and when the parking drive ends, a display of the end of the parking drive is presented on the screen of the display means.

According to the present invention, there is provided a vehicle parking assist device comprising:

a camera for picking up an image of a backward area of a vehicle;

display means for displaying an image picked up by the camera;

reverse gear mode detecting means for judging transmission of the vehicle is set to a reverse gear mode; and drive assist means arranged such that when the reverse gear mode detecting means judges that the transmission is set to the reverse gear mode, the drive assist means limits a speed of the vehicle to the preset upper limit of the vehicle speed or lower, thereby effecting the drive assist.

In the invention, when the vehicle is moving backward, a speed of the vehicle is limited to the preset upper limit of the vehicle speed or lower.

Therefore, collision of the vehicle when it is moved backward is prevented or shock when the collision occurs is lessened.

According to the present invention, there is provided a vehicle parking assist device comprising:

a camera for picking up an image of a backward area of a vehicle;

display means for displaying an image picked up by the camera;

obstacle sensor for sensing presence or absence of an obstacle in the backward area of the vehicle; and drive assist means arranged such that when the obstacle sensor detects an obstacle, the drive assist means limits a speed of the vehicle to the preset upper limit of the vehicle speed or lower, thereby effecting the drive assist.

In the invention, when the obstacle sensor detects an obstacle such as a back soar, the drive assist means limits a speed of the vehicle to the preset upper limit of the vehicle speed or lower. Therefore, collision of the vehicle when it is moved backward is prevented or shock when the collision occurs is lessened.

According to the present invention, there is provided an vehicle parking assist device comprising:

a camera for picking up an image of a backward area of a vehicle;

display means for displaying an image picked up by said camera;

reverse gear mode detecting means for judging transmission of the vehicle is set to a reverse gear mode; and drive assist means arranged such that when said reverse gear mode detecting means judges that the transmission is set to the reverse gear mode, said drive assist means changes an illumination direction of a lamp illuminating a backward area of the vehicle, thereby effecting the drive assist.

When the transmission is set to the reverse gear mode, the drive assist means changes an illumination direction of a lamp illuminating a backward area of the vehicle, thereby effecting the drive assist. Therefore, even when the parking lot is dark at night, for example, the image picked up by the camera is increased in brightness, and hence an easy-to-understand drive assist is secured.

A vehicle drive assist device, wherein the lamp is optionally installed.

In the invention, the lamp for illuminating a visual field of the camera when the vehicle backs is optionally attached to the device. Therefore, good visibility is secured in the parking drive at night, for example.

In the vehicle drive assist device, the vehicle is equipped with a car-carried device including a navigation device and/or audio device, and further the device comprises select means for causing the display means to selectively display the image from the camera and the image from the drive assist means or the image from the car-carried device.

In the invention, the image from the camera and the image from the drive assist means or the image from the car-carried device, e.g., a navigation device or an audio device, may be selectively displayed when required in the driving.

According to the present invention, there is provided a vehicle parking assist device comprising:

a camera for picking up an image of an area existing in a vehicle;

display means for displaying an image picked up by the camera; and drive assist means for switching drive assist information for parking overlaid on an image displayed by the display means between the drive assist information of a normal parking mode and that of a series parking mode.

Drive assist means for switching drive assist information for parking may be switched between the drive assist information of a normal parking mode and that of a series parking mode in accordance with a normal parking or a series parking.

In the vehicle drive assist device, the drive assist means selects the drive assist information of a series parking mode when the turning on of a winker lamp or a hazard lamp and the shifting of the transmission to the reverse gear mode are simultaneously performed.

In the invention, a display mode of the display means is changed to a series parking mode in which the display means displays the drive assist information for the series parking, in accordance with a lighting condition of the winker lamp or hazard lamp.

In the vehicle drive assist device, the vehicle is equipped with a navigation device, and the drive assist means arranged such that the drive assist means judges whether a parking position in which the vehicle is to be parked is in a parking lot or on a road, on the basis of the present position of the vehicle derived from the navigation device, and when the parking position is in the parking lot, the drive assist means selects the drive assist information of the normal parking mode, and when the parking position is on the road, the drive assist means selects the drive assist information of the series parking mode.

In the invention, the drive assist means judges whether a parking position in which the vehicle is to be parked is in a parking lot or on a road, on the basis of the present position of the vehicle derived from the navigation device. When the parking position is in the parking lot, the normal parking mode is selected, and when the parking position is on the road, the series parking mode is selected.

In the vehicle drive assist device, the drive assist means selects the drive assist information of the normal parking mode or the series parking mode in accordance with a change of a steering angle for steering the vehicle.

In the invention, the normal parking mode or the series parking mode is selected in accordance with a change of a steering angle for steering the vehicle.

Therefore, the series parking including a reverse turn of the steering wheel or the normal mode not including the steering reverse turn may be automatically selected.

According to the present invention, there is provided a vehicle parking assist device comprising:

a plurality of cameras being disposed such that the photographing areas covered by the cameras are shifted so as to pick up a scene around the vehicle;

display means for displaying images picked up by the cameras; and drive assist means arranged such that a display screen of the display means is segmented into plurality of display areas, and the images by the plurality of cameras are simultaneously displayed on those segmental display areas, thereby effecting the drive assist.

In the invention, a plurality of cameras are disposed such that the photographing areas covered by the cameras are shifted so as to pick up a scene around the vehicle. A display screen of the display means is segmented into plurality of segmental display areas in accordance with the arrangement of the cameras. The images by the plurality of cameras are simultaneously displayed on those segmental display areas. Therefore, the driver may look a plurality of images on the same screen of the display means. Accordingly, the driver may drive the vehicle while watching the images of the broad angular expanse.

In the vehicle drive assist, further comprising drive condition detecting means for detecting a vehicle drive condition, and wherein the drive assist means selectively changes a display in accordance with a drive condition detected by the drive condition detecting means.

In the invention, a display on the screen is changed in accordance with a drive condition. Accordingly, the drive assist is carried out by use of a display of visual information which is easily understood by the driver since an image display by the display means is automatically changed in accordance with vehicle running conditions. In a specific example, in the normal running, two images of the front left and right areas of the vehicle are displayed, and in the backward running, three images of the front left and right areas, and the backward area are displayed.

The vehicle drive assist device further comprises drive condition detecting means for detecting a vehicle drive condition, and wherein the drive assist means selectively changes a display in accordance with a drive condition detected by the drive condition detecting means.

In the invention, the vehicle is displayed in a simplified form on the screen of the display means.

Accordingly, a relationship of the image relative to the vehicle is displayed in an easy-to-understand manner on the basis of the displays of the vehicle an the image, whereby a proper drive assist is provided to the driver.

In the vehicle drive assist device, the drive assist means moves a display position of the vehicle according to an image from the camera.

Since a display position of the vehicle is moved in accordance with an image from the camera, a change of the image display is easy to understand.

In the vehicle drive assist device, the drive assist means operates to display the directions and photographing areas covered by the cameras when the vehicle is displayed in a simplified form.

In the invention, the vehicle is displayed in a simplified form, and the directions and photographing areas covered by the cameras are also displayed.

Therefore, the driver easily recognizes which camera picked up the image being displayed.

In the vehicle drive assist device, the vehicle is equipped with a car-carried device including a navigation device and/or audio device, and drive assist means arranged such that a display screen of the display means is segmented into plurality of display areas, and the images from the plurality of cameras and an image from the car-carried device are displayed on those segmental display areas, thereby effecting the drive assist.

In the invention, the driver may look both the image by each camera and the image by the navigation device or the audio device on the same display screen.

In a vehicle drive assist device, drive assist means changes the cameras, which causes the display means to display, one to another at predetermined time intervals.

In the invention, the images by the plurality of cameras are changed one to another at predetermined time intervals, to thereby eliminate the manual work of the driver to change the images.

In the vehicle drive assist device, the drive assist means uses a wipe to change the images.

In the invention, the wipe is used for changing the images by the plurality of cameras one to another. The shifting of one image to another image is continuous. Further, the changing of the images is automatically performed without the manual operation by the driver.

In the vehicle drive assist device, a camera for picking up a scene of a side area of the vehicle is included in the cameras, and the drive assist means operates to display a side image concerning a direction indicator, which is operated being interconnected with an operation of the direction indicator.

In the invention, the image of the area existing in the vehicle advancing direction may be displayed being interconnected with the direction operation. Accordingly, the vehicle parking assist device effectively assists the driver to make a safety check.

In the vehicle drive assist device, the drive assist means changes the images one to another in accordance with a steering angle of turn of a steering wheel for steering the vehicle.

In the invention, the images are changed one to another in accordance with a steering angle of turn of a steering wheel. Therefore, the image of the area existing in the vehicle advancing direction is automatically displayed, and the device assists the driver safely and effectively.

In the vehicle drive assist device, the drive assist means changes a condition of segmenting the screen of the display means in accordance with a steering angle of the steering wheel.

In the invention, the screen segmenting condition is changed in accordance with a steering angle of the steering wheel. Therefore, the image of the area located in the advancing direction is displayed on a wide display screen, and a safety check is easy in the drive assist.

The vehicle drive assist device further includes comprising an obstacle sensor for detecting presence or absence of an obstructive object on a vehicle traveling path, and wherein when the obstacle sensor detects an obstacle, the drive assist means causes the display means to display a sensing direction of the obstacle sensor.

In the invention, wherein when the obstacle sensor detects an obstacle, a sensing direction of the obstacle sensor is displayed. Therefore, the device informs the driver of a relation of the vehicle to the obstructive object on the display screen to attract the driver's attention.

In the vehicle drive assist device, when the obstacle sensor detects an obstacle, the drive assist means causes the display means to display an image from the camera which picks up a sensing direction of the obstacle sensor.

In the invention, when the obstacle sensor, e.g., a corner sensor, detects an obstacle, an image including the obstacle is displayed. The vehicle parking assist device calls driver's attention to the presence of the obstacle and its state.

In the vehicle drive assist device, when the obstacle sensor detects an obstacle, the drive assist means causes the display means to shift a display position of an image, which comes from the camera which picks up a sensing direction of the obstacle sensor, to the center of the screen of the display means or to expand the display.

In the invention, while being interconnected with the obstacle sensor, e.g., a corner sensor, a display position of an image, which comes from the camera which picks up a sensing direction of the obstacle sensor, is shifted to the center of the screen of the display means or the display is expanded. Therefore, the presence of the obstacle and its state are displayed in an ease-to-understand manner.

In the vehicle drive assist device, the drive assist means causes the display means to overlay an alarm on a display of the sensing direction of the obstacle sensor.

In the invention, while being interconnected with the obstacle sensor, such as a corner sensor, an alarm is overlaid on a display of the sensing direction of the obstacle sensor.

Therefore, the driver is intelligibly informed of the direction in which the obstacle is contained, which is easy to understand.

In the vehicle drive assist device, when the images of the cameras adjacently disposed are simultaneously displayed, the drive assist means adjusts the display areas and positions of those images so that those images are continuously connected together.

In the invention, the images by the cameras adjacently disposed are continuously connected together to form a single composed image. With the composed image, the image covering an expanse of area, which is easy for the driver to understand, is provided to the driver, to thereby support the driving.

In the vehicle drive assist device, the camera are disposed so as to take scenes of the front, front left, front right, rear left and rear right areas of the vehicle.

The vehicle parking assist device of the invention is capable of photographing the entire circumferential area around the vehicle.

In the vehicle drive assist device, the drive assist means segments the screen of the display means into the upper and lower display areas, and causes the display means to display an image of the front of the vehicle on the central area of the upper display area of the screen, the front left and right images on the left and right display areas of the upper display area, and an image of the rear area of the vehicle on the central area of the lower display area of the screen, the rear left and right images on the left and right areas of the lower display area of the screen of the display means.

The vehicle parking assist device of the invention is capable of making a safety check on the entire circumferential area around the vehicle on one display.

In the vehicle drive assist device, the drive assist means causes the display means to display an image selected from images picked up by the cameras disposed described above.

Only the image, which is selected, as needed, from images picked up by the cameras so disposed as to pick up the entire circumferential area around the vehicle, is displayed. Accordingly, the display means is efficiently utilized to display a necessary image.

In the vehicle drive assist device, the drive assist means causes the display means to display the images output from the cameras having the photographing areas successively disposed in scrolling manner.

The images output from the cameras having the photographing areas successively disposed are scrolled into a single image. Therefore, the driver is able to readily check the image of a broad area around the vehicle.

In the vehicle drive assist device, the display means includes a touch panel, and the drive assist means changes an image display condition according to an input to the touch panel.

The display means for displaying an image picked up by a plurality of cameras is equipped with a touch panel. Therefore, the driver may change a display condition of an image by merely touching the touch panel.

In the vehicle drive assist device, according to an input to the touch panel, the drive assist means displays an image at a position as input in a state that a time axis of its display is extended, and after a predetermined time elapses, the drive assist means returns the extended time axis to the original one.

In the invention, when the driver touches the touch panel to enlarge the image, the image resumes its original size after a predetermined time elapses. Therefore, the manual operation work is lessened to provide an effective drive assist.

According to the present invention, there is provided a vehicle parking assist device comprising:

a camera for picking up a scene in a frontward area of a vehicle;

storing means for reading an image picked up by the camera into the storing means per se; and drive assist means for acquiring information for vehicle drive assist on the basis of the image stored in the storing means.

In the invention, a camera picks up a scene in a frontward area of a vehicle, and storing means reads an image picked up by the camera into the storing means per se. Since the image is stored into the storing means in the form of vehicle drive assist information, the driver can readily extract the image as information effective for drive assist. The same information may be transmitted to other devices, and the information may be used as the information for congestion in broad areas.

The vehicle drive assist device further comprises display means for displaying an image coming from the camera.

Since an image coming from the camera is displayed by the display means, the driver can check a frontward area of the vehicle by the display means.

The vehicle drive assist device further comprises vehicle detecting means for detecting a vehicle forcibly running into a place in front of a self vehicle by processing the image coming from said camera.

In the invention, a vehicle forcibly running into a place in front of a self vehicle is detected by processing the image coming from said camera. Therefore, the vehicle drive assist device effectively effects the drive assist of, for example, measuring a distance from the self vehicle to the preceding vehicle.

According to the invention, there is provided a vehicle parking assist device comprising:

a camera, attached to the top of a vehicle, for picking up a scene around a vehicle as viewed from the top of the vehicle;

display means for displaying the image picked up by the camera; and drive assist means arranged such that the drive assist means detect a limit of a vehicle height from the image picked up by the camera, and informs a driver of the detection result as drive assist information.

In the invention, a camera is attached to the top of a vehicle and picks up a scene around a vehicle as viewed from the top of the vehicle. Display means displays the image picked up by the camera. A limit of a vehicle height is detected from the image picked up by the camera. Therefore, the driver can readily check whether or not the vehicle may pass under an elevated bridge, for example.

According to the invention, there is provided a vehicle parking assist device comprising:

a camera for picking up scenes in the frontward and backward areas of a vehicle;

display means for displaying the image picked up by the camera;

running condition detecting means for detecting running condition of the vehicle; and drive assist means for carrying out drive assist in accordance with running conditions detected by the running condition detecting means in such a manner that in a normal running, the display means displays an image of the frontward area of the vehicle, and in a backward running, the display means displays more brightly an image of the backward area than an image of the forward area.

In the invention, the display means displays an image of the frontward area of the vehicle in a normal running. In a backward running, the display means displays more brightly an image of the backward area than an image of the forward area. Therefore, the driver can watch the backward area in detail when backing the vehicle. In this respect, an effective drive assist is secured.

According to the present invention, there is provided a vehicle parking assist device comprising:

a camera for picking up scenes in the frontward and backward areas of a vehicle;

display means for displaying the image picked up by the camera;

running condition detecting means for detecting running condition of the vehicle; and drive assist means; and drive assist means for carrying out drive assist in accordance with running conditions detected by the running state detecting means by use of such a display that in a normal running, the display means displays an image of the frontward area of the vehicle, and in a backward running, the display means displays more brightly an image of the backward area than an image of the forward area, in place of a display frame for back mirrors.

In the invention, an image of the backward area is displayed in an intensifying manner, in place of a display frame for back mirrors. Accordingly, the image of the backward area is displayed in a display mode familiar to the driver. The drive assist is carried out such that the driver can easily understand that the displayed image is the image of the backward area.

In the vehicle drive assist device, the drive assist means modifies a backward area image displayed in the display frame for the back mirrors into an image having a field angle equal to that of the back mirror, and causes the display means to display the image modified in field angle.

Where the camera has a wide field angle, the image picked up by the camera is distorted, and as a result, it is difficult to grasp the sense of distance. To cope with this, the image is modified, by the cutting and enlarging or reducing of the image, into an image having a field angle equal to that of the back mirror, whereby the displayed image matches the sight feeling of the driver.

According to the present invention, there is provided a vehicle drive assist device comprising:

a camera, mounted on a vehicle, for picking up a scene of an area existing in the advancing direction of the vehicle;

a steering angle sensor for detecting a steering angle of the steering wheel of the vehicle;

traveling path predicting means for calculating a predictive traveling path curve depending on a steering angle detected by the steering angle sensor;

drive assist means for assisting the driver in his driving operation by adding a 3-dimensional information image containing a height of a vehicle along the predictive traveling path curve derived from the traveling path predicting means;

display means for displaying an image output from the camera and an image output the drive assist means; and an obstacle sensor for detecting an obstructive object existing in the vehicle advancing direction;

wherein the drive assist means changes a display of the 3-dimensional information image at a position on the predictive traveling path curve, which is close to a position where an obstructive object is detected by the obstacle sensor, to a display which is different from displays of the 3-dimensional image at other positions.

In the vehicle drive assist device thus constructed, a scene of an area existing in the advancing direction of the vehicle is picked up by a camera mounted on a vehicle. A steering angle of the steering wheel of the vehicle is detected by a steering angle sensor, and traveling path predicting means calculates a predictive traveling path curve depending on a steering angle detected by the steering angle sensor. Drive assist means assists the driver in his driving operation by adding a 3-dimensional information image containing a height of a vehicle along the predictive traveling path curve. An image output from the camera and an image output the drive assist means are displayed by the display means. An obstructive object existing in the vehicle advancing direction is detected by an obstacle sensor. At a position close to a position where an obstructive object is detected, the drive assist means changes a display of the 3-dimensional information image to a display which is different from displays of the 3-dimensional image at other positions. Therefore, the driver readily checks a possibility that the vehicle will touch an obstructive object at a position close to the object.

In the invention, the drive assist means displays the 3-dimensional information image in the form of planes each having a predetermined shape which are arrayed at fixed distances along the predictive traveling path curve.

In the vehicle drive assist device, the drive assist means displays the 3-dimensional information image in the form of a configuration representing a height of the vehicle, e.g., rectangular planes or vehicle projective planes, which are arrayed at fixed distances along the predictive traveling path curve. Therefore, the vehicle height is displayed in an ease-to-understand fashion. Further, a three-dimensional check of a possibility that his vehicle will touch an obstructive object is readily effected since at a position near the obstructive object, the display is changed from that at other positions.

In the invention, the drive assist moves a plane of a predetermined shape, which represents a height of the vehicle, along the predictive traveling path curve.

In the vehicle drive assist device, the drive assist moves a plane of a predetermined shape, which represents a height of the vehicle, such as rectangular planes or vehicle projective planes, along the predictive traveling path curve. Therefore, the driver can readily check a possibility that his vehicle will touch an obstructive object on the predictive traveling path curve, while recognizing the vehicle height.

In the invention, the drive assist stops the plane of a predetermined shape, which represents a height of the vehicle, at a position which is close to a position where the obstructive object is detected.

In the vehicle drive assist device just mentioned, the drive assist moves the plane of a predetermined shape, which represents a height of the vehicle, along the predictive traveling path curve, and stops the plane at a position which is close to a position where the obstructive object is detected. Therefore, the driver can readily check a position close to the obstructive object and a possibility that the vehicle will touch the obstructive object.

In the invention, the drive assist changes a color of the 3-dimensional information image at a position which is close to a position where the obstructive object is detected.

In the vehicle drive assist device, a color of the 3-dimensional information image is changed at a position which is close to a position where the obstructive object is detected. Therefore, the driver can readily recognize from a color change that a display position of the 3-dimensional image approaches to the obstructive object. Therefore, the drive assist visually presents a possibility that the vehicle will touch an obstructive object, and a touching position if it touches the object, in an ease-to-understand manner.

In the invention, the drive assist means displays the 3-dimensional information image in the form of a simulation image in which a self vehicle moves in the image picked up by the camera.

In the vehicle drive assist device, a 3-dimensional simulation image of the moving vehicle is overlaid on the image picked up by the camera. Therefore, the driver recognizes how the vehicle moves, on the displayed image, and hence he can check a possibility that the vehicle will touch the obstructive object, in a simulation domain.

According to the present invention, there is provided a vehicle parking assist device for assisting a driver in his parking operation comprising:

a camera for picking up a scene of an area existing in an advancing direction of a vehicle;

parking position detecting means for detecting a target parking position in which the vehicle is to be parked, from the image picked up by the camera;

steering angle calculating means for calculating a steering angle necessary for the moving of the vehicle to the target parking position detected by the parking position detecting means;

steering angle detecting means for detecting a steering angle of the vehicle; and parking assist means for presenting a steering operation guide to the driver on the basis of the result of comparing a steering angle detected by the steering angle detecting means with a steering angle calculated by the steering angle calculating means.

In the thus arranged vehicle parking assist device, when the vehicle is parked, a scene of an area existing in an advancing direction of a vehicle is picked up by a camera, and a target parking position in which the vehicle is to be parked, from the image picked up by the camera is detected by parking position detecting means. A steering angle necessary for the moving of the vehicle to the target parking position detected by the parking position detecting means, is calculated by steering angle calculating means. A steering angle of the vehicle is detected by steering angle detecting means. A steering angle detected by the steering angle detecting means is compared with a steering angle calculated by the steering angle calculating means by parking assist means. A steering operation guide is presented to the driver on the basis of the result of the comparison. The driver is guided so as to move the vehicle at the steering angle necessary for moving the vehicle to the target parking position. Therefore, the driver easily judges if the present steering angle is proper. Accordingly, if the driver steers according to the guide, the vehicle may be properly parked in the target parking position.

The vehicle parking assist device further comprises: traveling path predicting means for calculating, depending on a steering angle, a predictive traveling path curve along which the vehicle will travel; and touch judging means for judging as to whether or not the vehicle traveling along the predictive traveling path curve calculated by the traveling path predicting means will touch an obstructive object. In the vehicle parking assist device thus constructed, when a steering angle calculated by the steering angle calculating means is out of a range of steering angles within which a steering wheel may be turned for steering or when the touch judging means judges that the vehicle traveling along the predictive traveling path curve, which is calculated by the traveling path predicting means depending on the steering angle, will touch the obstructive object, the parking assist means urges the driver to reverse the advancing direction of the vehicle.

In the vehicle parking assist device, traveling path predicting means calculates, depending on a steering angle, a predictive traveling path curve along which the vehicle will travel, and touch judging means judges as to whether or not the vehicle traveling along the predictive traveling path curve calculated by the traveling path predicting means will touch an obstructive object. When the touch judging means judges that the vehicle traveling along the predictive traveling path curve, or when a steering angle calculated by the steering angle calculating means is out of a range of steering angles within which a steering wheel may be turned for steering, the parking assist means urges the driver to reverse the advancing direction of the vehicle. Thus, the vehicle parking assist device supplies to the driver information of the parking being impossible and a timing necessary for the reverse turn of the steering wheel. Accordingly, a guide is made so that the driver can properly park the vehicle into the parking space.

According to the present invention, there is provided a vehicle parking assist device for assisting a driver in his parking operation comprising:

a camera for picking up an image of an area existing in an advancing direction of a vehicle;

parking space recognizing means for detecting a parking space in which the vehicle is to be parked, from the image picked up by the camera; and parking assist means for judging as to if a parking stopper for blocking the advancing of the vehicle exists in the parking space recognized by the parking space recognizing means and for informing the driver of the result of the judgement.

The camera picks up a scene of an area existing in an advancing direction of a vehicle, and the parking space recognizing means detects a parking space in which the vehicle is to be parked, from the image picked up by the camera. The parking assist means judges as to if a parking stopper for blocking the advancing of the vehicle exists in the parking space recognized by the parking space recognizing means and informs the driver of the result of the judgement. Therefore, the driver can know the presence or absence of the parking stopper. When he stops the vehicle at a parking position, he can steer and brake while referring to the stopper.

The vehicle parking assist device further comprises voice guide means for carrying out a guide by the parking assist by voice.

In the vehicle parking assist device, the parking assist guide is presented to the driver by voice by the voice guide means. Therefore, the driver may take a drive guide necessary for the parking by the sense of hearing, not the sense of sight.

The voice guide means also gives the driver warning to urge the driver to watch environmental conditions around the vehicle.

In the vehicle parking assist device, the voice guide means urges the driver to watch the environment around the vehicle in the form of voice warning to the driver. Therefore, sufficient driver's attention may be turned to the environment around the vehicle, thereby ensuring a safe driving for parking.

The vehicle parking assist device further comprises display guide means for visually presenting the guide by the parking assist together with the image by the camera.

In the vehicle parking assist device, the visual presentation of the guide by the parking assist is performed together with the image by the camera. Therefore, the driver moves the vehicle for parking without anxiety while watching the image of the dead space when viewed from the driver.

According to the invention, there is provided a vehicle parking assist device for assisting a driver when he backs a vehicle into a parking space, by use of image information, the vehicle parking assist device comprises:

a camera for picking up a scene of a backward area of the vehicle;

display means for displaying the image of the backward area picked up by the camera; and parking assist means for assisting the driver in his parking by use of a display on the screen of the display means in which the guide lines prolonged from the lines defining the width of the vehicle and distance lines are overlaid on the backward area image.

When the camera photographs a backward area of the vehicle, an image of the backward area is displayed on the screen of the display means. The parking assist means displays the guide lines prolonged from the lines defining the width of the vehicle and distance lines in a state that those lines are overlaid on the backward area image. Since the guide lines are prolonged from of the lines defining the width of the self vehicle, the driver can approximately grasp a distance of the backing self vehicle to the object with reference to the distance lines after the vehicle is directed to be parallel to the boundary lines of the parking space in which the self vehicle is to be parked and other parking spaces adjacent to the former, and easily grasps a distance that the vehicle runs till the parking is ended and the vehicle is stopped.

According to the invention, there is provided a vehicle parking assist device for assisting a driver when he backs a vehicle into a parking space, by use of image information, the vehicle parking assist device comprises:

a camera for picking up a scene of a backward area of the vehicle;

display means for displaying the image of the backward area picked up by the camera;

a steering angle sensor for detecting a steering angle of the self vehicle;

traveling path predicting means for predicting a traveling path of the self vehicle on the basis of a steering angle detected by the steering angle sensor and for calculating a predictive traveling path curve representing the result of the prediction;

parking position judging means for judging a parking position at which the self vehicle is to be parked; and parking assist means for effecting a parking assist in such a way that a length of a predictive traveling path curve calculated by the traveling path predicting means is adjusted in accordance with a distance ranging to a parking position judged by the parking position judging means, and the predictive traveling path curve length adjusted is overlaid on the backward area image on the screen of the display means.

In this vehicle parking assist device, a length of a predictive traveling path curve that is predicted on the basis of a steering angle of the self vehicle is adjusted in accordance with a distance ranging to a parking position at which the self vehicle is to be parked. Therefore, the end of the predictive traveling path curve is coincident with the parking position, and hence the parking assist is performed by using a display which is easy for the driver to watch.

According to the present invention, there is provided a vehicle parking assist device for assisting a driver when he backs a vehicle into a parking space, by use of image information, the vehicle parking assist device comprises:

a camera for picking up a scene of a backward area of the vehicle;

display means for displaying the image of the backward area picked up by the camera;

a steering angle sensor for detecting a steering angle of the self vehicle;

traveling path predicting means for predicting a traveling path of the roof portion of the self vehicle on the basis of a steering angle detected by the steering angle sensor and for calculating a predictive traveling path curve representing the result of the prediction; and parking assist means for effecting a parking assist in such a way that a predictive traveling path curve of the roof portion of the vehicle, which is calculated by the traveling path predicting means, is overlaid on the backward area image on the screen of the display means.

In this vehicle parking assist device, a roof predictive traveling path curve of the roof portion of the self vehicle is displayed while overlaid on the backward area image for the parking assist. Therefore, the vehicle can be backed while being unconscious of the side of the vehicle adjacent to the parking space which forms the dead space when the driver backs the vehicle along the predictive traveling path curve so as not to touch the roof of the vehicle being parked in the parking space to which the parking space is adjacent.

According to the present invention, there is provided a vehicle parking assist device for assisting a driver when he backs a vehicle into a parking space, by use of image information, the vehicle parking assist device comprises:

a camera for picking up a scene of a backward area of the vehicle; display means for displaying the image of the backward area picked up by the camera;

a steering angle sensor for detecting a steering angle of the self vehicle;

traveling path predicting means for predicting a traveling path of the self vehicle on the basis of a steering angle detected by the steering angle sensor and for calculating a predictive traveling path curve representing the result of the prediction;

vehicle projection means arranged such that the vehicle projection means judges if other vehicles park in parking spaces located adjacent to a parking space under photographing by the camera, and when other vehicles park therein, the vehicle projection means calculates a projective line of the vehicle on the ground; and parking assist means for effecting a parking assist in such a way that a predictive traveling path curve calculated by the traveling path predicting means and a projective line of the vehicle to the ground calculated by the vehicle projection means are overlaid on the backward area image on the screen of the display means.

In this vehicle parking assist device, in case where a scene of a parking space into which the self vehicle is backed is picked up by the camera, when another vehicle is parked in a parking space adjacent thereto, the projective line of the vehicle to the ground is calculated, and the calculated projective line and a predictive traveling path curve are overlaid on the backward area on the screen of the display means, and in this state, the parking assist is performed. Therefore, reliable judgement is made as to if there is an area which hides behind another vehicle, being dead space of the image, affects the predictive traveling path curve of the other vehicle. Therefore, when the self vehicle is guided to the parking area, reliable judgement is made as to if the vehicle may move into the parking area without touching the other vehicle even in a shaded area in the image of the other vehicle.

According to the present invention, there is provided a vehicle parking assist device for assisting a driver when he backs a vehicle into a parking space, by use of image information, the vehicle parking assist device comprises:

a camera for picking up a scene of a backward area of the vehicle;

display means for displaying the image of the backward area picked up by the camera;

plane model generating means for generating from the backward area image picked up by the camera a plane model containing a parking space in which a self vehicle is to be parked and the parking spaces located adjacent to the parking space, together with the self vehicle and other vehicles being parked; and parking assist means for effecting a parking assist by displaying a plane model generated by the plane model generating means on the screen of the display means.

In this vehicle parking assist device, the parking space in which the self vehicle is to be parked, and the parking spaces adjacent to the former are modeled in a plane, and those are displayed in the form of a plane model. Further, the parking spaces of the self vehicle and other vehicles, which are parked in those parking areas, are also displayed in the plane model. Therefore, the parking spaces and the vehicles may be displayed in a bird's eye view, and this provides an easy-to-understand parking assist. Since the parking spaces and the vehicles are displayed in a plane, the driver can easily grasp positions of the self vehicle relative to the parking areas and the vehicles parked adjacent to the former, and the orientation of the vehicle and its advancing direction.

In the vehicle parking assist device, the parking assist means displays an image on the screen of the display means so that the backward direction of the self vehicle is oriented downward.

Thus, the backward direction of the self vehicle is thus oriented downward. This display is well fit to the feeling of the driver. Therefore, when the driver watches the screen of the display means, he is easy to understand the contents displayed on the screen.

In this vehicle parking assist device, the parking assist means is capable of selectively displaying the backward area image output from the camera and the parking assist image or the plane model to be displayed overlaid on the backward area image on the screen of the display means In this vehicle parking assist device, the parking guide may be switched between the parking guide modeled in place or the parking guide based the backward area image. Therefore, the driver selects, as desired, the parking guide modeled in place or the actual parking guide based the backward area image, and it effects the parking assist which is easy for the driver to understand.

According to the present invention, there is provided a vehicle parking assist device for assisting a driver using image information when the driver backs a vehicle into a parking space, the vehicle parking assist device comprises:

a camera for picking up a scene of a backward area of the vehicle;

display means for displaying the image of the backward area picked up by the camera;

a timer for counting a predetermined time;

direction detecting means for detecting a change of the advancing direction of the vehicle; and parking assist means arranged such that when the direction detecting means detects a change of the advancing direction of the vehicle to the backward direction, the parking assist means displays the backward area image picked up by the camera on the screen of the display means to assist the driver in his parking operation, and when the direction detecting means detects a change of the advancing direction of the vehicle from the backward direction to the forward direction, the parking assist causes the timer to start the counting of time, and continues the parking assist based on the backward area display on the screen of the display means till a time set in the timer elapses.

In this vehicle parking assist device, when the vehicle backs, the parking assist based on the backward area image is carried out. Even if the advancing direction of the vehicle is changed from the backward direction to the forward direction, the parking assisting operation continues with the display of the backward area image till the time set in the timer terminates. Therefore, the backward area is easily checked when the vehicle advances and when the steering wheel is reversely turned. Further, when the steering wheel is reversely turned, the vehicle parking assist device displays a yard stick in estimating, by the eye, what distance the vehicle must be advanced in an easy-to-understand manner, for the parking assist.

According to the invention, there is provided a vehicle parking assist device in which when a driver backs a vehicle into a parking space between adjacent vehicles of those being parked in a row, the vehicle parking assist device assists the driver in his parking operation by image-information basis guide, the vehicle parking assist device comprising:

a camera for picking up a scene of a backward area of the vehicle;

a steering angle sensor for detecting a steering angle to steer the vehicle;

traveling path predicting means for predicting a traveling path of the vehicle on the basis of a steering angle detected by the steering angle sensor and for calculating a predictive traveling path curve;

timing judging means for detecting a target parking position on the basis of the image picked up by the camera and for judging a timing to reversely turn a steering wheel by an amount of turn of the steering wheel necessary to move the vehicle to the target parking position;

parking assist means for generating a composite image of an image derived from the camera and a predictive traveling path curve predicted by the traveling path predicting means, and for adding guide information for a steering operation defined by a reverse-turn timing judged by the timing judging means to the composite image, whereby the parking assist means assists the driver in the serial parking operation; and display means for display an image derived from the parking assist means.

The scene of a backward area of the vehicle is picked by a camera, and the steering angle to steer the vehicle is detected by a steering angle sensor. The traveling path predicting means predicts a traveling path of the vehicle on the basis of a steering angle detected by the steering angle sensor and calculates a predictive traveling path curve. The timing judging means detects a target parking position on the basis of the image picked up by the camera and judges a timing to reversely turn a steering wheel by an amount of turn of the steering wheel necessary to move the vehicle to the target parking position. The parking assist means generates a composite image of an image derived from the camera and a predictive traveling path curve predicted by the traveling path predicting means, and adds guide information for a steering operation defined by a reverse-turn timing judged by the timing judging means to the composite image, whereby the parking assist means assists the driver in the serial parking operation. A predictive traveling path curve is displayed together with a backward area image of the vehicle. Further, guide information showing such a timing of reversely turning the steering wheel as to back the vehicle into a target parking position is also displayed. Accordingly, the driver easily drives the vehicle for the series parking while watching the screen of the information display device.

In the invention, the parking assist means adds an oblique line as the guide information for the steering operation to a position on a predicted traveling path curve at which the steering wheel is to be reversely turned.

Thus, the parking assist means adds an oblique line as the guide information for the steering operation to a position on a predicted traveling path curve at which the steering wheel is to be reversely turned. Accordingly, the parking is completed by reversely turning the steering wheel when the oblique line lies on a target, e.g., a road edge. Therefore, the driver readily makes a series parking without touching of the vehicle with another vehicle being parked adjacent to the vehicle driven by the driver.

The parking assist means assists the driver in the series parking on the basis a backward movement of the vehicle and a combination of lighting conditions of a hazard lamp and/or winker lamp.

In the invention, the parking assist means assists the driver in the series parking on the basis a backward movement of the vehicle and a combination of lighting conditions of a hazard lamp and/or winker lamp. Therefore, there is no need of switching operation for starting the series parking assist. The series parking assist is automatically carried out if the hazard lamp and/or winker lamp is lit to give the drivers of other vehicles a sign showing that the series parking will start. In this respect, there is eliminated troublesome switching operations.

In the invention, the parking assist means judges which side of the road is used for the series parking on the basis of a combination of lighting conditions of the hazard lamp and/or winker lamp, and adds the guide information to the composite image according to the judgement result.

Thus, the parking assist means judges which side of the road is used for the series parking on the basis of a combination of lighting conditions of the hazard lamp and/or winker lamp, and adds the guide information to the composite image according to the judgement result. When one of the winker lamps is lit, it is judged that the vehicle will be series parked along the same side of the road as the side of the car to which the lit winker lamp is attached, and the series parking guide information prepared for such a series parking is attached to the composite image. When the hazard lamp is lit, it is judge that the vehicle will be series parked on the left side of the road as usually, and the vehicle parking assist device assists the driver to drive the vehicle for parking. Since the parking assist means assists the driver in making the series parking, the parking assist of the device is free from the complicated switching operations.

The parking assist means generates an ideal traveling path ranging from the present position to a target parking position detected by the timing judging means, for the steering guide information.

Thus, an ideal traveling path ranging from the present position to a target parking position detected by the timing judging means, is generated for the steering guide information. Therefore, the driver easily backs the vehicle into a target parking position by steering the vehicle so as to approximate in shape the predictive traveling path curve to the ideal traveling path.

The vehicle parking assist device further comprises lane monitoring means for recognizing border lines of a traffic lane and monitoring an out-of-lane of the vehicle on the basis of the border line recognition.

In the vehicle parking assist device, lane monitoring means recognizes border lines of a traffic lane and monitors an out-of-lane of the vehicle on the basis of the border line recognition. Therefore, one camera may be used for both the camera which monitors a backward area of the vehicle for parking assist and the camera for monitoring an out-of-lane of the vehicle. Therefore, the vehicle parking assist device needs less cost when comparing with the vehicle parking assist device using two cameras for the above purposes.

In the vehicle parking assist device, the parking assist means judges whether or not the vehicle may back to a target parking position detected by the timing judging means within a range of steering angles within which the steering wheel may be turned, and whether or not the vehicle moves out of the traffic lane monitored by the lane monitoring means, and the parking assist means assists the driver in the series parking on the basis of the judgement results.

In the invention, the vehicle may back to a target parking position within a range of steering angles within which the steering wheel may be turned. Further, judgement is made as to whether or not the vehicle moves out of the traffic lane monitored by the lane monitoring means. The parking assist means assists the driver in the series parking on the basis of the judgement results. Therefore, the driver may back the vehicle into a parking space between the adjacent vehicles of those being parked in row, without getting the vehicle out of the lane.

BRIEF DESCRIPTION OF THE DRAWINGS

FIGS. 20A, 20B and 20C are diagrams showing how obstacle displays are changed to another on the screen of an information display device information display device 74.

FIGS. 21A and 21B are diagrams showing a drive assist which is carried out by seamlessly composing the images picked up by a plurality of camera units 10 into a single image, the drive assist forming a sixth embodiment of the invention.

FIGS. 22A and 22B are diagrams showing how to display images, which are produced by picking up the entire circumferential area around a vehicle 1, on the display screen in the FIGS. 21A and 21B embodiment.

DETAILED DESCRIPTION OF THE PRESENT INVENTION

Figure 1:
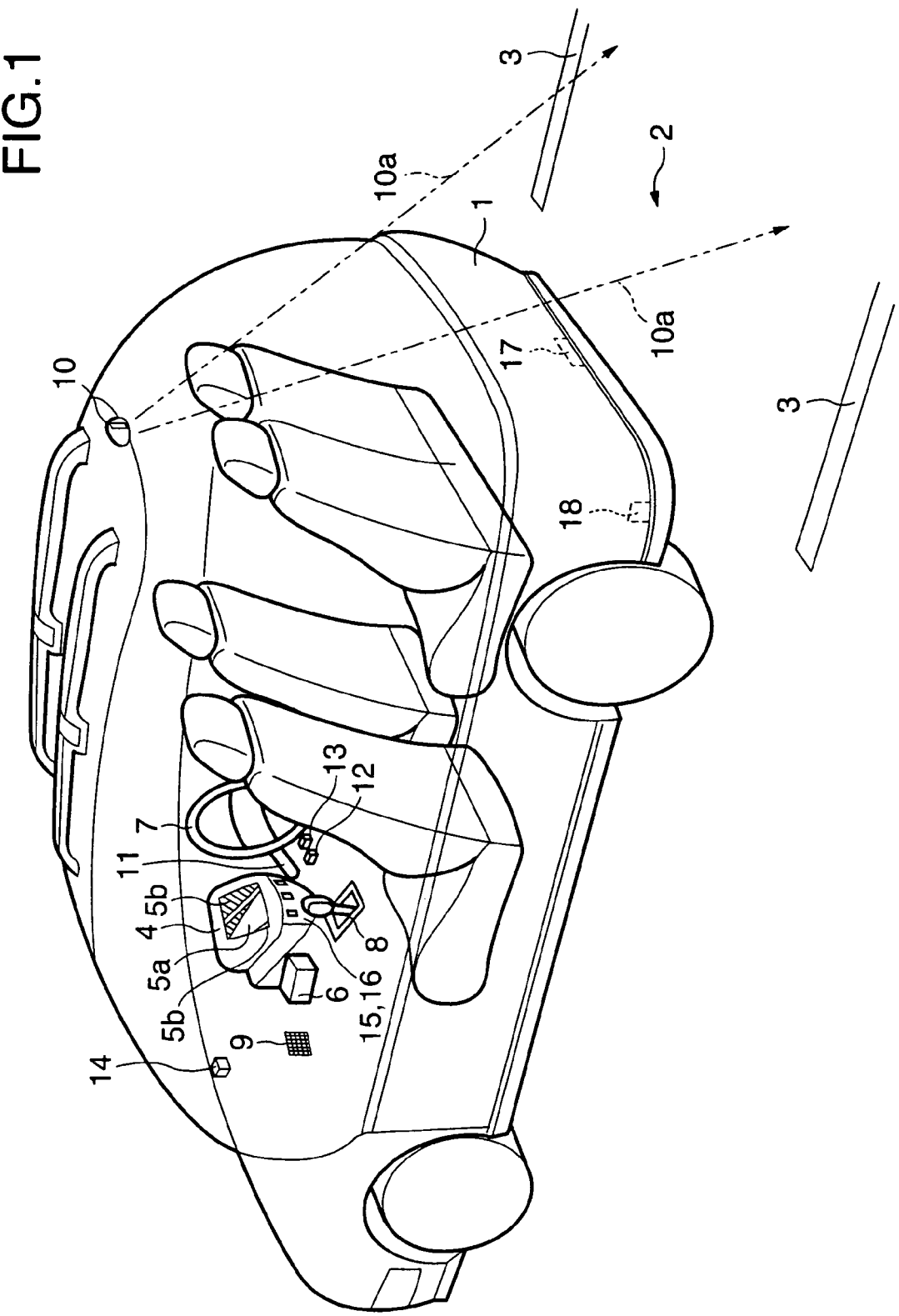
FIG. 1 is a perspective view schematically showing a vehicle parking assist device which is a first embodiment of the invention.
Figure 2:
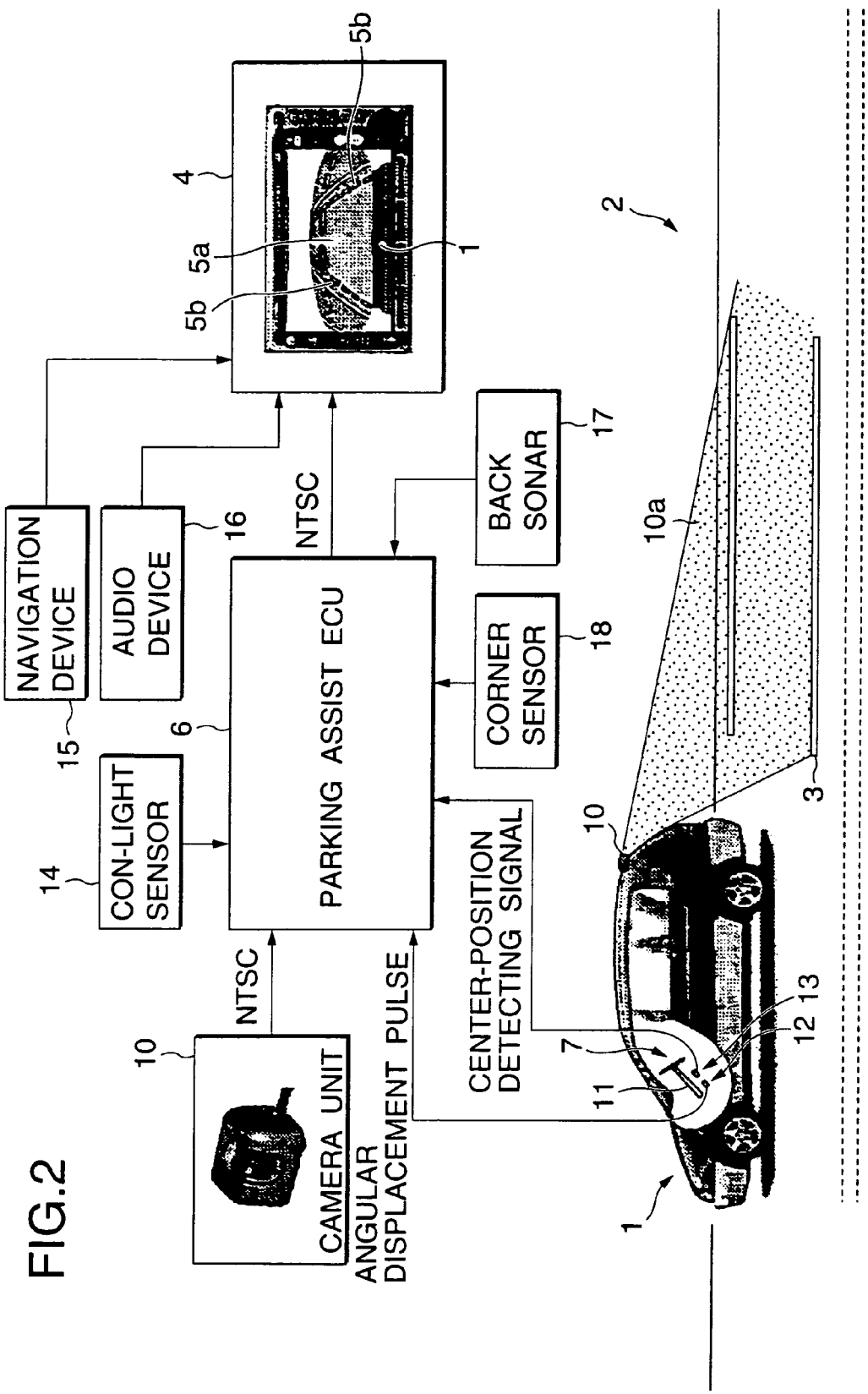
FIG. 2 is a perspective view schematically showing a state that a vehicle 1 backs for parking in the FIG. 1 embodiment.

FIGS. 1 and 2 are diagrams showing a scheme of a vehicle parking assist device which is a first embodiment of the present invention. Like reference numerals are used, for simplicity, for designating like or equivalent portions through the drawings which will be referred to in the description of the preferred embodiments of the invention.

The vehicle parking assist device of the embodiment assists the driver to correctly park a vehicle into a parking space marked off with white lines 3 or the like, through the backward movement of the vehicle. A drive assist displays a predictive traveling path curve 5a representing as a predictive traveling path on the screen of an information display device 4 as display means, or white lines 5b prolonged from the lines demarcating both sides of a vehicle 1 on the display screen, whereby a drive assist for the driver is performed.

The predictive traveling path curve 5a and the white lines 5b are generated by an electronic control unit (referred to as a "parking assist ECU 6") for the parking assist by use of detection data of a steering angle and the like. The generated ones are displayed by the information display device 4.

When the driver operates a shift lever 8 of a transmission of the vehicle 1 to change the advancing direction of the vehicle to a backward direction, the parking assist ECU 6 causes the information display device 4 to display a predictive traveling path curve 5a and white lines 5b on the screen thereof. At this time, a speaker 9 produces an alarm sound or a voice sound for guide.

An image picked by a camera unit 10 attached to the rear part of the vehicle 1 is also displayed on the screen of the information display device 4, in addition to the predictive traveling path curve 5a and the white lines 5b generated by the parking assist ECU 6. In the image picked up through the field 10a of the camera unit 10, an areal portion which is not clearly viewed by the driver or is a dead space as viewed from the driver is clearly viewed. The image assists the driver in parking the vehicle 1 into the parking zone 2 in an easy-to-understand manner, in cooperation with the predictive traveling path curve 5a and the white lines 5b.

A direction of the predictive traveling path curve 5a generated by the parking assist ECU 6 is varied in accordance with a steering operation of the steering wheel 7. A steering operation of the steering wheel 7 is obtained by detecting an angular displacement of a steering shaft 11 by an angle sensor 12. In a normal vehicle 1, the steering wheel 7 may be turned by several turns. Therefore, the angle sensor 12 for detecting a steering angle detects an angular displacement and its direction of the steering shaft 11, detects a state of the steering shaft 11 positioned at the center position.

In the display, the white lines 5b are overlaid on the image picked up by the camera unit 10. In this case, the white lines 5b are prolonged from the lines defining the body width of the vehicle 1. The direction of the white lines 5b is fixed with respect to the field 10a of the camera unit 10. The vehicle 1 is equipped with a con-light sensor 14 which senses a brightness of the environment and controls a lighting condition of an illumination system. A brightness and coloring of the predictive traveling path curve 5a and the white lines 5b, which are displayed by the information display device 4, are varied in accordance with a brightness of the environment of the vehicle 1. Thus, those are adjusted so as to provide an easy-to-understand drive assist.

The vehicle 1 is also equipped with car-carried devices, such as a navigation device 15 and an audio device 16, and necessary information is displayed by the information display device 4. The vehicle 1 is further equipped with a back sonar 17 and a corner sensor 18 as obstacle sensors. An obstructive object existing in the dead space by the utilization of ultrasonic waves.

Figure 3:
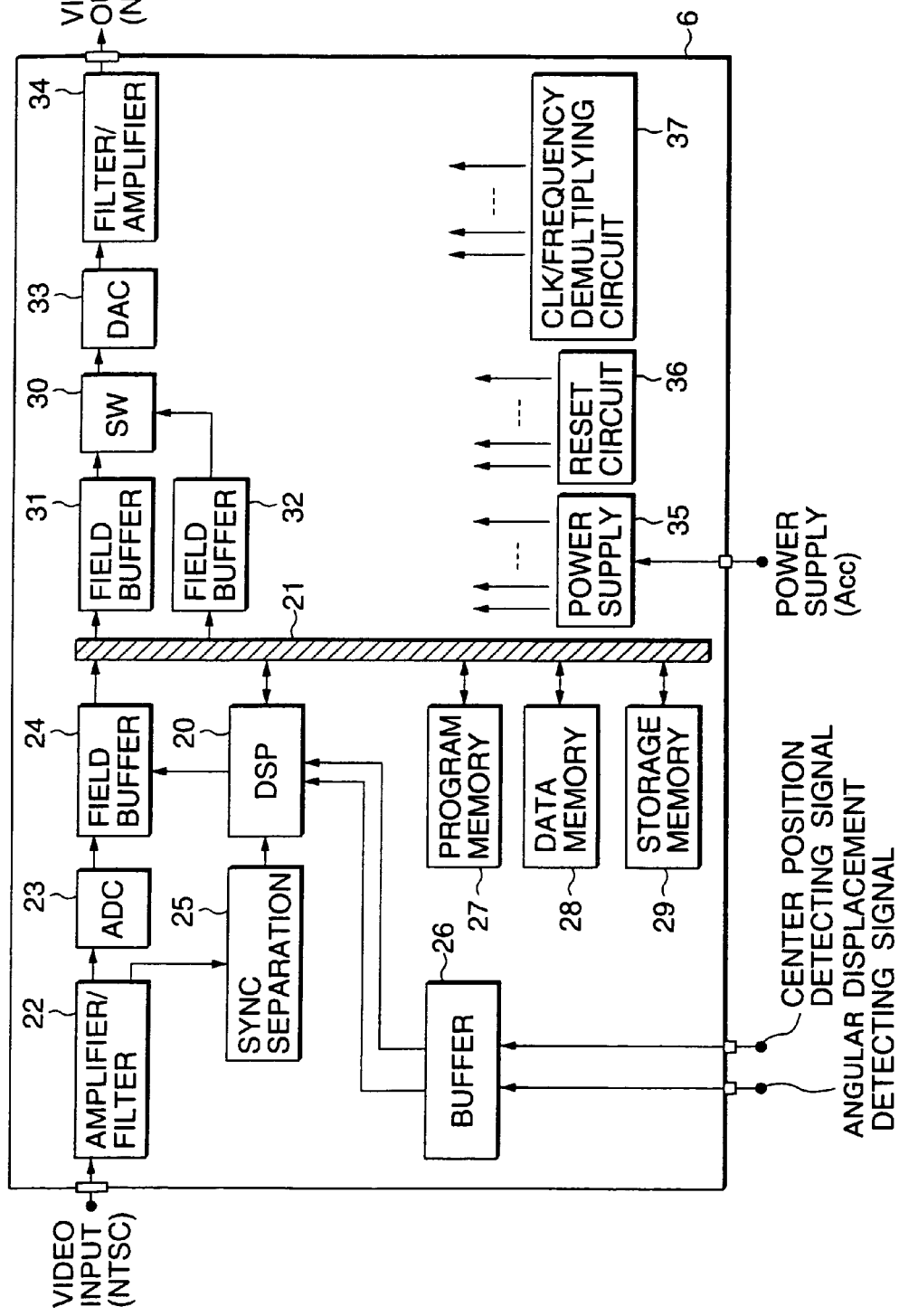
FIG. 3 is a block diagram showing a parking assist ECU 6 in the FIG. 1 embodiment.

FIG. 3 shows the innards of the parking assist ECU 6 shown in FIGS. 1 and 2. The parking assist ECU 6 contains a digital signal processor (DSP) for controlling the overall system of the device. The DSP 20 carries out controls and signal processings through a bus 21. A signal representing an image picked up by the camera unit 10, which is of the NTSC type, is input to an amplifier/filter circuit 22. Then, it is input to an analog to digital converter (ADC) 23. The ADC 23 converts a signal form of the image signal into a digital form. The digitized signal is stored into an amplifier/filter circuit 24. A video signal output from the amplifier/filter circuit 24 is also applied to a sync separation circuit 25 where a horizontal sync signal and a vertical sync signal are separated from the video signal. Those separated ones are input the DSP 20.

The DSP 20 receives an angle detect signal from the angle sensor 12 for detecting an angular displacement of the steering shaft 11 and a center position detect signal from the center position sensor 13. The DSP 20 carries out a parking assist process by use of programs and data stored in a program memory 27 and a data memory 28, both being connected to the bus 21. The storage memory 29, which is backed up by a battery, is capable of retaining the contents stored therein even when a power supply 35 of the parking assist ECU 6 is not turned on.

The DSP 20 recognizes the white lines 3 on the basis of an incoming video signal, and generates a predictive traveling path curve 5a when an angular displacement operation of the steering shaft 11 is performed, and white lines 5b. The generated images are stored into field buffers 31 and 32, either of which is selected by a switch (SW) circuit 30. The signal selected by the SW circuit 30 is input to a digital to analog converter (DAC) 33, and passes through a filter/amplifier circuit 34, and is output as a video signal to the information display device 4. Electric power is supplied to the whole system of the parking assist ECU 6. When a reset signal is supplied to the parking assist ECU by the reset circuit 36 when the power supply is turned on. Further, a clock signal defining a basic operation timing of the parking assist ECU and signals having frequencies formed by demultiplying the frequency of the clock signal are also applied to the parking assist ECU.

Figure 4A:
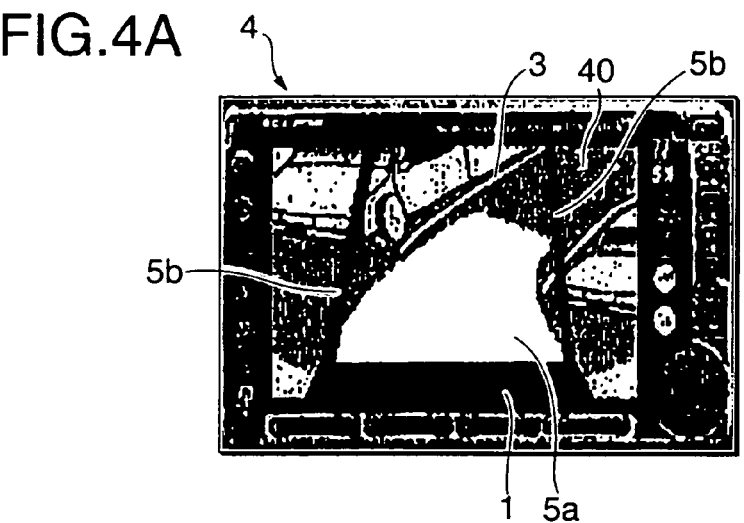
FIGS. 4A to 4C are diagrams showing parking assist displays displayed on the screen of an information display device 4.
Figure 4B:
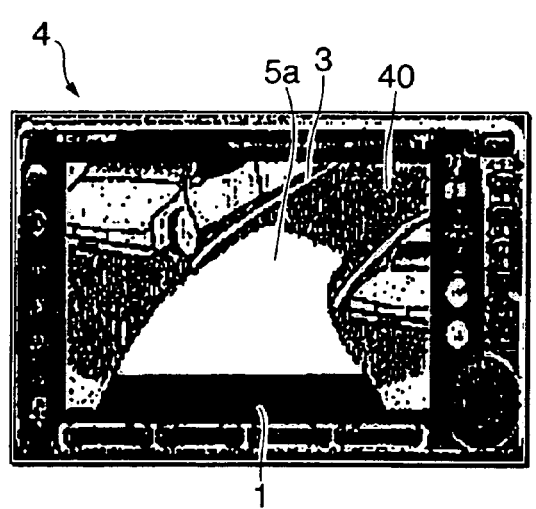
Figure 4C:
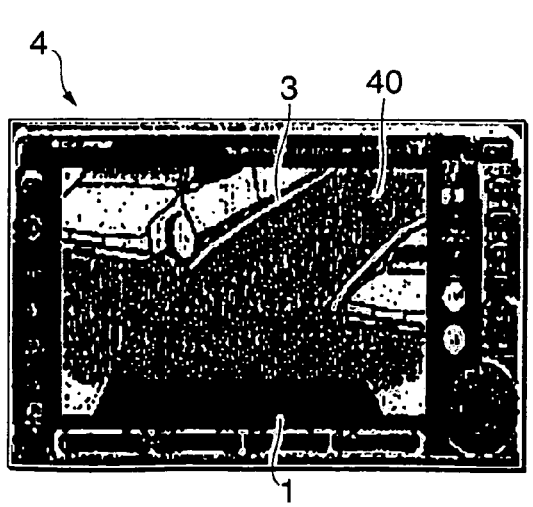

Each of FIGS. 4A to 4C exemplarily shows image information for parking assist, which is displayed on the screen of the information display device 4. FIG. 4A shows an image corresponding to a state that the vehicle 1 is backed into a parking position 40. The white lines 5b prolonged from the lines defining the vehicle width are displayed on the backward image, together with a predictive traveling path curve 5a predicted on the basis of a steering angle. As shown in FIG. 4B, only the predictive traveling path curve 5a is added to the backward image for the parking position 40, or only the backward image is added thereto as shown in FIG. 4C. Further, only the white lines 5b may be overlaid on the backward image shown in FIG. 4C.

The driver can know the present direction of the vehicle 1 under parking assist from a display of the white lines 5b. Where the white lines 3 are drawn on both sides of the parking position 40 to form a parking frame, the driver can easily park the vehicle 1 in parallel with a space of the parking position 40 in a manner that when the white lines 3 are parallel to the white lines 5b, the driver returns the steering wheel 7 to the center position.

As shown in FIGS. 4A to 4C, a display of the predictive traveling path curve 5a or the white lines 5b may be selected as desired by a select switch provided for selecting a display mode. In a specific example, the predictive traveling path curve 5a is displayed for a fixed time only when a predetermined driving operation, e.g., an operation of the steering wheel 7, is performed. The white lines 5b is displayed for a fixed time only when the braking operation is performed. Those operations are automatically controlled.

A brightness and color arrangement of the predictive traveling path curve 5a and the white lines 5b are varied in accordance with a brightness of the environment of the vehicle 1, which is sensed by the con-light sensor 14. For example, when the environment is dark, the display is also dark, whereby the backward image is in harmony with the predictive traveling path curve 5a and the white lines 5b. The colors of the predictive traveling path curve 5a and the white lines 5b are also adjusted in accordance with a brightness and the coloring of the environment so that the driver is easy to see them. Since in the daytime, the environment scene is bright, a distinctive color, e.g., yellow, is used. At night, the environment is dark. Therefore, if a distinctive color is used, the backward image is difficult to see. Accordingly, in this case, a dark and thin color is used.

In the embodiment, the con-light sensor 14 is used for inputting a brightness of the environment to vary the brightness and the color of the predictive traveling path curve 5a and the white lines 5b. If required, a sensor exclusively used for the brightness sensing purpose may be used. The brightness may be detected from an image of a picture picked up by the camera unit 10. When the camera unit 10 is capable of picking up a color image, a color is also detected from the image. In this case, the colors of the predictive traveling path curve 5a and the white lines 5b may be changed while being interconnected in operation with the detected color.

In a case where as shown in FIGS. 4A to 4C, the parking assist image is changed to another by the operation of the switch by the driver, the final select state in the previous parking assist operation is stored into the storage memory 29 and the first select state in the parking assist operation now conducted is set on the basis of the final select state stored. If the select state providing an easy-to-see display for the driver is obtained through the above operation, that select state may be used for the next parking assist and the subsequent ones.

Figure 5:
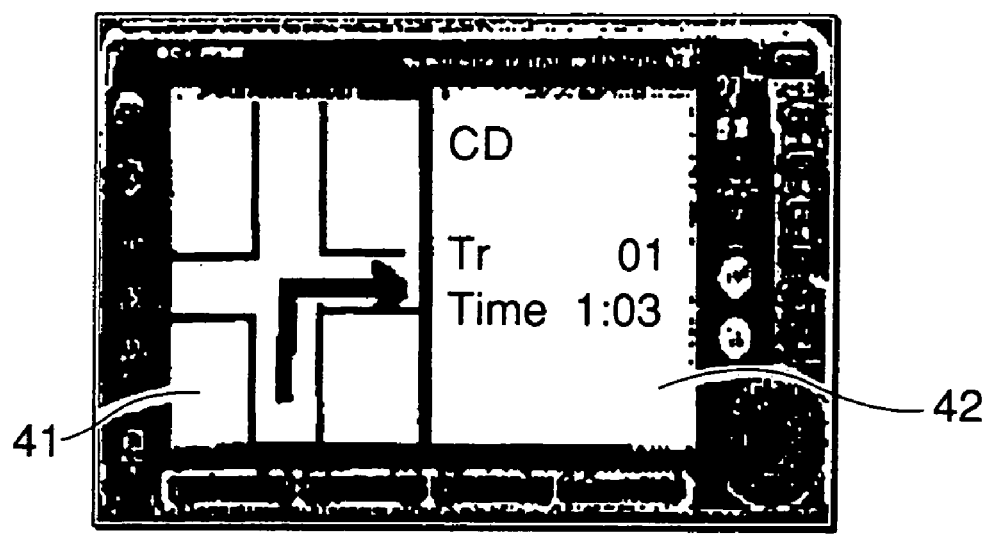
FIG. 5 is a diagram showing a navigation display 41 and a audio display 42, which are presented on the screen of the information display device 4.

FIG. 5 shows a display by the information display device 4, the display containing a navigation display 41 from the navigation device 15 in FIG. 1 and an audio display 42 from the audio device 16. The driver may select, as needed, the backward image of the parking position 40 for parking assist, the navigation display 41 or audio display 42, whereby the information display device 4 is effectively used for display.

Figure 6:
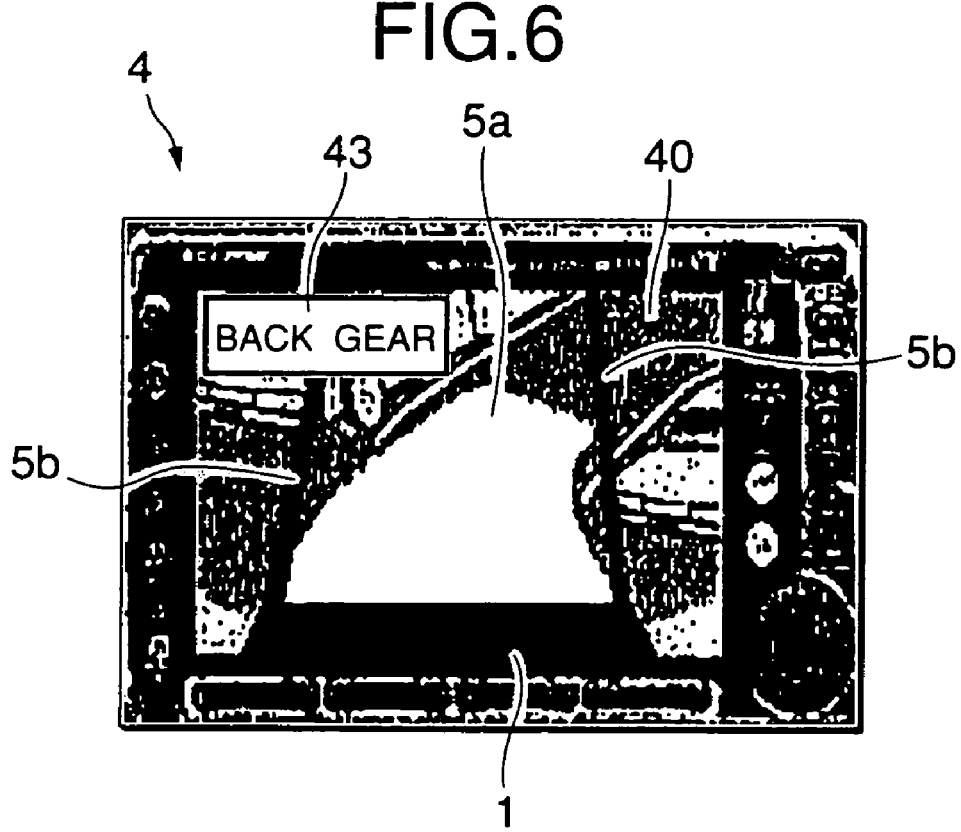
FIG. 6 is a diagram showing a display by the information display device 4, which informs that a shift lever is shifted to the reverse gear position.

FIG. 6 shows a display by the information display device 4, which informs the driver that the shift lever 8 is shifted to the reverse gear position. A telop 43 of "Reverse Gear" is displayed for a fixed time on the backward image representing the parking position 40. The driver sees the telop 43, and easily understands that the shift lever is at the reverse gear position. With the telop displayed, there is no chance that the shift position slips off the driver's memory and the driver mistakenly recognizes that the vehicle is in the forwarding state, and abruptly starts the forward movement of the vehicle. The color of the entire screen may be changed in place of the display of the telop or together with the display of the telop 43.

Figure 7:
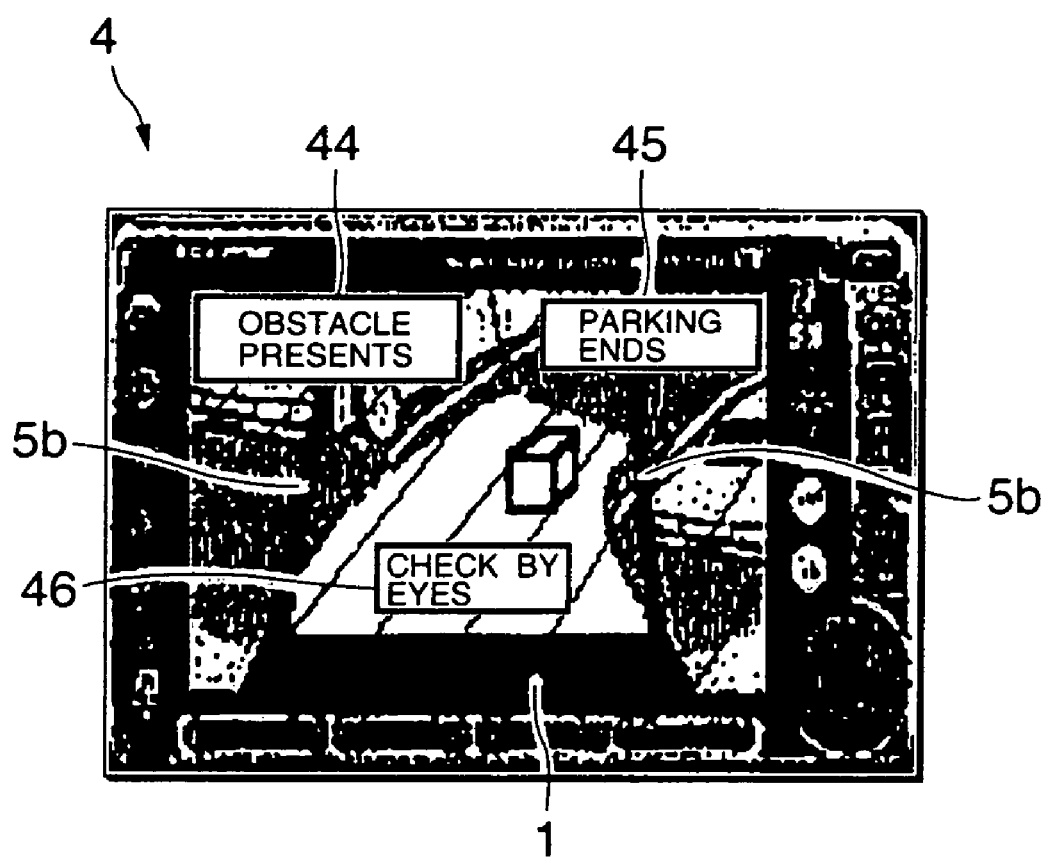
FIG. 7 is a diagram showing a display by the information display device 4, which informs that an obstructive object is detected, the parking operation is completed, and urges the driver to make a check by the eye.

FIG. 7 shows a display containing a telop 44 showing an obstacle detection by the back sonar 17 or corner sensor 18, a telop 45 showing the parking end, and a telop 46 urging the driver to make a check by the eye. When the back sonar 17 or the corner sensor 18 detects an obstructive object located near the vehicle 1, a telop 43 of "obstacle" or "STOP", showing that an obstacle is present for a predetermined time, and urges the driver to turn his attention to the obstructive object. The obstructive object detected by the back sonar 17 or the corner sensor 18 could be contained in the backward image near the parking position 40. In this case, the driver sees the telop 44 and watches the backward image. If so done, he will readily recognize the obstructive object 47 by the eye. When the obstructive object 47 is detected, the color of the whole screen may be changed in place of the display of the telop 44 or in combination of the display of the telop 44, to call the driver's attention to the obstructive object.

The telop 45 of the parking end is displayed when the obstacle sensor, such as the back sonar 17 or the corner sensor 18, detects a car stopper or a wall, and the vehicle approaches to the detected one within a predetermined distance from the detected one. Display of the telop 45 of "parking end" or "STOP" informs the driver of the parking end, thereby preventing a vehicle touch accident in the backward movement. The telop 46 causing the driver to make a check by the eye is displayed for urging the driver to make a safety check by the eye during the execution of the parking assist process. Display of the telop 46 prevents such a dangerous situation that the driver is riveted to the display by the information display device 4 and gives less attention to the environment including the frontward and sideward areas of the vehicle 1, which is not contained in the image displayed by the information display device 4.

Improvement of the safety during the backward movement of the vehicle may be achieved in a manner that when the shift lever is shifted to the reverse gear position, a vehicle speed is controlled to be below a predetermined speed. The speed control may be performed also when the obstacle sensor, e.g., the back sonar 17, detects an obstructive object 47. The control to limit the vehicle speed to below a predetermined speed during the backward movement or the backward movement when the obstructive object is detected is capable of preventing a vehicle collision during the backward movement and lessening an impact at the time of the collision.

Figure 8:
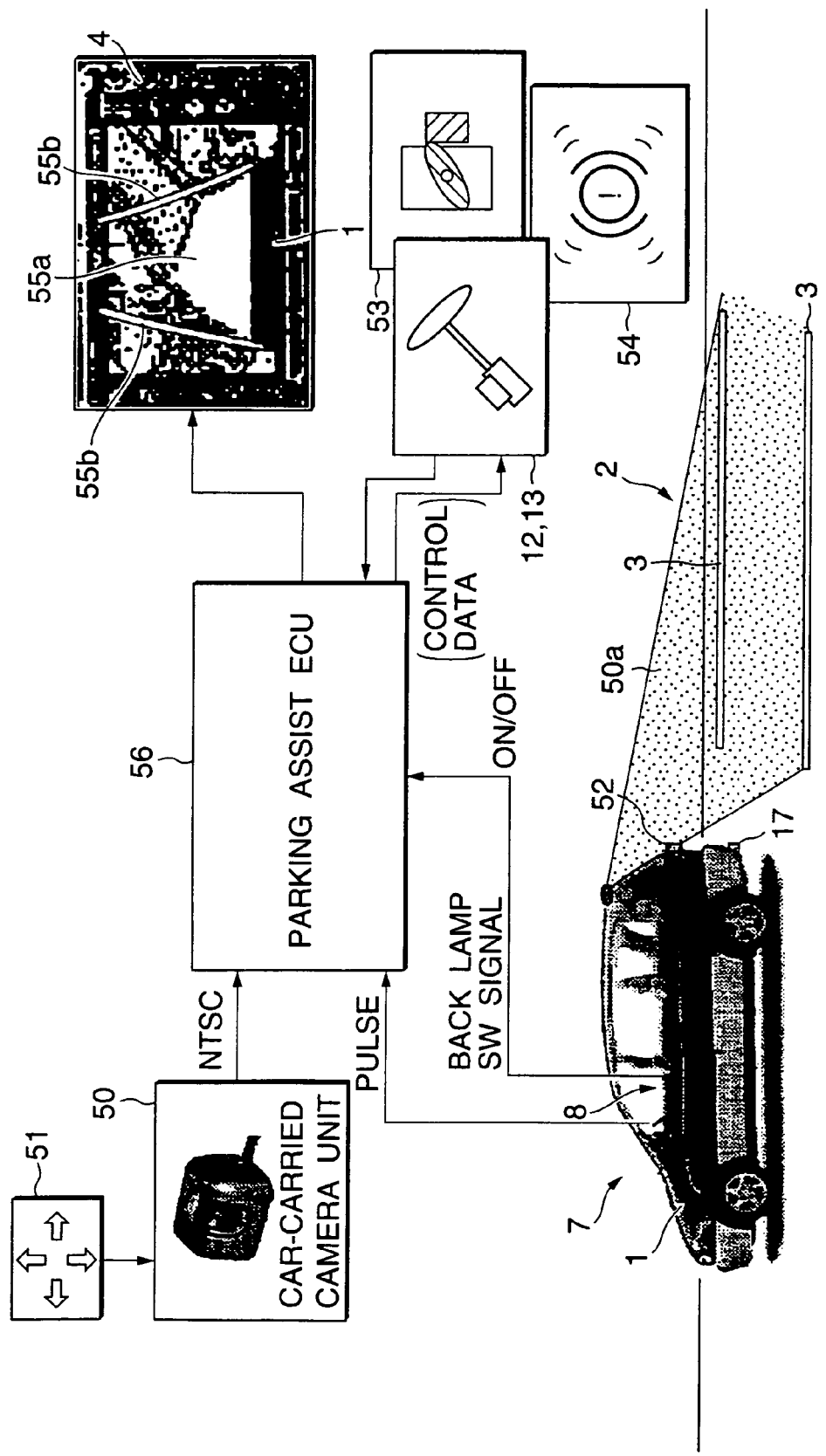
FIG. 8 is a block diagram showing a scheme of a vehicle parking assist device which is a second embodiment of the invention.

FIG. 8 shows a scheme of a vehicle parking assist device which is a second embodiment of the invention. In the figure, like or equivalent portions are designated by like reference numerals in the description of the first embodiment. A camera unit 50 used in the second embodiment is designed such that its field 50*a* is varied by use of a remote controller 51. The camera unit 50 is attached to the rear part of the vehicle 1. A back light 52 for illuminating an area covered by the field 50*a* of the camera unit 50 at night is also used. The back light 52 is directed to the field 50*a* of the camera unit 50 in accordance with a remote control of the camera unit 50 by the remote controller 51. In the embodiment, a smooth parking may be secured by executing a throttle control 53 and a brake control 54 by the parking assist ECU 6, in addition to the parking assist by use of the information display device 4. Parking assist information using a predictive traveling path curve 55*a* and guide lines 55*b* is displayed on the screen of the information display device 4.

A back light mounted on the vehicle 1 may be used for the back light 52. It is preferable that the back light 52 is optionally contained in the accessories of the camera unit 50. In particular when a mechanism to change the illumination direction is provided, optional use of it is easy. Where the illumination direction can be changed, the following advantage is obtained: when the shift lever 8 of the transmission is shifted to the reverse gear position, the back light 52 is turned downward to improve the visibility in a dark place, e.g., at night.

Figure 9:
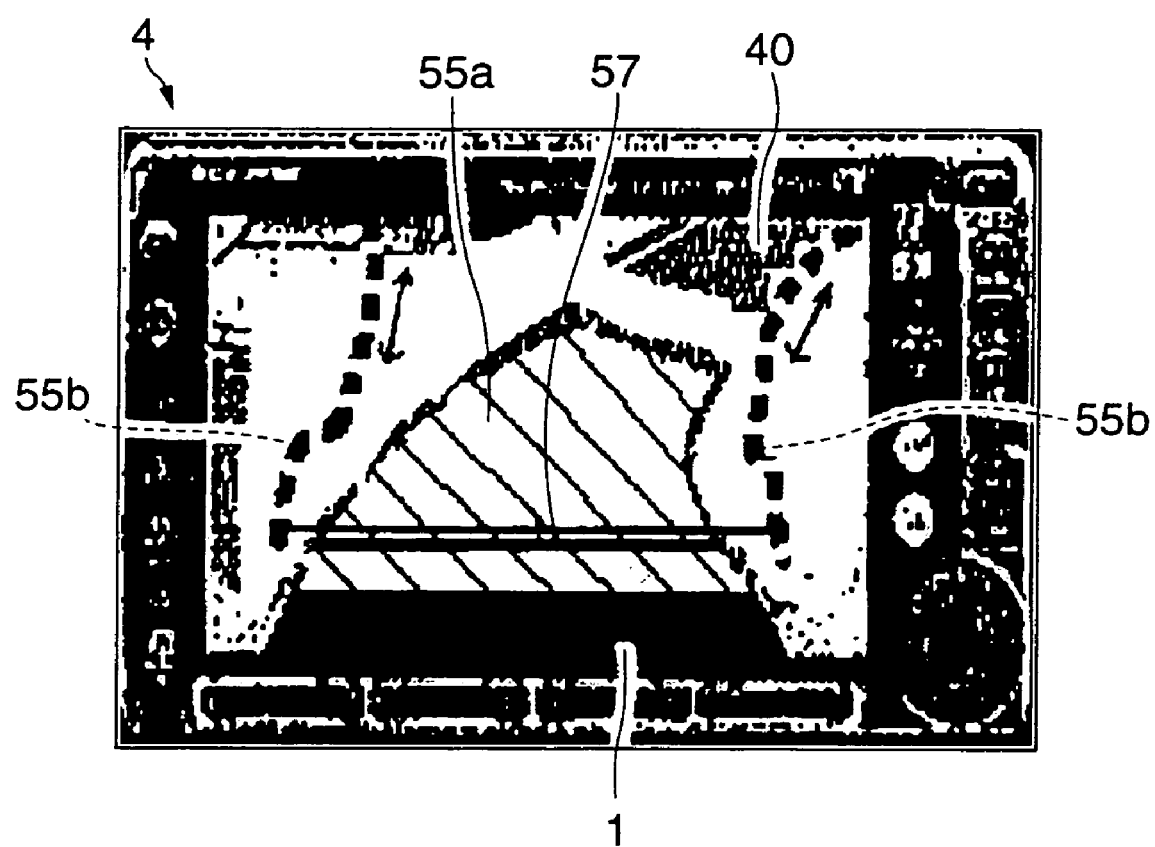
FIG. 9 is a diagram showing a parking assist display on the screen of the information display device 4 in the FIG. 8 embodiment.

FIG. 9 shows an image for a parking assist displayed in the FIG. 8 embodiment. In the embodiment, the guide lines 55*b* are curved in accordance with an image distortion by a wide angle camera. For a camera of the camera unit 50, a wide angle lens is used for securing a field 50*a* as wide as possible. In the backward image of the parking position 40 or the like, an actual straight portion is picked up as a curved image. Accordingly, the curving of the guide lines 55*b* in accordance with a distortion of the image of the guide lines 55*b* will ensure a more exact parking assist.

When a part, e.g., bumper, of the vehicle body of the vehicle 1 is contained in the field 50*a* of the camera unit 50, the vehicle body is more closer to this side, so that the body width of the vehicle 1 is larger than the distance between the guide lines 55*b* since the image is distorted. As for the predictive traveling path curve 55*a*, if it is displayed having the width equal to the vehicle width, when a part of the vehicle body is seen, the body width of the vehicle appears to be larger than the guide line distance in a region near the vehicle body, as in the case of the guide lines 55*b*. In the embodiment, when the predictive traveling path curve 55*a* and the guide lines 55*b* are displayed corresponding to the body width of the vehicle 1, the non-coincident portion near the body of the vehicle 1 is not displayed, and the driving for the non-coincident portion depends on the judgement of the driver.

For the non-coincident portion near the vehicle body, the predictive traveling path curve 55*a* and the guide lines 55*b* may be increased in width to be continuous to both sides of the vehicle body when those are displayed. Those widely displayed portions of the predictive traveling path curve 55*a* and the guide lines 55*b* are wider than the actual vehicle body. Accordingly, if another vehicle and an obstructive object are not present in those widened portions, a more reliable safety is secured.

As described, above, the vehicle 1 may be parked in the camera unit 50 in a state that the steering wheel is positioned at the center position when the guide lines 55*b* are parallel to the sides of a vehicle being parked at another parking position or while lines drawn in the parking position 40.

If the width of the guide lines 55*b* is wider than the body width of the vehicle 1, a parking assist for parking the vehicle 1 into the parking position 40 is easier to understand. For example, the width of the guide lines 55*b* is wider than the actual vehicle width by a fixed distance. The vehicle may be parked in a state that the steering wheel is set in a straight drive state in a manner that when the guide lines 55*b* lie on the white lines in the parking position 40, boundary lines between it and the adjacent parking positions, or the sides of the vehicles being already parked in the adjacent parking positions, the steering wheel is returned to the center position. Further, the width of the predictive traveling path curve 55 on the display may be selected in accordance with the conditions of the parking zone, which is daily used by the driver. In the case of the daily used parking zone, a certain fixed distance may be a distance value suitable for the parking position 40. When the parking zone is not fixed in use, the certain fixed distance is a minimum value necessary for the opening/closing of the door, and the going in and out, so as to secure a space allowing the driver to go out of the vehicle 1.

In FIG. 9, a line indicating a stop position 57 of the vehicle 1 is displayed on the guide lines 55*b* near the vehicle 1. In the backward image, a line is placed at a position apart from the rear end of the vehicle 1 by a fixed distance. And when the line or the like of the parking frame of the parking position 40 reaches that position, the vehicle is stopped. The fixed distance is preferably selected to have such a distance as to avoid the touching of that the bumper or the like of the rear end of the vehicle 1 with an obstructive object, the car stopper, or the like and to be as short as possible, in order that the vehicle may be parked in a narrow parking space.

Dotted lines are used to depict the guide lines 55*b* on the display so as to be less noticeable than the predictive traveling path curve 55*a*. In other words, the predictive traveling path curve 55*a* is intensified in brightness. As a result, an easy-tounderstand drive assist is provided to the driver. The length of the guide lines 55b may be varied while being interconnected in operation with the back sonar 17. In a specific example, the length of the guide lines 55b is reduced according to a level of an alarm issued when the back sonar 17 detects an obstructive object 47. As a result, the driver gains a reference in measuring the vehicle moving distance, and may have a drive assist of actual drive feeling.

Figure 10:
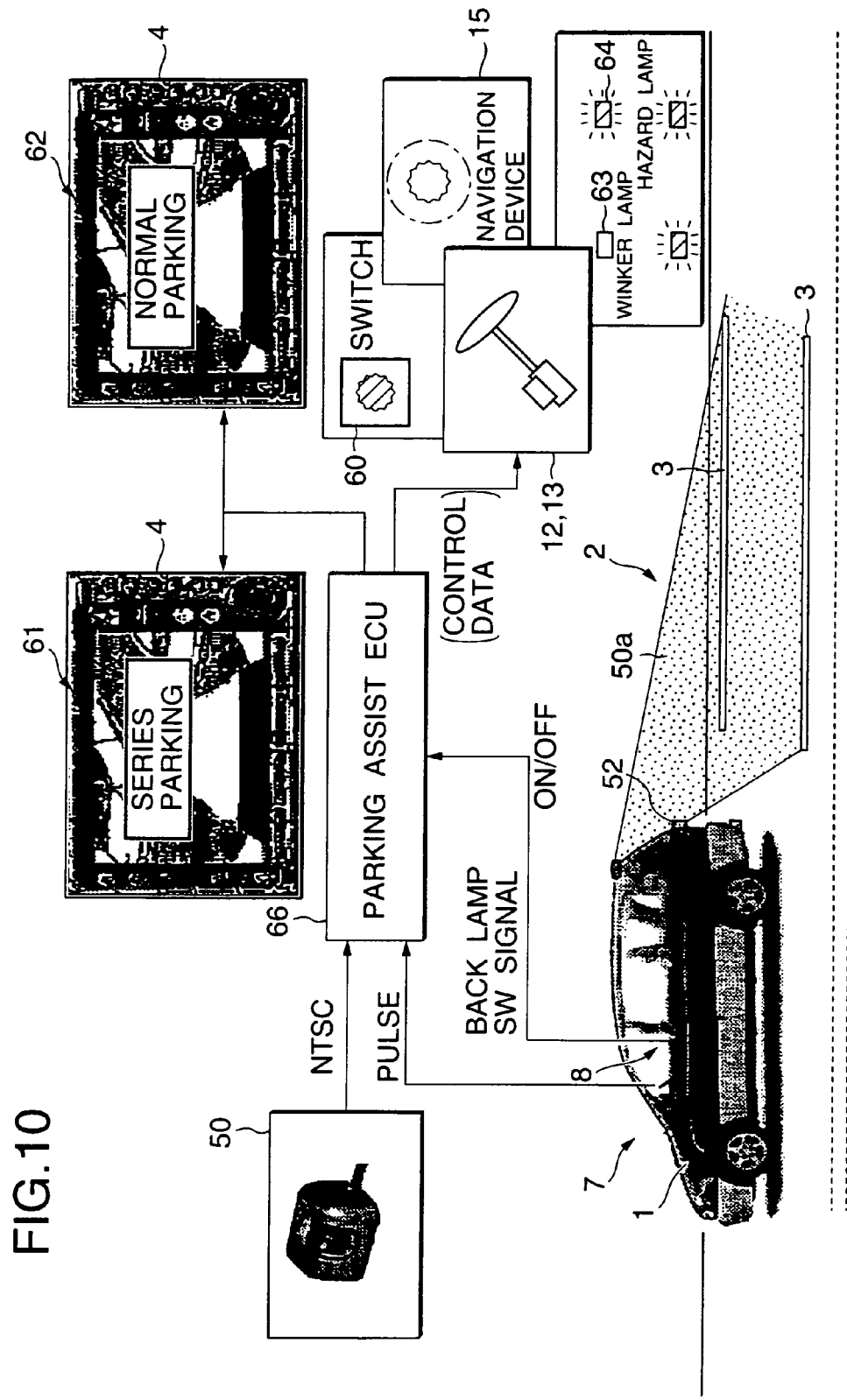
FIG. 10 is a block diagram showing a scheme of a vehicle parking assist device which is a second embodiment.

FIG. 10 shows a scheme of a vehicle parking assist device which is a third embodiment of the invention. In the embodiment, a plan model 60 is provided to select a series parking mode for a series parking assist 61 or a normal parking mode for a normal parking assist 62 on the screen of the information display device 4. In the normal parking mode, the field 50a of the camera unit 50 and the illumination by the back light 52 are directed mainly to the backward area of the vehicle 1. In the series parking mode, the field 50a of the camera unit 50 and the illumination by the back light 52 are directed to the side of the vehicle.

The series parking mode or the normal parking mode may be automatically selected. The series parking mode may be selected when the turning on of the winker lamp 63 or the hazard lamp 64 and the shifting of the shift lever 8 to the reverse gear position are simultaneously performed. In an alternative, the driver refers to map data about the present position of the vehicle 1, which is presented by the navigation device 15. When the present position of the vehicle is in the parking zone, the normal parking mode is selected. When it is on a road, the series parking mode is selected. In another alternative, a change of a steering angle of the steering wheel 7 is used to judge as to whether or not the parking mode is the series parking mode. In the series parking, it is frequent that the vehicle 1 is steered by a special steering operation, such as a reverse turn of the steering wheel. Typical steering patterns are stored into the storage memory 29. When the present steering pattern is coincident with any of the stored ones, the process judges that the series parking will be performed, and the process is designed such that the parking mode is automatically changed to the series parking mode.

Figure 11:
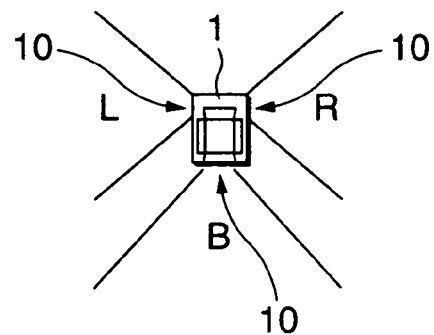
FIG. 11 is a plan view showing a plurality of camera units 10 disposed around a body of a vehicle 1, which is a fourth embodiment of the invention.

FIG. 11 is a diagram showing a fourth embodiment of the invention. In the embodiment, a plurality of camera units 10 are arranged around the body of a vehicle 1. Images output from those camera units 10 are simultaneously displayed on the same screen of the information display device. As shown, the camera units 10 are located at the front left L, the front right R and the back B of the vehicle 1. Each camera unit picks up a scene within the field 10a thereof.

Figure 12:
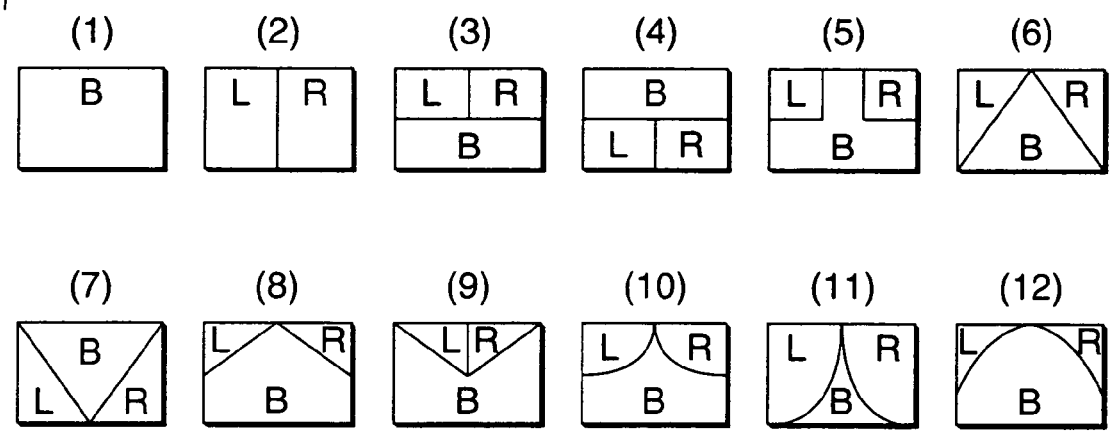
FIGS. 12(1) to 12(12) are diagrams exemplarily each showing segmented display areas on the screen of the information display device 4 in the FIG. 11 embodiment, images output from the camera units 10 being simultaneously displayed in those segmental areas.

Each of FIGS. 12(1) to 12(12) exemplarily shows segmented display areas formed by segmenting the screen of the information display device 4. The images output from the plurality of the camera units 10 are simultaneously displayed in those display areas, respectively. Where those areas are used, all the images may be watched on one screen. In the example of FIG. 12(1), the screen is segmented in a time divisional manner, and only the image of the backward area is displayed. The screen is automatically changed at fixed time intervals to display other images. The displays may be changed manually by the driver, but use of automatic change of displays is suggestible since troublesome work to change the displays is eliminated, as a matter of course.

In the example of FIG. 12(2), the screen is vertically segmented into two segmental display areas, right and left display areas. A front left image L and a front right image R are displayed in those display areas, respectively. In the example of FIG. 12(3), the screen is horizontally segmented into two display areas, the upper and lower display areas. The upper display area is further segmented into right and left display areas, a front left L and a front right R. An image of the back B is displayed in the lower segmental display area. The example of FIG. 12(4) corresponds to the vertically inverted FIG. 12(3) example. In the example of FIG. 12(5), images are displayed in the front left L and the front right R, which are located in the upper portion of the display area which displays an image of the back B.

In the example of FIG. 12(6), the center of the upper side of a screen and both ends of the lower side of the screen are connected by two straight lines, whereby the screen is segmented into three segmental display areas each shaped like a triangle. The front left L image is displayed in the upper left display area; the front right R image is displayed in the upper right display area; and the back B image is displayed in the remaining displayed area. In the example of FIG. 12(7), the center of the lower side of a screen and both ends of the upper side of the screen are connected by two straight lines, whereby the screen is segmented into three segmental display areas each shaped like a triangle. The front left L image is displayed in the lower left display area; the front right R image is displayed in the lower right display area; and the back B image is displayed in the remaining displayed area. The example of FIG. 12(8) resembles the example of the FIG. 12(6) except that the center of the upper side of the screen is connected to the center of the right and left sides of the screen by two straight lines. In the thus segmented screen, a display area in which the back B image is displayed is enlarged when comparing with the corresponding one in the FIG. 12(6) example. The example of FIG. 12(9) resembles the example of the FIG. 12(7) except that the center of the right and left sides of the screen are connected to the center of the screen area by two straight lines. Also in this segmentation, a display area in which the back B image is displayed is enlarged when comparing with the corresponding one in the FIG. 12(7) example.

The example of FIG. 12(10) resembles the example of the FIG. 12(8) except that the lines demarcating those segmental display areas are curved downwardly or toward the display area of the back B image. The example of FIG. 12(11) resembles the example of the FIG. 12(6) except that the lines demarcating those segmental display areas are curved downwardly. The example of FIG. 12(12) resembles the example of the FIG. 12(6) except that the lines demarcating those segmental display areas are curved upwardly.

While the screen of the information display device is segmented as shown in FIGS. 12(1) to 12(12) in the embodiment, it is readily understood that the screen may be segmented in other various ways. The display pattern is preferably changed in accordance with running conditions of the vehicle. Specifically, the display pattern is automatically selected in accordance with vehicle running conditions such that the display pattern of FIG. 12(2) containing two segmental display areas of the front left L and the front right R is selected for the normal running. For the backward running, any of the display patterns of FIGS. 12(3) to 12(12) each containing three segmental display areas of the front left L, front right R and back B is selected. If so done, the display will easily understood by the driver. Alternatively, the side image display may be combined with the front image display or the back image display in accordance with the turning on of the winker lamp 63 by operating the direction indicator and a steering angle of the steering wheel.

Figure 13:
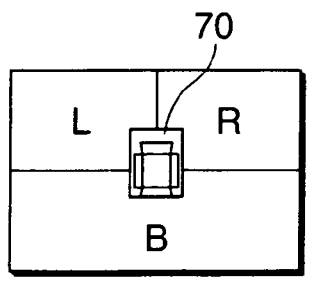
FIG. 13 is a diagram exemplarily showing segmental display areas on the display screen and a display containing a vehicle illustration 70 in the FIG. 11 embodiment.

In a display of FIG. 13, a vehicle illustration 70 is displayed on the display pattern of FIG. 12(3). The display clearly shows a relative position of the vehicle 1 to the images from the camera units 10. With presence of the vehicle illustration 70, the direction of the image is easy to understand.

Figures 14A, 14B, 14C, 14D:
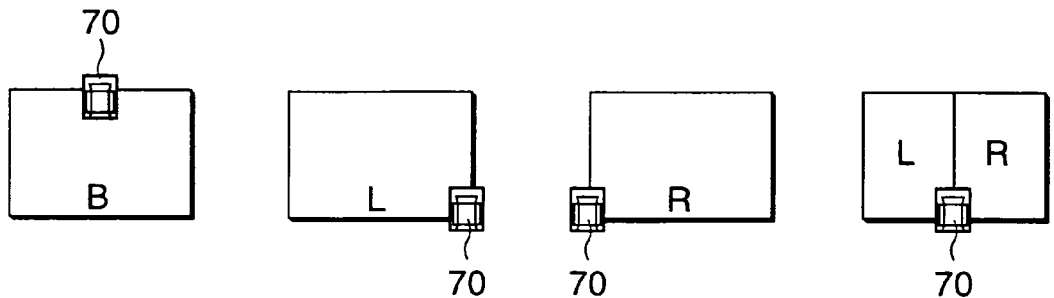
FIG. 14 is a diagram showing a state that a position of the vehicle illustration 70 is shifted in accordance with a camera image in the FIG. 11 embodiment.

It is preferable that, as shown in FIG. 14, a position of the vehicle illustration 70 is moved when the display pattern is changed to another. In the case of the time-divisional display pattern as shown in FIG. 12(1), as shown in FIGS. 14(1) to 13(3), the position of the vehicle illustration 70 is moved to the upper center, lower right and lower left positions on the screen in accordance with the images of the back B, front left L and front right R. If so done, the driver will easily understand which image is displayed. In the display pattern of FIG. 12(2), as shown in FIG. 14(4), the vehicle illustration 70 is moved to the center of the lower side of the screen. Accordingly, the driver will easily understand that the front left L and front right R images are displayed.

Figure 15:
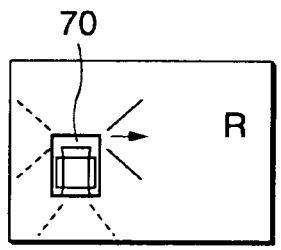
FIG. 15 is a diagram showing a vehicle illustration 70 and the direction and area of a camera image in the FIG. 11 embodiment.

In a display of FIG. 15, the vehicle illustration 70 is displayed together with a camera image direction 71 and a camera coverage 72. From this display, the driver will easily understand the camera unit 10 which picked up the image being displayed. Further, an orientation of the vehicle illustration 70 may be changed in accordance with a steering angle of the steering wheel 7. In this case, a relationship between the image and the advancing direction is readily seen.

Figure 16:
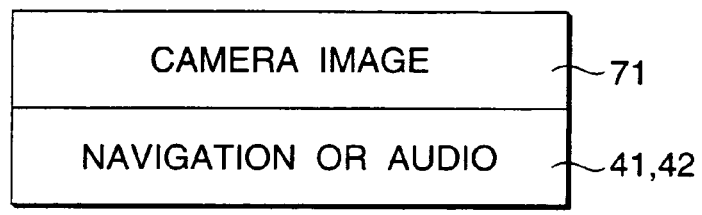
FIG. 16 is a diagram showing a camera image 71 being divided into a navigation display 41 and an audio display 42 in the FIG. 11 embodiment.

FIG. 16 shows a display pattern as shown in FIG. 12. In the display, a navigation display 41 by the navigation device 15 and an audio display 42 by the audio device 16 are both displayed on the same screen in a simplified fashion. This display fully utilizes the display screen of the information display device 4, and is capable of effectively providing information necessary for the driver of the vehicle 1 or the like.

Figure 17:
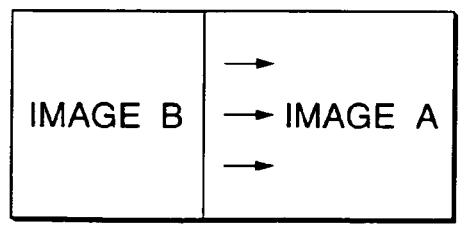
FIG. 17 is a diagram showing a state in which a plurality of image displays are changed one to another by a wipe method in the FIG. 11 embodiment.

FIG. 17 diagrammatically shows a change of a plurality of displays by the wipe method. In the display changing method, in a state that an image A is displayed on the entire screen of the information display device, the next image B starts to shift from the left side to the right side on the screen. Accordingly, a boundary line between the image B and the image A moves to the right, and finally the image B occupies the entire screen. When the image A covering the entire screen area is instantaneously changed to the image B, the driver is difficult to follow a display change. However, in the embodiment, the driver is easy to follow the display change since the embodiment uses the wipe method for changing the images from one to another. The display mode change by the wipe method is applicable to the display patterns of FIGS. 12(2) to 12(12), as a matter of course.

Figure 18:
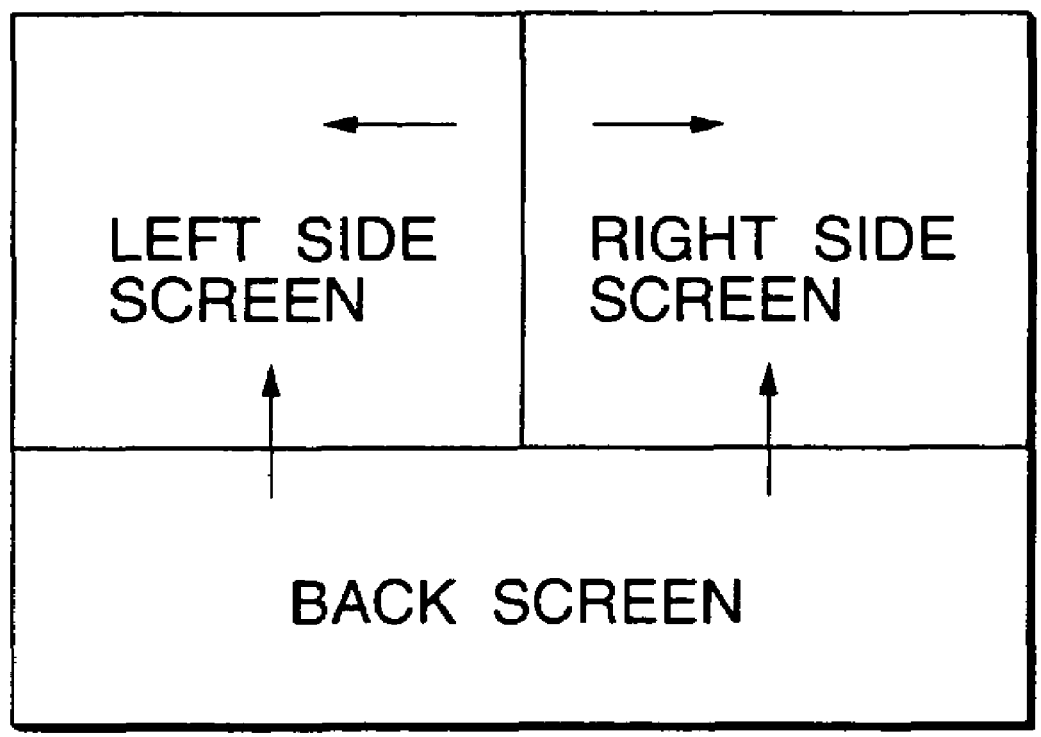
FIG. 18 is a diagram showing a segmented screen containing images in which segmental display areas and display positions are varied in accordance with a steering angle of a steering wheel.

FIG. 18 diagrammatically shows how to change a segmented area and a display position on a display pattern in accordance with a steering angle of the steering wheel by the wipe method. The display pattern of FIG. 12(3) is basically used. In the forward movement, the back B area is reduced. To turn to the left, the front left L area is increased, and to turn to the right, the front left R area is increased. In the backward movement, the back B area is increased. With this, the image existing in the advancing direction is displayed while being emphasized, thereby assisting a safety check.

Figure 19:
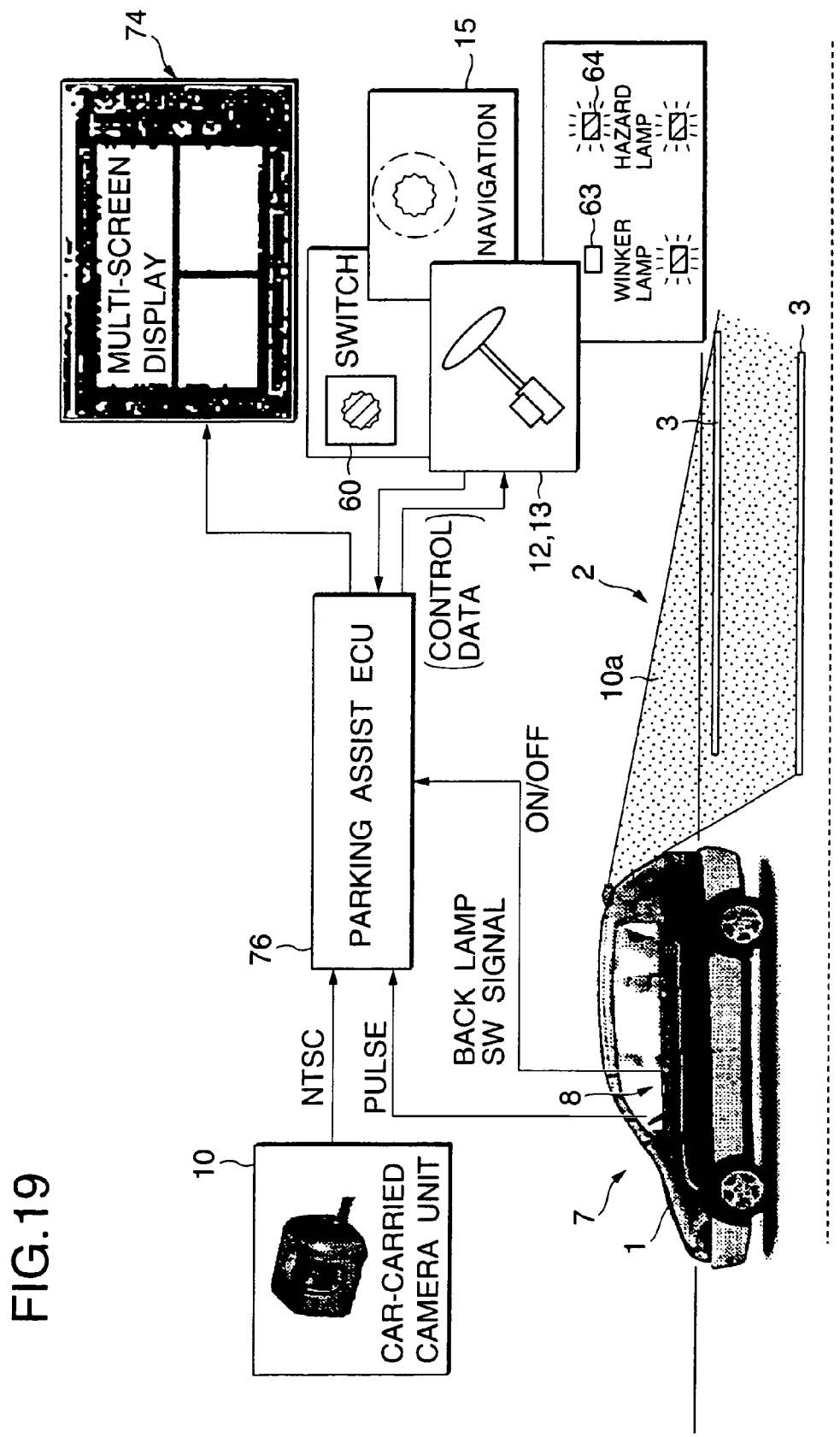
FIG. 19 is a block diagram showing a scheme of a vehicle parking assist device which is a fifth embodiment of the invention.

FIG. 19 shows a scheme of a vehicle parking assist device which is a fifth embodiment of the present invention. In the embodiment, a multi-window is employed for the display by the information display device 74. A touch panel is also employed. A parking assist ECU 76 detects an obstructive object 47 by an obstacle sensor, such as a back sonar 17 or a corner sensor 18. When the obstructive object 47 is detected, the parking assist ECU 76 informs the driver or the like of the presence of the obstructive object on the screen of the information display device.

FIGS. 20A to 20C show how to change an obstacle display by a information display device 74 in the embodiment. FIG. 20A shows a display pattern of multi-window presented in a normal running mode or a parking assist mode. When an obstructive object is detected, the display is changed to an obstacle display as shown in FIG. 20B or 20C. In the obstacle display shown in FIG. 20B, a direction of an obstructive object 77 by use of a vehicle illustration 70 and an arrow 78. When the obstructive object is detected, a color of the obstacle display may be changed to call the driver's attention. In an obstacle display shown in FIG. 20C, a display area for displaying an image of the camera unit 10 which picks up an obstructive object is increased relative to the other display areas. An easy-to-see display is presented.

FIGS. 21A and 21B show a drive assist in which a plurality of camera units 10 are disposed, and the images picked by the camera units 10 are seamlessly composed into a single image. Three camera units 10 are provided for picking up a picture of a backward area of the vehicle 1. The fields 10La, 10Ba and 10Ra of the camera units partially overlap with one another. FIG. 21B shows a display on the screen of the information display device 74 of the touch panel type as shown in FIG. 19. In the display, the images from three camera units 10L, 10B and 10R are seamlessly composed by expanding/reducing and cutting to form a continuous large image.

FIGS. 22A and 22B show a display containing the images of the entire circumferential area of the vehicle 1. As shown in FIG. 22A, six camera units 10F, 10FL, 10FR, 10B, 10BL, and 10BR are disposed around the vehicle 1 to pick up a scene of the entire circumferential area of the vehicle 1. The images from those camera units 10F, 10FL, 10FR, 10B, 10BL, and 10BR are composed and displayed on the screen of the information display device 74 as shown in FIG. 22B. The driver looks the display and makes a safety check on the entire circumferential area of the vehicle. Further, when coupled with the back sonar 17 or the corner sensor 18, it is possible to display an alarm telop or to change a color of the display corresponding to the direction in which the obstructive object is detected.

In the display patterns of FIGS. 21B and 22B, a multiple of images are displayed on the same screen simultaneously. Accordingly, one or a plurality of images may be selectively displayed. The selection may be performed by operating a switch by a driver or automatically performed in accordance with running conditions. Such a design as to continuously check a broad area by scrolling the display is possible. The information display device 74 allows the driver to enter instructions and the like through the touch panel. Specifically, the driver touches a desired image on the display of FIG. 21B or FIG. 22B, and enlarges the selected image. Accordingly, the driver checks a desired location in easy and prompt manner. It is preferable to return the promptly enlarged image to the original size. By so doing, the work by the driver to return the image size to the original one may be eliminated.

Figure 23:
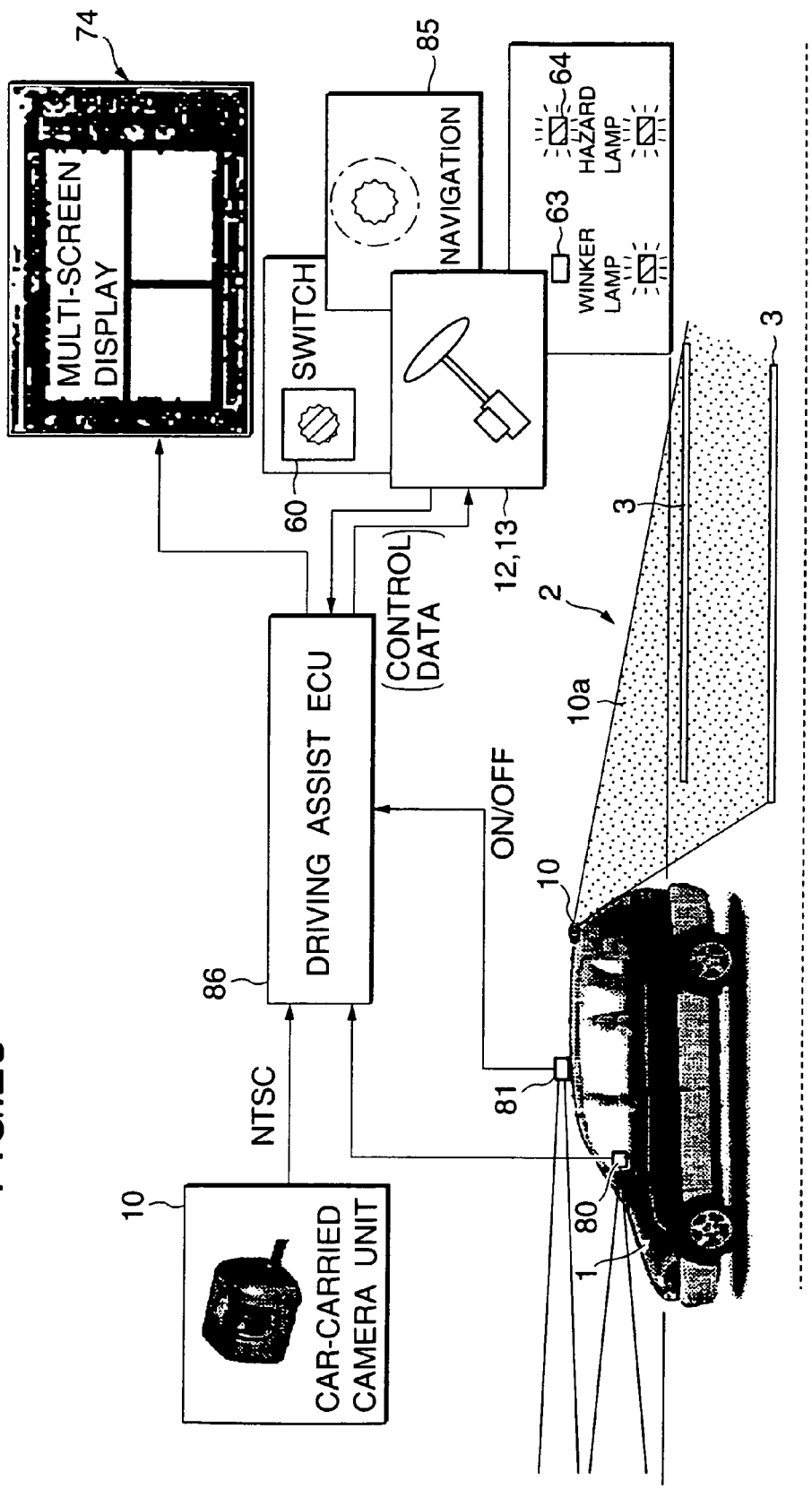
FIG. 23 is a block diagram showing a scheme of a vehicle parking assist device which is a seventh embodiment of the invention.

FIG. 23 shows a scheme of a vehicle parking assist device which is a seventh embodiment of the invention. In the embodiment, a front monitor camera 80 is attached to the front part of the body of the vehicle 1. A roof camera 81 is also attached to the roof as the highest part of the vehicle body. A parking assist ECU 84 has an arrangement substantially the same as of the parking assist ECU 6 shown in FIG. 3, and it carries out a drive assist process by the utilization of the front image picked up by the front monitor camera 80. A navigation device 85 includes a memory for storing an image of a scene of the front area of the vehicle, which is picked up by the front monitor camera 80. This may be utilized for detecting traffic congestion. The fetched image is wirelessly transmitted to a traffic control center located near a position where the vehicle 1 is located, by use of the navigation device 85. In this way, a broad drive assist is performed. The image picked up by the front monitor camera 80 is also displayed by the information display device 4, and the driver uses it to make a safety check.

The front monitor camera 80 may also be used for a camera for detecting the preceding vehicle. When a vehicle runs in front of the vehicle 1 when viewed in the advancing direction, a vehicle-to-vehicle distance long enough to avoid a rear-end collision must be secured. If the front monitor camera 80 has the function of the preceding-car detecting camera, the drive assist and preceding-car detecting functions are realized at low cost. The front monitor camera 80 may be used for a camera for monitoring a vehicle which forcibly runs to in front of the self vehicle. When another vehicle forcibly runs to in front of the vehicle 1, the driver must take a measure for prevent a rear-end collision. If the front monitor camera 80 has the function to monitor such an interruptive vehicle, the drive assist function and the function to detect the interruptive vehicle are realized at low cost.

The roof camera 81 picks up the front area scene from the vehicle roof as the highest position of the vehicle. When the vehicle 1 passes under an overhead bridge, the driver makes a check as to if the passing of the vehicle is permitted, when a height limit is provided. In this case, the driver judges if the vehicle passing infringes the height limit regulation, from a view of the upper limit portion where it will pass.

Figure 24A:
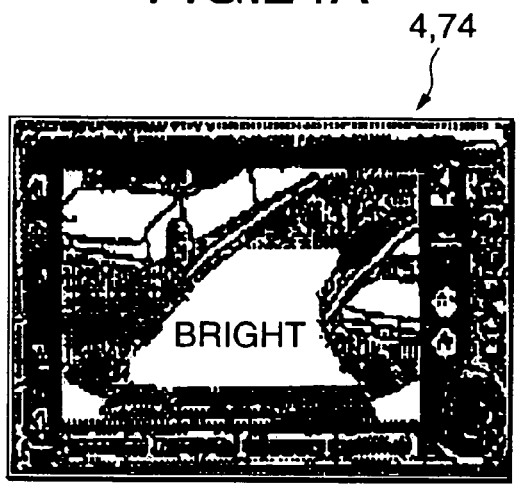
FIGS. 24A and 24B are diagrams showing displays on the screen of a information display device 4, 74 in which a brightness of the display in the forward movement of the vehicle is different from that of the display in the backward movement, in each of the embodiments.
Figure 24B:
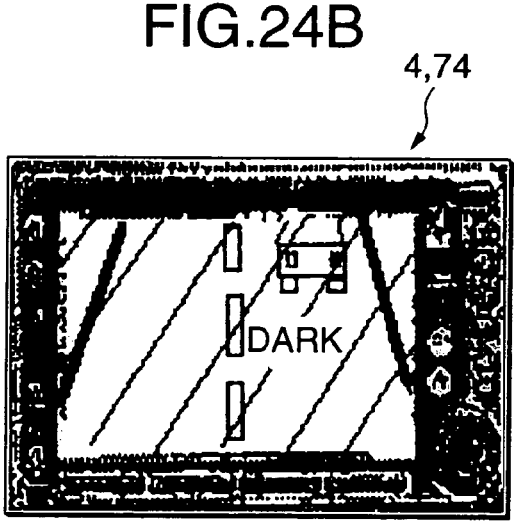

FIG. 24 shows displays when a brightness of the display by the information display device 4, 74 is changed between the forward movement and the backward movement in each embodiment. In the backward movement shown in FIG. 24A, the entire screen is bright to provide an easy check of the parking position 40 and the predictive traveling path curve 5a. 55a. In the normal running shown in FIG. 24B, the screen is relatively dark. In this case, the driver must watch the front area attentively, and it is better that the driver turns his attention out of the screen of the information display device. It is for this reason that the screen is set to be relatively dark. If the screen is relatively dark, it is easy to call driver's attention by changing the color of the screen to a bright color when such a situation occurs. In the backward running, the screen is bright so that the driver may watch the details.

Figure 25:
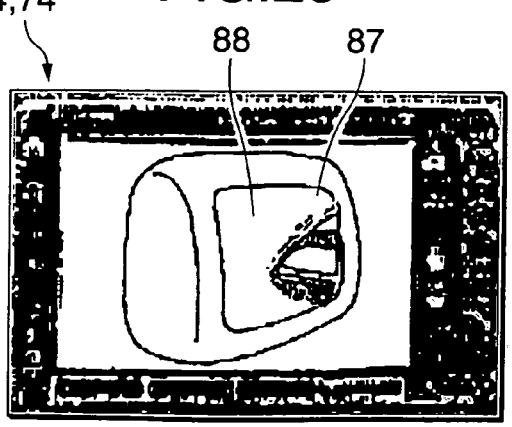
FIG. 25 is a diagram showing a backward area display presented within a display frame 87, which clearly shows the driver that the image being displayed is that of the backward area.

FIG. 25 shows a display containing a display frame 87 of a back mirror. From the display, the driver can easily understand a back image when the back image is displayed. The back image displayed within the display frame 87 is corrected to have a field angle of the back mirror, by a correction image processing of cutting, enlarging/reducing, whereby the display is transformed into a display fit to the driver's feeling of the image on the back mirror. In particular when a wide angle camera is used, this correction is needed since the driver hardly grasps the sense of distance because of the image distortion.

Figure 26:
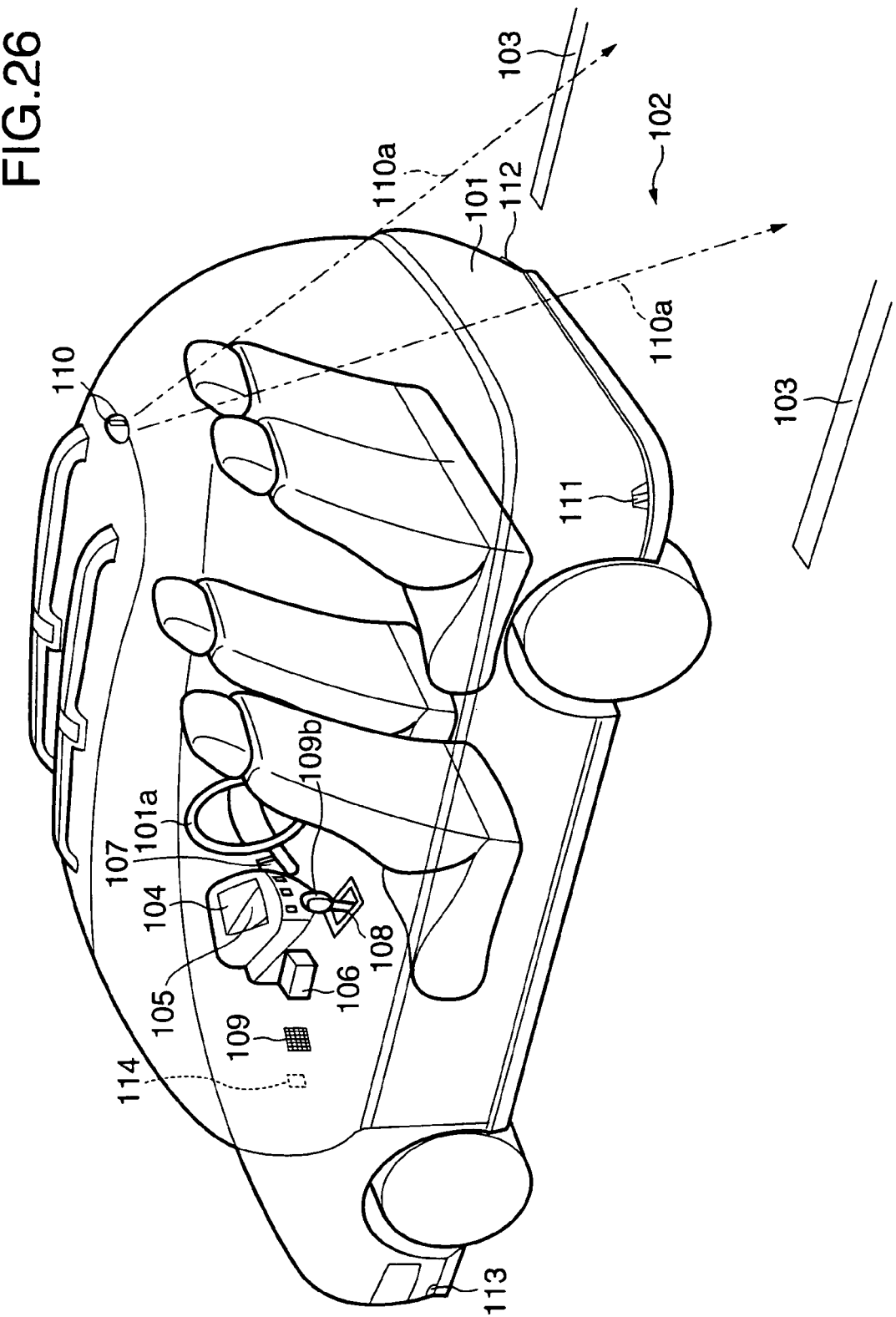
FIG. 26 is a block diagram showing a basic arrangement to carry out a parking assist in eighth to 11th embodiments of the present invention.

FIG. 26 shows a basic arrangement for a drive assist in eighth to 11th embodiments of the present invention. When a driver of a vehicle 101 moves backward his car to a parking zone 102 and parks the car there, a vehicle drive assist device visually presents an image of a dead space for the driver and assists the driver in his driving on the screen of an information display device 104. A backward area image of the vehicle and a predictive traveling path curve 105 are displayed so that the driver can correctly park the vehicle in a parking space marked off with white lines 103 or the like as a target. The information display device 104 may be a liquid crystal display device (LCD). The information display device 104 displays a drive assist image, which is generated by a parking assist ECU 106 as an electronic control unit (ECU) for drive assist. A steerage or steering angle of a steering wheel 107 is input to the parking assist ECU 106. In turn, the ECU 106 calculates a predictive traveling path curve 105 based on the steering angle, and the calculated predictive traveling path curve 105 is displayed on the screen of the information display device 104.

The parking assist ECU 106 starts the supplying of drive assist information in response to, for example, a shifting operation of a shift lever 108 of the transmission to an R position for backing the vehicle. The drive assist information is supplied in the form of image information by the information display device 104 and acoustic information by a speaker 109 as well.

A scene of a backward area of the vehicle 101 when the vehicle 101 backs is picked up by a camera unit 110. The camera unit 110 is installed at the rear part of the vehicle 101 so that its field 110a is directed to the road 102 when the vehicle 101 moves backward. Corner sensors 111, 112, 113 and 114 are provided around the vehicle 101, for example, at the four corners of the vehicle. Those sensors serve as obstacle sensors for detecting obstructive objects at the corners of the vehicle by using a ultrasonic wave.

Figure 27:
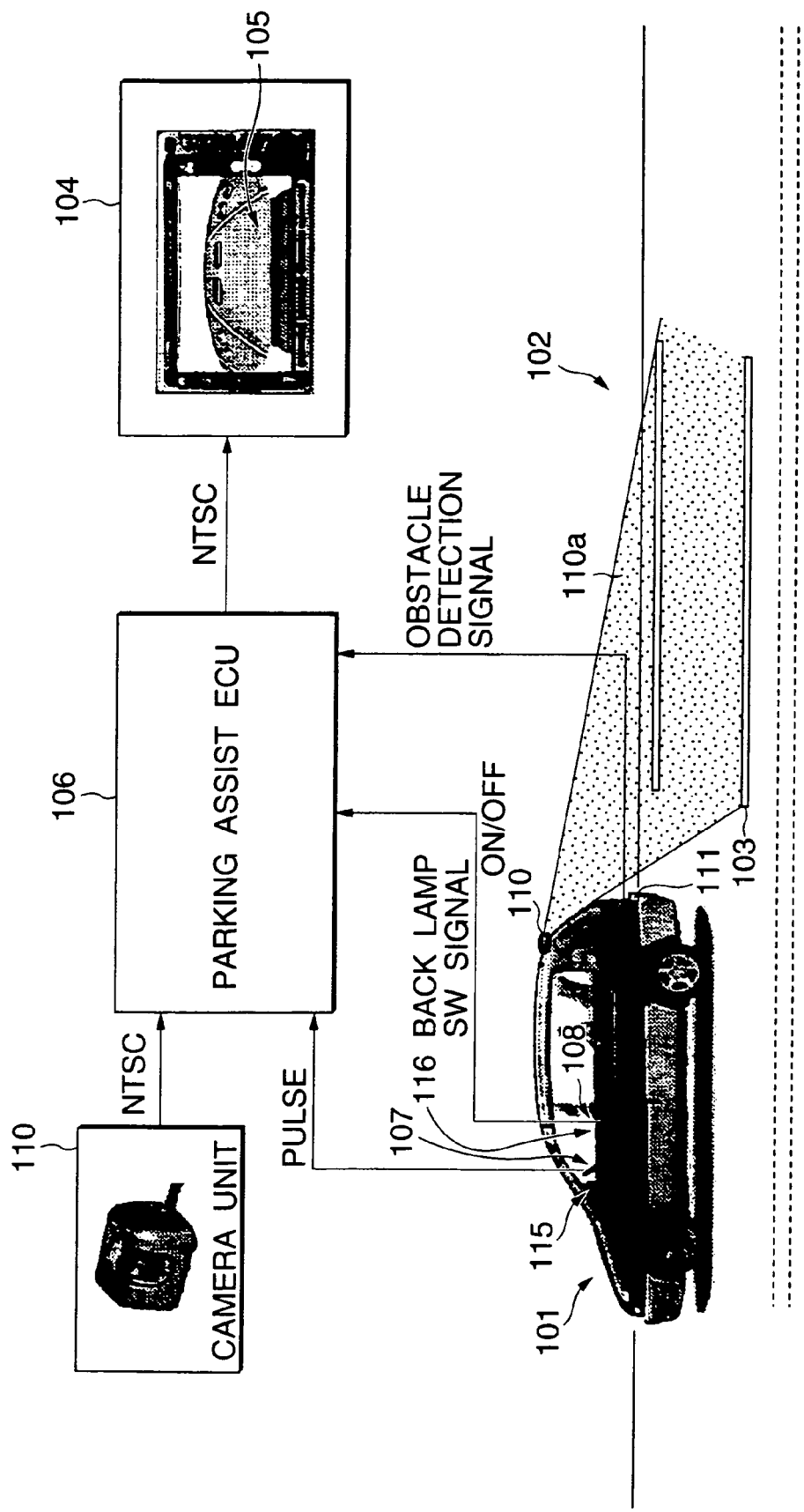
FIG. 27 is a diagram showing a state that a vehicle 101 backs to parking zone 102 and parks there.

FIG. 27 is a diagram showing a state that the vehicle 101 of FIG. 26 backs into a parking space indicated by the white lines 103 in the parking zone 102. The camera unit 110 mounted on the rear part of the vehicle 101 picks up a scene of an area within the field 110a. The area within the field 110a is so selected as to contain portions, which are each within a dead angle to the driver to the vehicle 101, as many as possible. A steering angle of the steering wheel 107 is detected by a steering angle sensor 115. A backward movement of the vehicle is detected as an on state of a back lamp SW signal 116 output from the transmission.

The parking assist ECU 106 responds to a video signal of the NTSC system from the camera unit 110, a pulse signal corresponding to a turn of a steering angle, which is output from the steering angle sensor 107, and a back-lamp SW signal 116 for driving a switch (SW) of a back lamp which is turned on when the vehicle backs, and displays a predictive traveling path curve 105 of the vehicle 101 and a three-dimensional image generated along the predictive traveling path curve 105 on the screen of the information display device 104, thereby making a parking assist.

Figure 28:
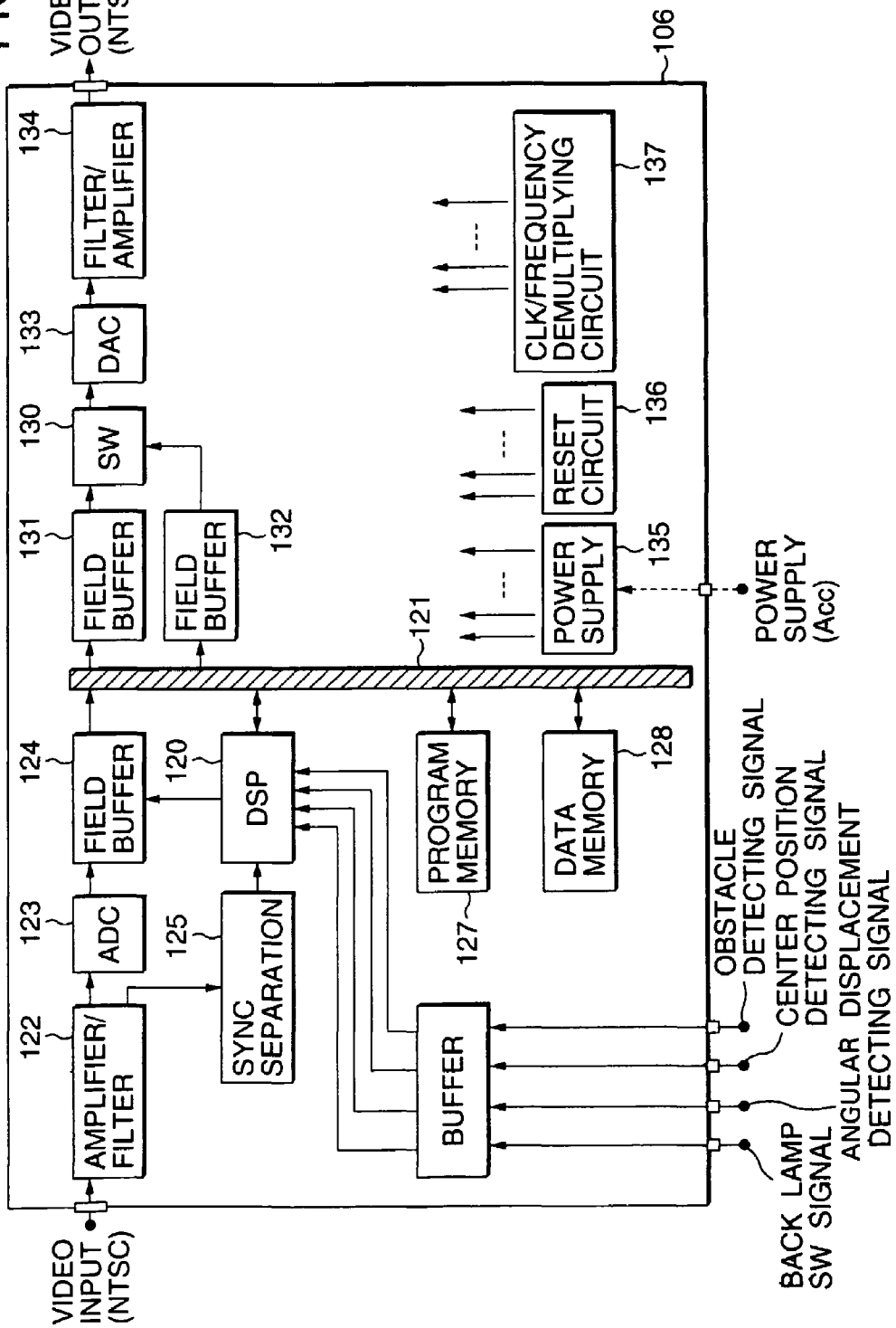
FIG. 28 is a block diagram showing an electrical arrangement of a parking assist ECU 106 in FIG. 26.

FIG. 28 electrically shows the innards of the parking assist ECU 106 shown in FIG. 26. The parking assist ECU 106 contains a digital signal processor (DSP) 120 for carrying out an overall control and calculations. Peripheral circuits are connected to the DSP 120 by a bus 121. A video signal from the camera unit 110 is input in the form of a composite video signal of the NTSC system to an amplifier/filter circuit 122. The amplifier/filter circuit 122 selectively amplifies an analog video component contained in the composite video signal. The output signal of the amplifier/filter circuit is applied to an analog to digital (ADC) 123 where its analog signal form is converted into a digital form. The thus digitized video signal is then stored into a field buffer circuit 124. The output signal of the amplifier/filter circuit 122 is also applied to a sync separation circuit 125 which in turn separates a horizontal sync signal and a vertical sync signal from the composite video signal. Those sync signals are input to the DSP 120. An angular displacement detect signal, output from the steering angle sensor 115, which represents a steering angle of the steering wheel 107, is input to the DSP 120 by way of a buffer circuit 126. A center position detect signal generated when the center position of the steering wheel 107 is detected is also input to the DSP 120 through the buffer circuit 126. Further, obstacle detect signals derived from the corner sensors 111 to 114, and a back lamp SW signal are also input the DSP 120, through the buffer circuit 126.

The DSP 120 operates in accordance with a program pre-stored in the program memory 127, which is connected thereto by the bus 121. Data necessary for an operation based on the program of the program memory 127 is stored in advance in a data memory 128. The DSP 120 carries out a recognition process of the white lines 103 and the like in response to the video signal input thereto, and calculations for generating a predictive traveling path curve 105 according to an angular displacement operation of the steering wheel 107. The generated image is stored into field buffers 131 and 132, either of which is selected according to an output signal of an SW circuit 130. Either of the field buffers 131 and 132 is selected by the SW circuit 130, and an output signal of the SW circuit is output as an NTSC video signal to the information display device 104, by way of a digital to analog converter (DAC) 133 and a filter/amplifier circuit 134. Electric power is supplied from a power supply 135 to the whole parking assist ECU 106. A reset circuit 136 supplies a reset signal to the parking assist ECU 106 to reset the latter to an initial state, and starts its operation according to the program. A CLK/frequency demultiplying circuit 137 supplies a clock signal defining a reference timing of the operation of the parking assist ECU 106, and signals formed by demultiplying a frequency of the clock signal.

Figure 29:
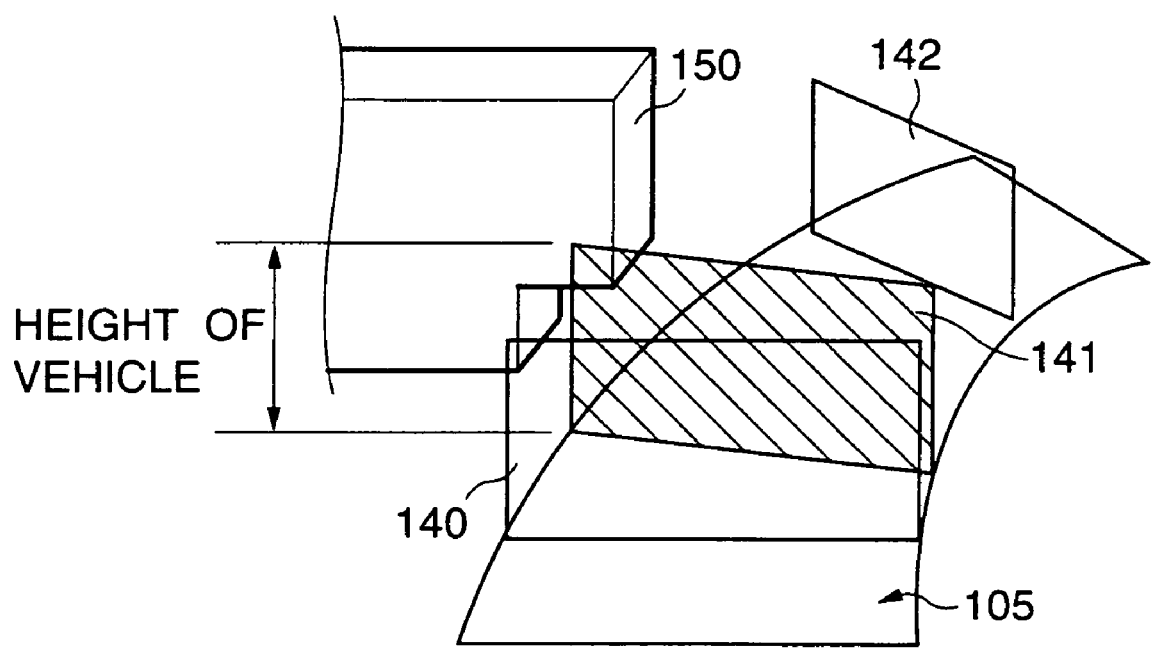
FIG. 29 is a diagram showing, in a simplified form, an image to be displayed by an information display device 104 in the parking assist of the eighth embodiment of the invention.

FIG. 29 is a diagram roughly showing a display of a parking assist image in the eighth embodiment of the invention. In the embodiment, rectangular planes 140, 141, 142, ..., which depends on the height of the vehicle, are arrayed at fixed distances (e.g., 1 m) along a predictive traveling path curve 105 in the display. Of those planes 140, 141, 142, ..., the plane a41 is based on a case where the vehicle approaches to an obstructive object sensed by the corner sensors 111 and 112 of the rear part of the vehicle, and it has a color different from those of other planes 140 and 142.

Figure 30:
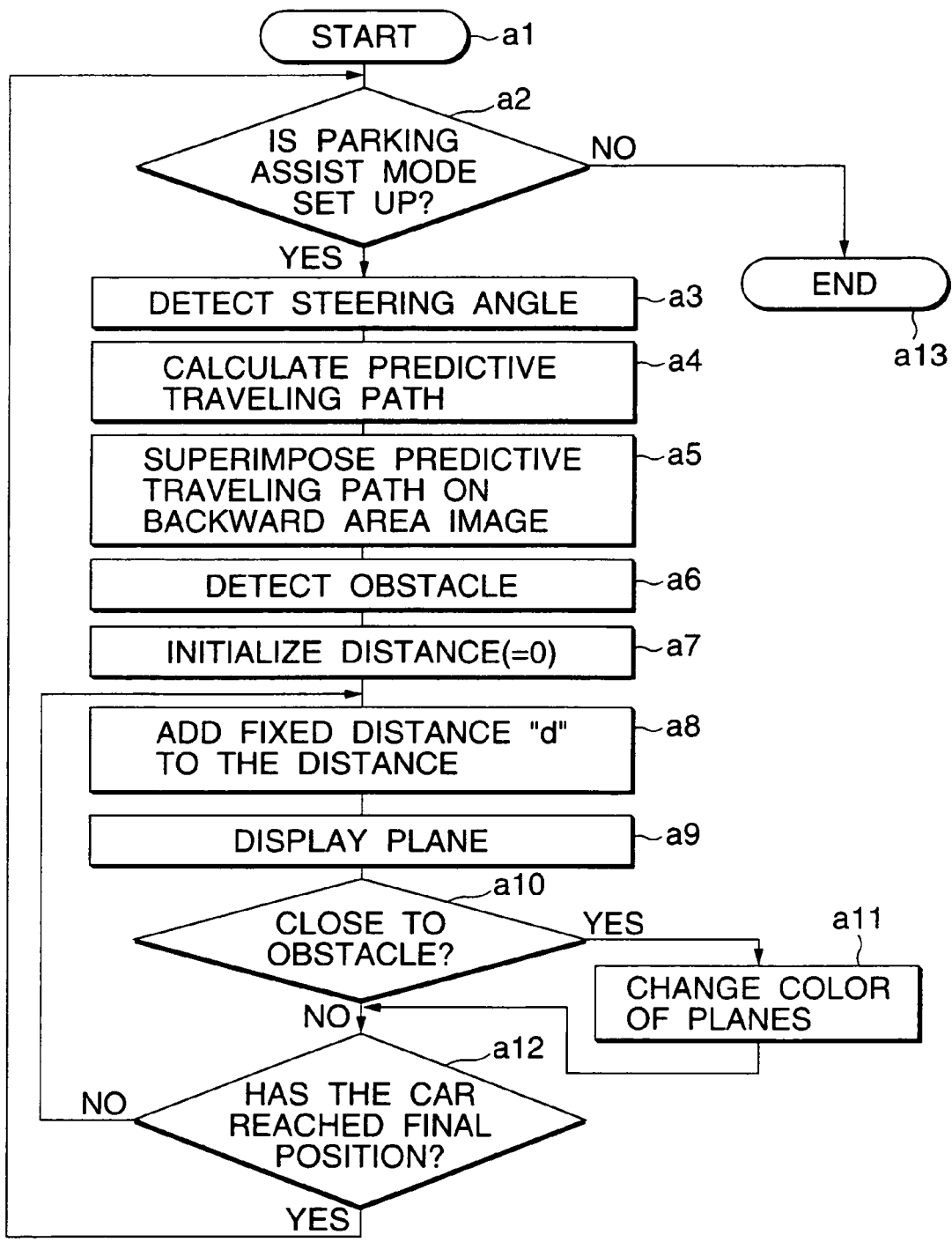
FIG. 30 is a flow chart showing a control procedure in the FIG. 29 embodiment.

FIG. 30 is a flow chart showing a drive assist procedure executed by the parking assist ECU 106 in the FIG. 29 embodiment. The drive assist procedure starts at a step a1. In a step a2, the parking assist ECU 106, more exactly DSP 120, checks if a parking assist mode is set up. When the back lamp SW signal 116 input thereto is in an on state, the DSP judges that the parking assist mode is set up. In a step a3, a steering angle is detected from an angular displacement detection signal of the steering angle sensor 115. In a step a4, a predictive traveling path curve 105 is calculated from a steering angle. In a step a5, the calculated predictive traveling path curve 105 is superimposed on the backward area image output from the camera unit 110. In a step a6, an obstacle detecting operation by the corner sensors 111 and 112 attached to the rear part of the vehicle is carried out. The corner sensors 111 and 112 radiate ultrasonic waves toward an obstructive object, and an obstructive object is detected on the basis of presence or absence of ultrasonic waves from the obstructive object. A distance from the vehicle to the obstructive object is measured on the basis of a time duration from an instant that the ultrasonic wave is transmitted till it is received. In a step a7, distances for presenting the planes 140, 141 and 142 as shown in FIG. 28 are initialized.

In a step a8, a fixed distance "d", e.g., 1 m is added to the distance. In a step a9, one of the rectangular planes 140, 141, 142, ... is displayed on the predictive traveling path curve corresponding to the distance. Those planes 140, 141, 142, ... are displayed vertical to the ground. A step a10 checks if the positions of the planes 140, 141, 142, ... are close to the position of the obstructive object 150 which is detected in the step a6. When the positions are close to the obstacle position, a step a11 changes the colors of the planes 140, 141, 142, ... to be displayed from those of the planes 140, 141, 142, ... at other positions to other ones. When those plane positions are not close to the obstacle position in the step a10, or when the color change in the step a11 is completed, a step a12 checks if the distance reaches the final position. The final position of the distance is set in advance. When the distance does not reach the final position, the DSP returns to the step a8 in its procedure execution. When the step a12 judges that the distance reaches the final position, the DSP returns to the step a2, and repeats a sequence of procedure steps a2 to a12.

When completing the parking operation by backing the vehicle, the driver shifts the shift lever 108 to a P position for parking. Accordingly, the back lamp SW signal 116 is in an off state, and the parking assist mode terminates. When the step a2 judges that the vehicle is not in the parking assist mode, the parking assist operation ends in a step a2.

Figure 31:
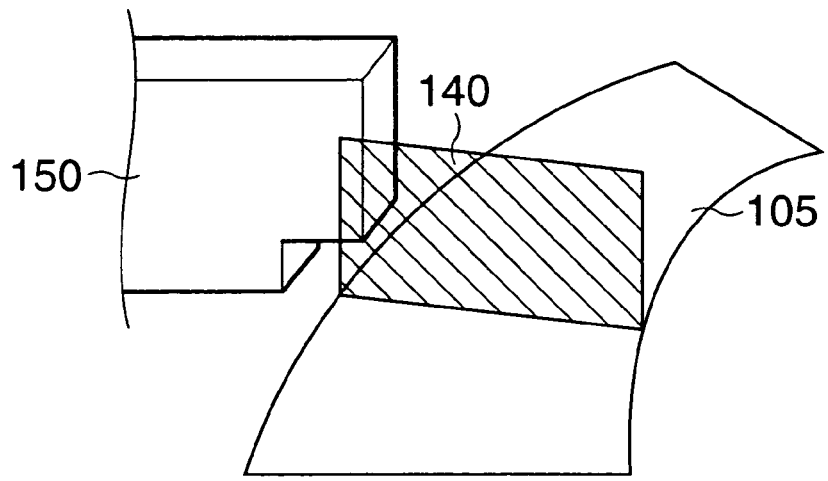
FIG. 31 is a diagram showing, in a simplified form, an image to be displayed by an information display device 104 in the parking assist of the ninth embodiment of the invention.

FIG. 31 is a diagram showing an image for parking assist which is the ninth embodiment of the invention. In this embodiment, a plane 140 displayed along the predictive traveling path curve 105 is displayed at a position where the obstructive object 150 is detected. The plane 140 is a rectangular in shape, and its height corresponds to the height of the vehicle 101. Therefore, the height of the vehicle 101 relative to the obstructive object 150 can be recognized, and hence the driver can check a possibility that his vehicle will touch the obstructive object 150 and a touching position when it touches the object.

Figure 32:
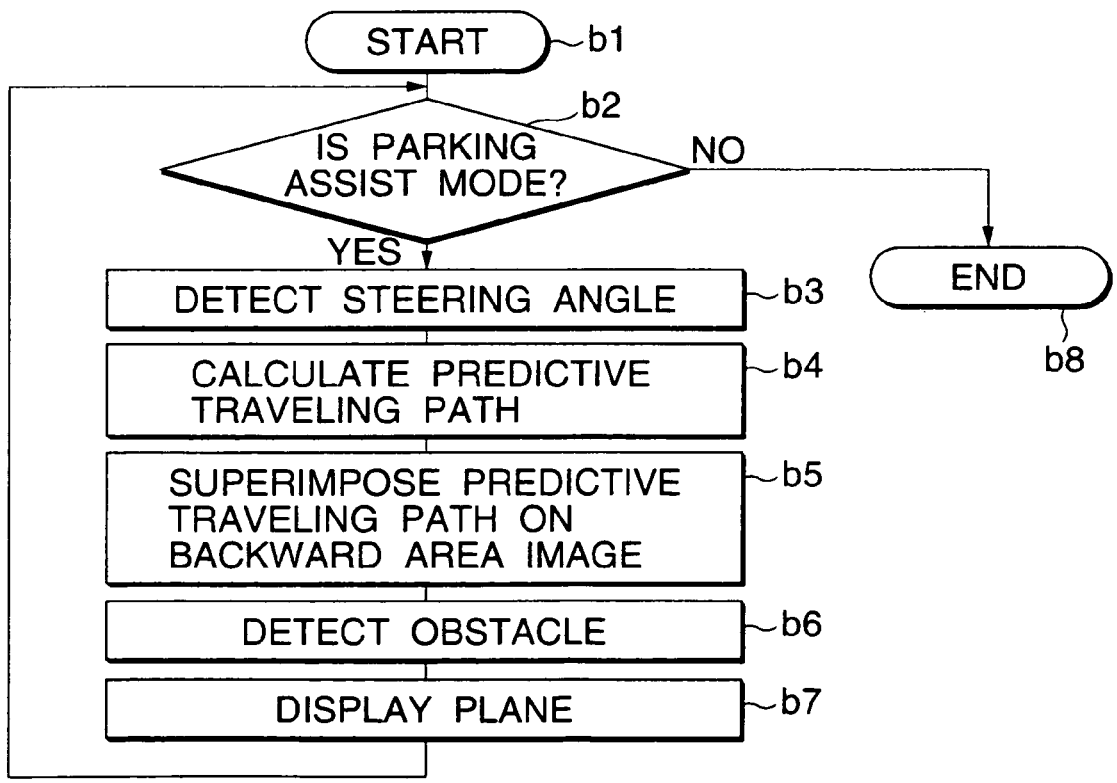
FIG. 32 is a flow chart showing a control procedure in the FIG. 31 embodiment.

FIG. 32 is a flow chart showing a control procedure executed by the parking assist ECU 106 in the FIG. 31 embodiment. The control procedure starts at a step b1. Steps b1 to b6 correspond to the steps a1 to a6 in FIG. 30. In a step b7, a plane 140 is displayed on the predictive traveling path curve 105 located close to the obstructive object 150 detected in the step b6. When the plane display in the step b7 ends, the DSP returns to the step b2 in its procedure execution, and repeats a sequence of the steps b2 to b7. When the step b2 judges that the parking assist mode ends, the DSP completes the procedure control in step b8.

Figure 33:
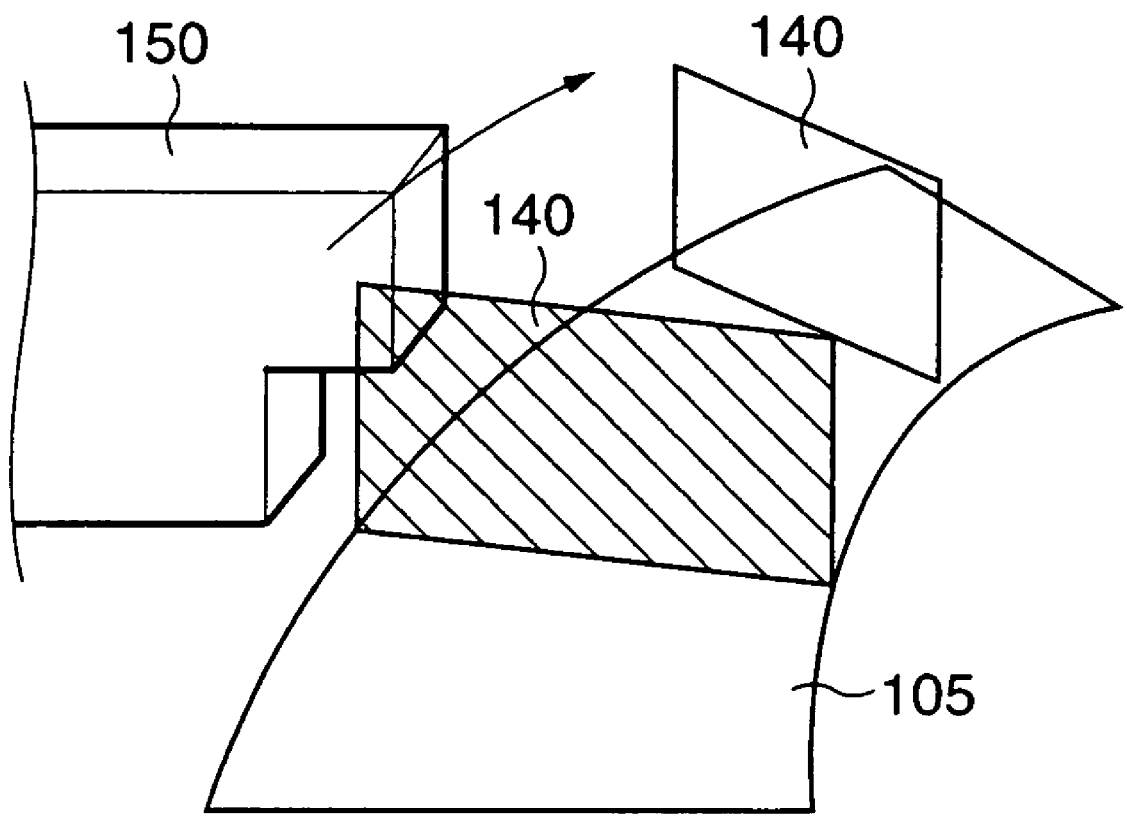
FIG. 33 is a diagram showing, in a simplified form, an image to be displayed by an information display device 104 in the parking assist of the tenth embodiment of the invention.

FIG. 33 is a diagram showing a parking assist image which forms the tenth embodiment of the invention. In the embodiment, the rectangular plane 140 of which the height corresponds to that of the vehicle moves along the predictive traveling path curve 105. The color of the plane 140 is changed at a position close to the obstructive object 150 from that of the plane at other positions. Also in the embodiment, the height of the vehicle 101 can be recognized, and a possibility of the backing vehicle with the obstructive object 150 in the parking space can be checked.

Figure 34:
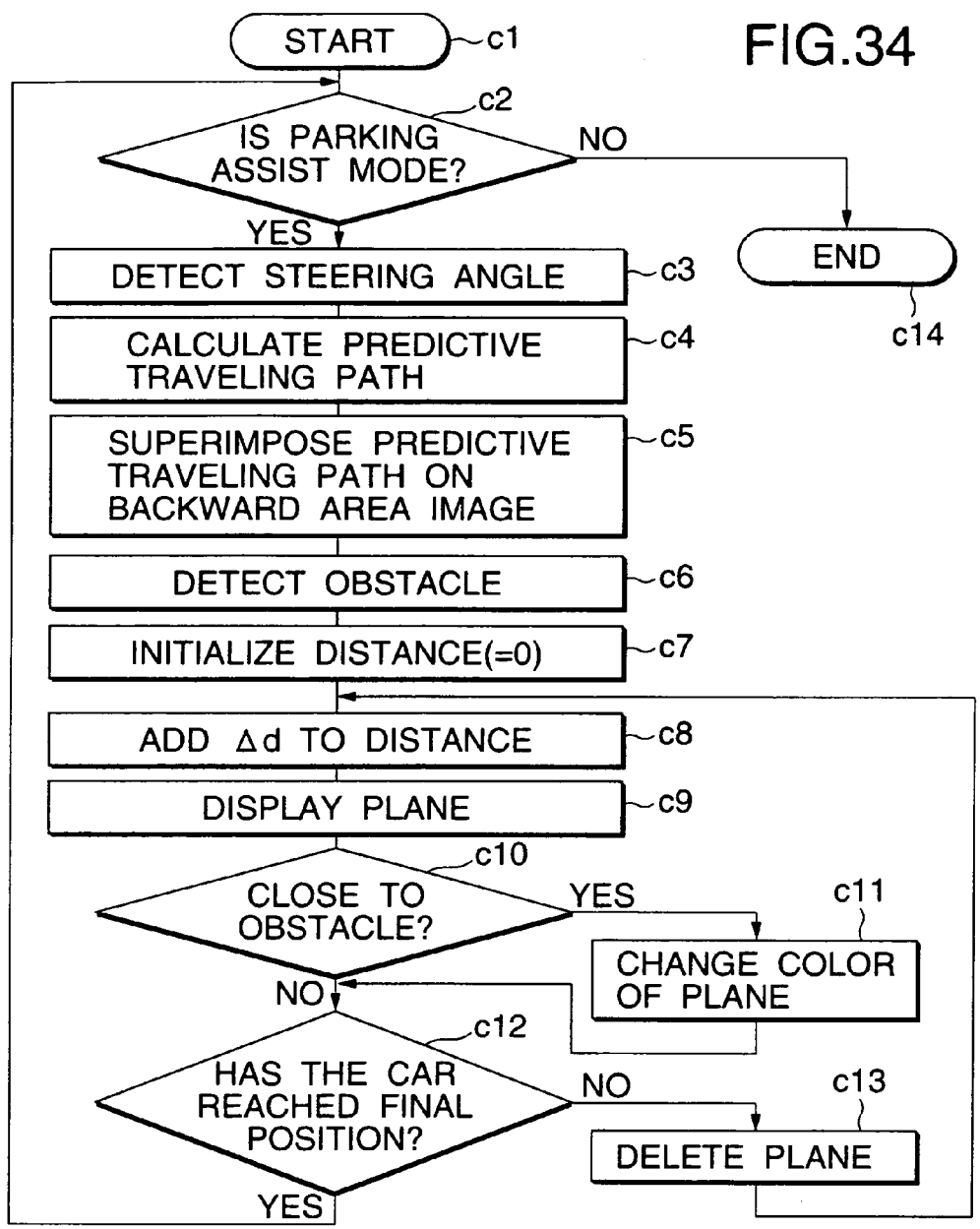
FIG. 34 is a flow chart showing a control procedure in the FIG. 33 embodiment.

FIG. 34 is a flow chart showing a control procedure of the parking assist ECU 106 in the FIG. 33 embodiment. The control procedure commences at a step c1. A control sequence from steps c1 to c7 is equivalent to the control sequence from the steps a1 to a7 in FIG. 32. In a step c8, a distance Δd as a distance unit of the plane 140 in the display is added to the distance. A value of the unit distance Δd is selected to be smaller than the fixed distance "d" in the FIG. 28 embodiment. In a step c9, a plane 140 is displayed at the distance position. A step c10 checks if the position at which the plane 140 is close to the obstructive object 150. When the answer is YES, a step c11 changes the color of the plane 140 to another color. When the answer is NO in the step c10, or when the color of the plane 140 is changed in the step c11, a step c12 checks if it reaches the final position. At this final position is equivalent to that judged in the step a12 in FIG. 30. In a step c13, the DSP deletes the plane 140 displayed in the step c13, and returns to the step c8.

Subsequently, the plane 140 is displayed every unit distance Δd, and is moved along the predictive traveling path curve 105 till a step c12 judges that it reaches the final position. When judgement is made such that the vehicle is close to the obstructive object 150 during its movement, the color of the plane 140 is changed. When the step c12 judges that it reaches the final position, the DSP returns to the step c2, and repeats a procedure sequence from the steps c2 to c13. When the step c2 judges that the parking assist mode ends, the control procedure ends in a step c14.

In the FIG. 33 embodiment, the color of the plane 140 is changed at a position near the obstructive object 150. If required, the plane 140 may be stopped at a position close to the obstructive object 150. The display of the plane 140 may be stopped in a manner that the movement of the plane 140 is stopped in the step c11 of FIG. 34, in place of the changing the color of the plane 140. In each of the FIGS. 29, 31 and 33 embodiments, one or more number of the rectangular planes 140, 141, 142, . . . which depend on the vehicle height. Alternatively, a projection plane of the vehicle may be displayed vertically to the ground. Where the projective plane of the vehicle is displayed, more practical check is made about the possibility of the touching of the vehicle with the obstructive object.

Figure 35:
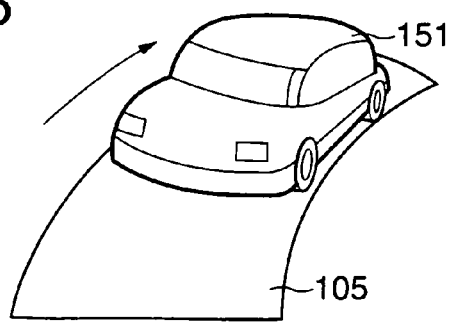
FIG. 35 is a diagram showing, in a simplified form, an image to be displayed by an information display device 104 in the parking assist of the eleventh embodiment of the invention.

FIG. 35 is a diagram showing a parking assist display as the 11th embodiment of the invention. In the embodiment, a backward moving vehicle 101 is illustrated in a 3-dimensional simulation. A simulation image 151 of the vehicle 101 is generated according to a configuration of the vehicle 101 stored in the data memory 128. When the parking assist display is used, the driver can check, in a simulation manner, a possibility that the vehicle will touch an obstructive object located near the parking space while moving the vehicle along the predictive traveling path curve 105.

Figure 36:
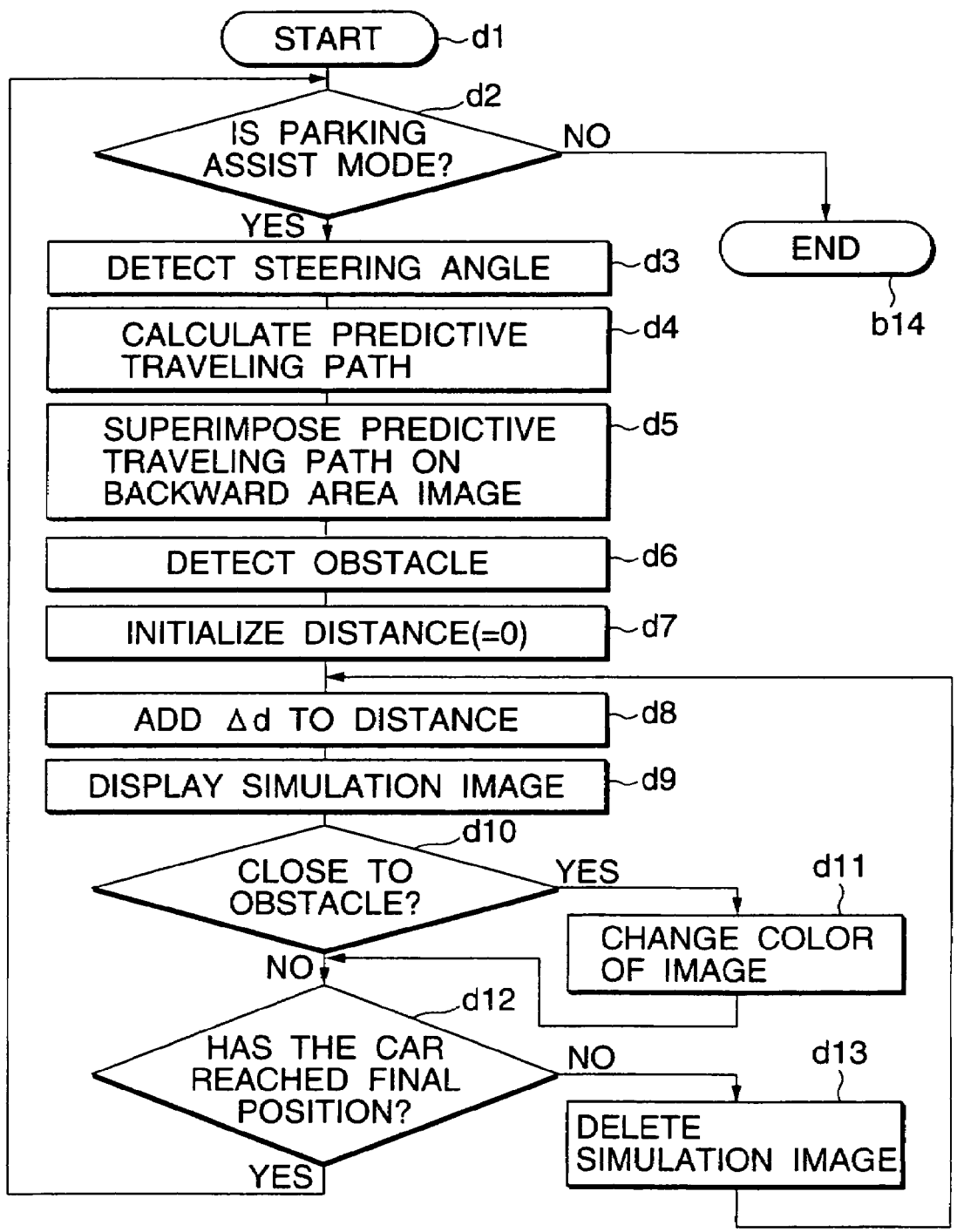
FIG. 36 is a flow chart showing a control procedure in the FIG. 35 embodiment.

FIG. 36 is a flow chart showing a control procedure of the parking assist ECU 106 for the FIG. 35 embodiment. The control procedure commences at a step d1, and a procedure sequence from steps d1 to d8 is equivalent to that from the steps c1 to c8 in FIG. 34. In a step d9, a simulation image 151 is displayed in place of the plane 140 in FIG. 30. A subsequent procedure sequence to a step d13 is equivalent to the sequence from the steps c9 to c13 in FIG. 34, except that the sequence is directed to the simulation image 151 in place of the plane 140.

In the embodiments described above, the corner sensors 111 and 112 are used for the obstacle sensors. Those sensors may be substituted by a back sonar using ultrasonic wave, a radar using electromagnetic wave or laser beam. An obstructive object may be extracted from the image picked up by the camera unit 110 by use of the image processing technique. In the embodiments, the colors of the planes 140, 141, 142, . . . and the simulation image 151 are changed at a position closer to the obstructive object 150. Instead of the color change, flashing may be used for distinguishing it from other positions.

While the parking assist has been described when the vehicle 101 is backed into the parking space, the same thing is correspondingly applied to the parking assist when the vehicle 101 is advanced into the parking space. It is evident that the technical idea of each embodiment may be applied to the parking assist when the vehicle travels in a path where the visibility is bad.

Figure 37:
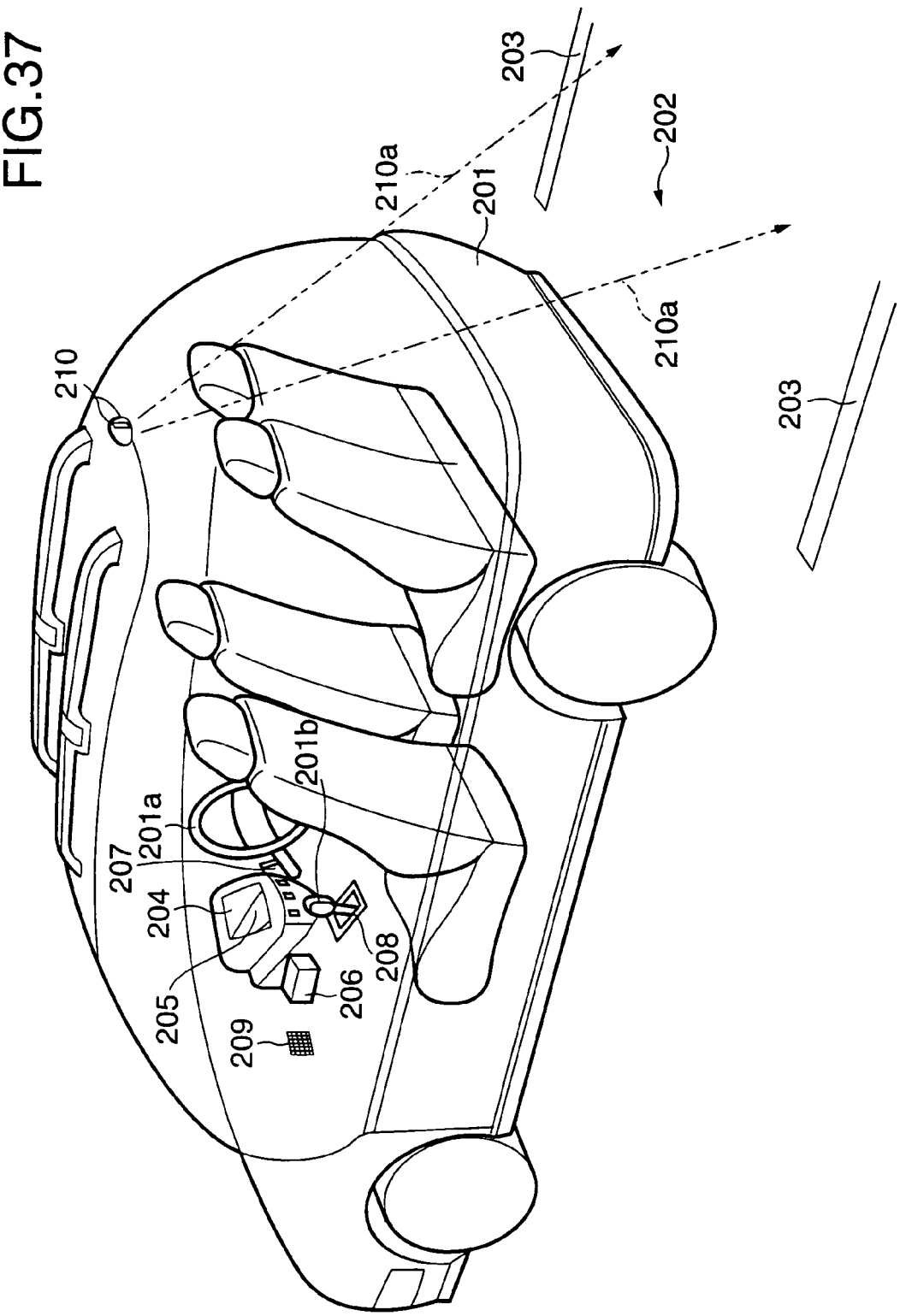
FIG. 37 is a block diagram schematically showing an arrangement of a vehicle drive assist device according to a 12th embodiment of the present invention.

FIG. 37 is a diagram showing a vehicle 201 under drive assist which is moving to a parking space in a 12th embodiment of the present invention. When the vehicle 201 backs to a parking zone 202 and is to be parked in a parking space marked off with white lines 203, image information for parking assist is displayed on the screen of an information display device 204. The parking assist image information contains a predictive traveling path curve 205 which is calculated on the basis of the prediction of a traveling path of the vehicle. The predictive traveling path curve 205 is calculated depending on a steerage or steering angle of a turn of a steering wheel 207 of the vehicle 201, by a parking assist ECU 206 as an electronic control unit for parking assist. The parking assist ECU 206 starts a control for drive assist when a shift lever 208 of the transmission is shifted to a reverse gear position, for example. A guide for parking assist in the parking operation is also acoustically carried out by use of a speaker 209.

When the driver backs his vehicle into a parking space, a backward area of the vehicle is the dead space when viewed from the driver of the vehicle 201 and hence he insufficiently sees the background area. To cope with this, a camera unit 210 is attached to the upper rear part of the body of the vehicle 201 so that its field 210a covers the parking zone 202 which forms a dead angle for the driver. A scene of the parking zone 202 is picked up by the camera unit and displayed on the screen of the information display device 204.

Figure 38:
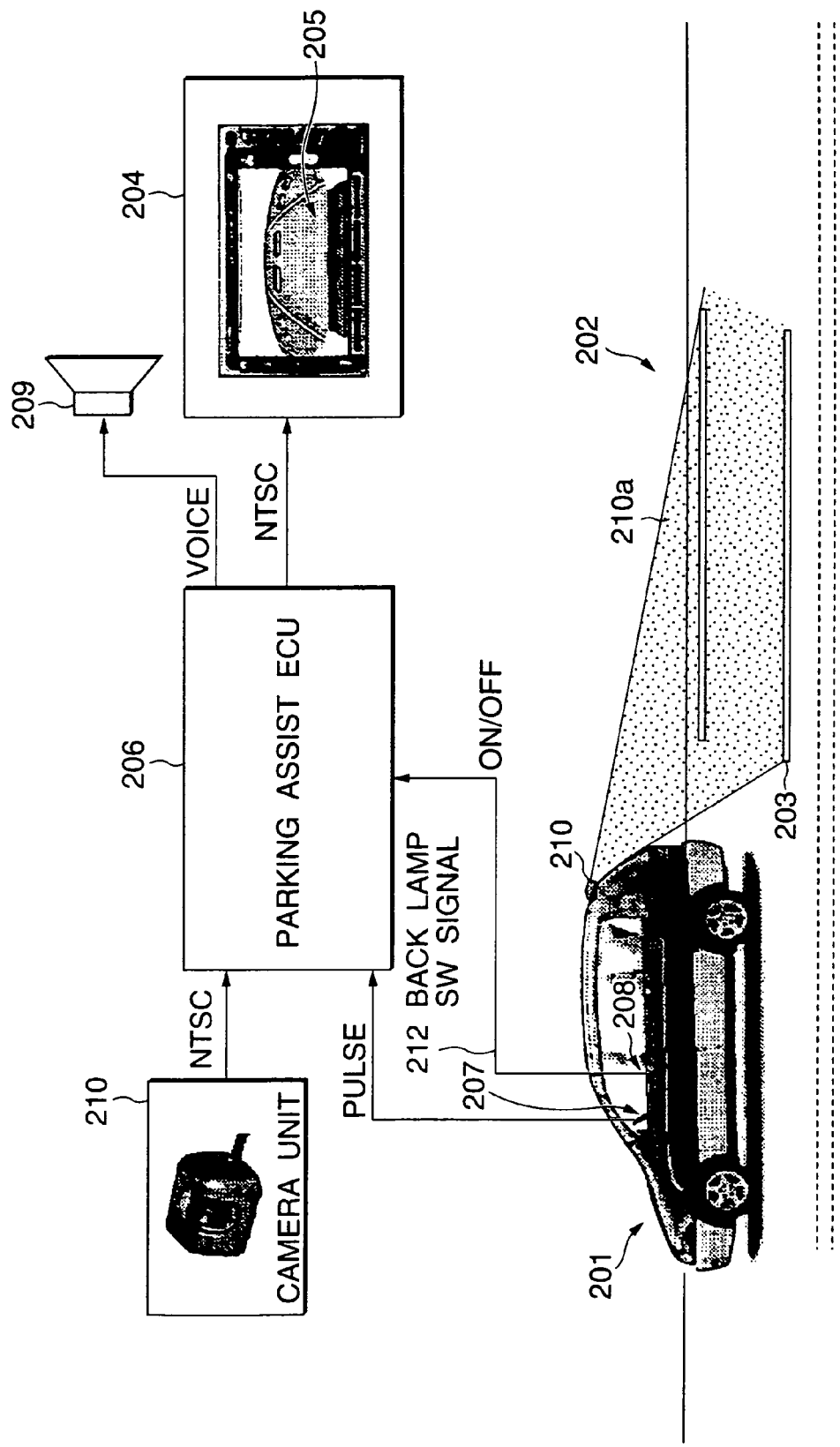
FIG. 38 is a diagram showing a state that by the utilization of the vehicle drive assist device of FIG. 37, the driver backs the vehicle 201 to a parking space marked off with white lines 203 and parks it there.

FIG. 38 is an electrical arrangement when the driver backs the vehicle 201 of FIG. 37 to the parking zone 202 and parks it there. A video signal of the NTSC type is input from the camera unit 210 to the parking assist ECU 206. A pulse signal is also input to the parking assist ECU every fixed steering angle, from a steering angle sensor 211 for detecting a steering angle of a steering wheel 207. When the shift lever 208 is shifted to the reverse gear position, a back-lamp SW signal 212 which turns on a switch (SW) to turn on a back lamp is produced and input to the parking assist ECU 206. When the back-lamp SW signal 212 is put to an on state, the parking assist ECU 206 starts a parking assist necessary for the vehicle to back into a parking space. In the parking assist operation, a predictive traveling path curve 205 which depends on a steering angle detected by the steering angle sensor 211 is calculated, and overlaid on the image of the backward area picked up by the camera unit 210 on the screen of the information display device 204.

Figure 39:
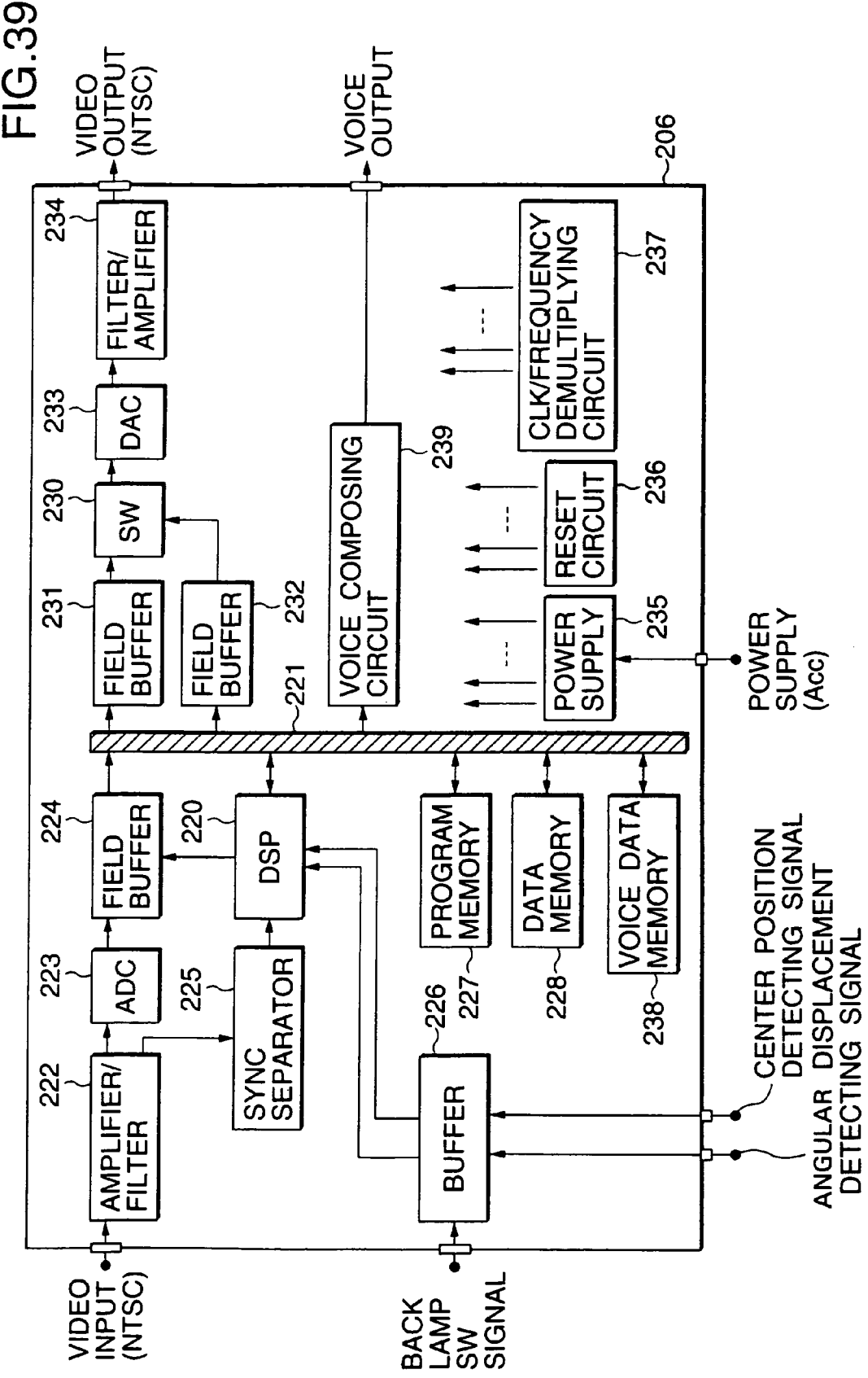
FIG. 39 is an electrical arrangement of the parking assist ECU 206 shown in FIG. 37.

FIG. 39 is an electrical arrangement of the parking assist ECU 206 shown in FIG. 37. In the parking assist ECU 206, an overall control is performed by a digital signal processor (DSP) 220. The DSP 220 performs controls and signal processings through a bus 221. The camera unit 210 inputs a video signals of the NTSC type to the parking assist ECU. The video signal is amplified by an amplifier/filter circuit 222. A signal form of the vide component signal is converted into a digital form by an digital converter (ADC) 223. The digitized video signal is stored in a field buffer circuit 224. The video signal is also applied from the amplifier/filter circuit 222 to a sync separation circuit 225. In the sync separation circuit, the horizontal and vertical sync signals are separated from the video signal and are input the DSP 220. An angular detect signal representative of an angular displacement of the steering wheel is applied to the DSP 220, from the steering angle sensor 211. A center position detect signal indicating that the steering wheel 207 is at the center position is also applied to the DSP 220, through the bus 221.

The DSP 220 operates in accordance with a program prestored in the program memory 227 connected thereto by way of the bus 221. Under control of the program, the DSP 220 carries out calculation processes and performs control operations, while referring to data preset in the data memory 228 and storing data produced during the calculation. The DSP 220 recognizes the white lines 203 shown in FIG. 37 in accordance with the video signal input thereto and generates an image of a predictive traveling path curve 205, which depends on a steering angle of the steering angle sensor 211.

The generated image is stored into field buffers 231 and 232 each of which is selected by a SW circuit 230. The image signal is selected by the SW circuit 230, and the selected one passes through a digital to analog converter (DAC) 233 and a filter/amplifier circuit 234, and goes as a video output signal to the information display device 204. Electric power is supplied from a power supply 235 to the whole parking assist ECU 206. The DSP 220 receives a reset signal to the DSP from a reset circuit 236, and a clock signal which defines a basic operation timing from a CLK/frequency demultiplying circuit 237 and signals having the frequencies produced by demultiplying the frequency of the clock signal.

The parking assist ECU 206 includes a voice data memory 238 and a voice composing circuit 239. With provision of those, the parking assist ECU 206 carries out a drive guide by a voice. To the voice guide, the DSP 220 selects voice data from those stored in the voice data memory 238 in accordance with guide contents, and applies the selected one to the voice composing circuit 239. The voice data applied to the voice composing circuit 239 is digital data encoded according to a predetermined encoding method. The voice composing circuit 239 decodes the voice data and converts it into an analog voice signal. The analog voice signal output from the voice composing circuit 239 is output in an acoustic form by a speaker 209, whereby the vehicle drive assist device acoustically assists the driver in his driving.

Figure 40:
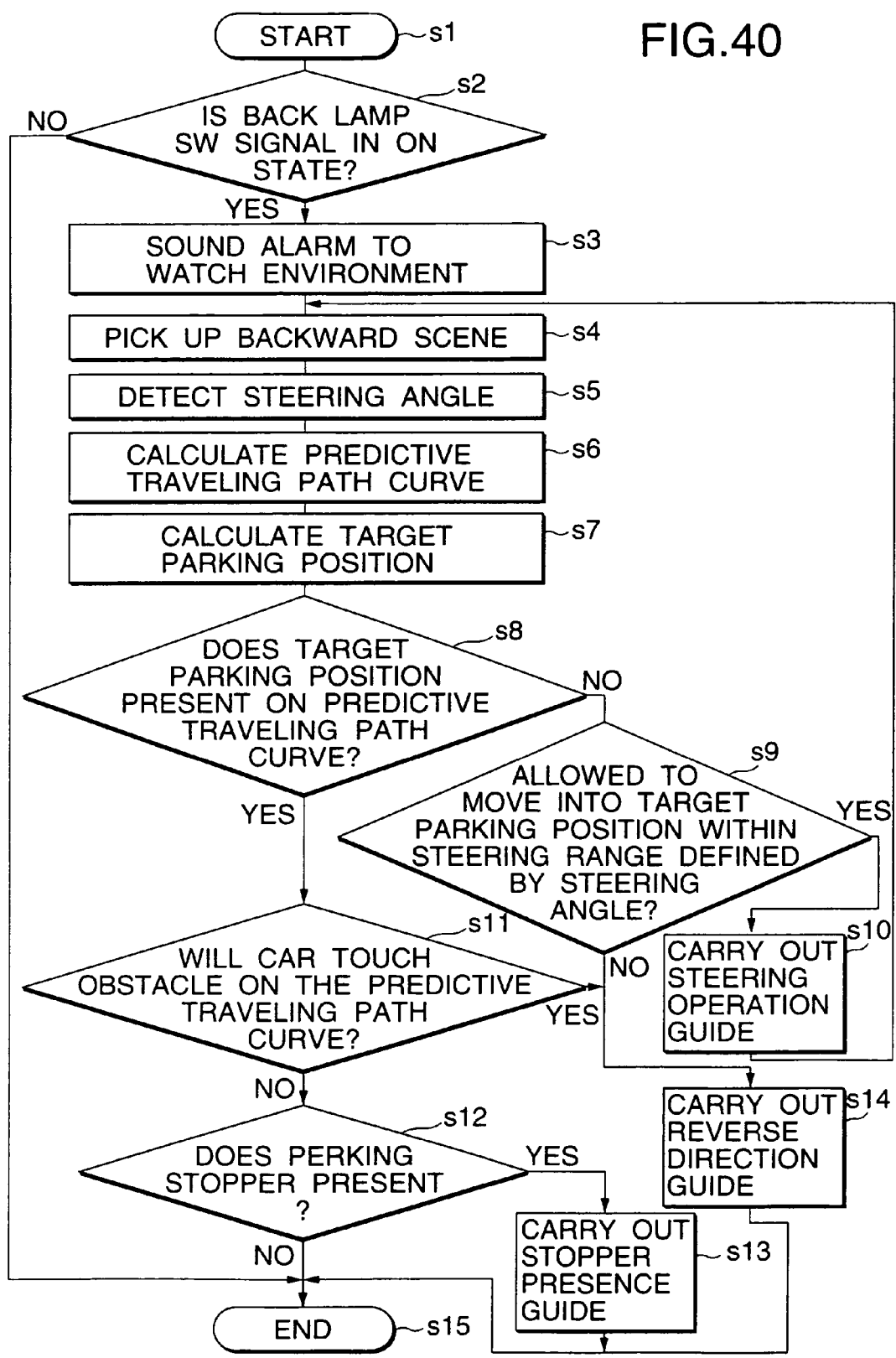
FIG. 40 is a flow chart showing a parking assist procedure, which is carried out by the parking assist ECU 206 in the 12th embodiment.

FIG. 40 is a flow chart showing a control procedure for parking assist, which is carried out by the parking assist ECU 206 in the 12th embodiment. The control procedure commences at a step a1. In a step s2, the parking assist ECU 206, more exactly the DSP 220, checks if a back-lamp SW signal 212 is in an on state. When the back-lamp SW signal 212 is in an on state in the step s2, a parking assist mode is started. In a step s3, an alarm of causing the driver to visually watch environmental conditions around the vehicle is issued acoustically. A backward area scene of the vehicle 201 is picked up by the camera unit 210 and displayed on the screen of the information display device 204. The driver is required to watch attentively the front and side areas of the vehicle 201, which are not displayed by the information display device 204. The acoustic alarm is given to prevent the driver to watch only the screen of the information display device 204. An example of the acoustic alarm is a sound message "Watch the environment in backing the car".

In the next step s4, the backward area image picked up by the camera unit 210 is displayed on the screen of the information display device 204, and in a step s5, a steering angle is detected by an angular displacement detect signal derived from the steering angle sensor 211. In a step s6, a predictive traveling path curve 205 is calculated depending on a steering angle detected, and is overlaid on the backward area image on the screen of the information display device 204. In a step s7, a target parking position is detected from the image picked up by the camera unit 210. It is required that the target parking position detected meets the conditions that it is the parking space marked off with the white lines 203, and that it has an area large enough to park the vehicle.

In a step s8, the DSP checks if the target parking position detected in the step s7 lies on the predictive traveling path curve, which is calculated in the step s6 depending on a steering angle detected in the step s5. When the target parking position is not on the predictive traveling path curve, a step s9 calculates a target traveling path from the present position to the target parking position. The DSP judges if a steering angle that will produce the target traveling path is within a range within which the steering wheel 207 may be turned, on the basis of a difference between the target traveling path and the actual predictive traveling path curve 205. When it is judged that the steering angle may be adjusted by varying the steering angle so as to satisfy the target traveling path, a step s10 carries out a steering guide about a direction and a angle of a turn of the steering wheel 207 on the basis of a steering angle calculated for matching an actual steering angle to the target traveling path. The steering guide may take the form of a display of character information, e.g., telop on the screen of the information display device 204 or a voice message "turn more to the right (left)". Following the step s10 of the steering guide, the DSP returns to the step s5 in execution of the control procedure. When the driver varies the steering angle, the drive assist for the steering guide is performed through a sequence of the steps s5 to s10 till the steering angle to produce the target traveling path is reached.

When the step s8 judges that the target parking position lies on the predictive traveling path curve, a step s11 judges that the vehicle will touch an obstructive object when the vehicle 201 backs along the predictive traveling path curve 205. When the vehicle does not touch the obstructive object, a step s12 judges if a parking stopper exists in the target parking position. If the stopper exists, a step s13 presents a guide that the stopper is preset by a display by the information display device 204 or by a voice. Thus, when the driver is informed of presence or absence of the parking stopper, he may refer to it in his braking operation when he backs the vehicle.

When the step s9 judges that the vehicle cannot run into the target parking position by the steering operation or when the step s11 judges that the vehicle will touch the obstructive object on the predictive traveling path curve, a step s14 presents a guide to reverse the advancing direction of the vehicle. The guide of reversing the advancing direction is given by a display by the information display device 204 or a voice. The guide is such that you cannot park the vehicle if the vehicle will be moved backward, and to park the vehicle, you must move the vehicle forward and reversely turn the steering wheel 207.

When the step s2 judges that the back-lamp SW signal 212 is not in an on state, when the step s12 judges that the parking stopper is not present, or when the guide ends in the step s13 or s14, the control procedure ends at a step s15. When the driver moves his vehicle forward after the step s14 of the advancing-direction reverse guide, the DSP continues the operation of detecting the target parking position on the backward area image, and calculates a target traveling path from the present position to the target parking position. The guide may be made to inform the driver of the timing of reversely turning the steering wheel 207 when it is confirmed that the time to produce the target traveling path at a steering angle through which the steering wheel 207 may be turned is reached and the vehicle does not touch the obstructive object on the target traveling path.

While the parking assist has been described for a case where the driver backs the vehicle into the parking zone 202, the parking assist may be correspondingly applied to a case where the vehicle 201 moves forward into the parking lot. In this case, a scene of the forward area of the vehicle is picked up, and a target parking position is detected. In the 12th embodiment mentioned above, the steering guide, stopper presence/absence guide and the advancing-direction guide are carried out in the steps s10, 13 and 14, respectively. If occasion demands, one of those guides or a combination of them may selectively be used.

While a display by the information display device 204 and a voice by the speaker 209 are both used for the guide for the parking assist in the 12th embodiment mentioned above, one of the visual and acoustic guides may be used, as a matter of course.

Figure 41:
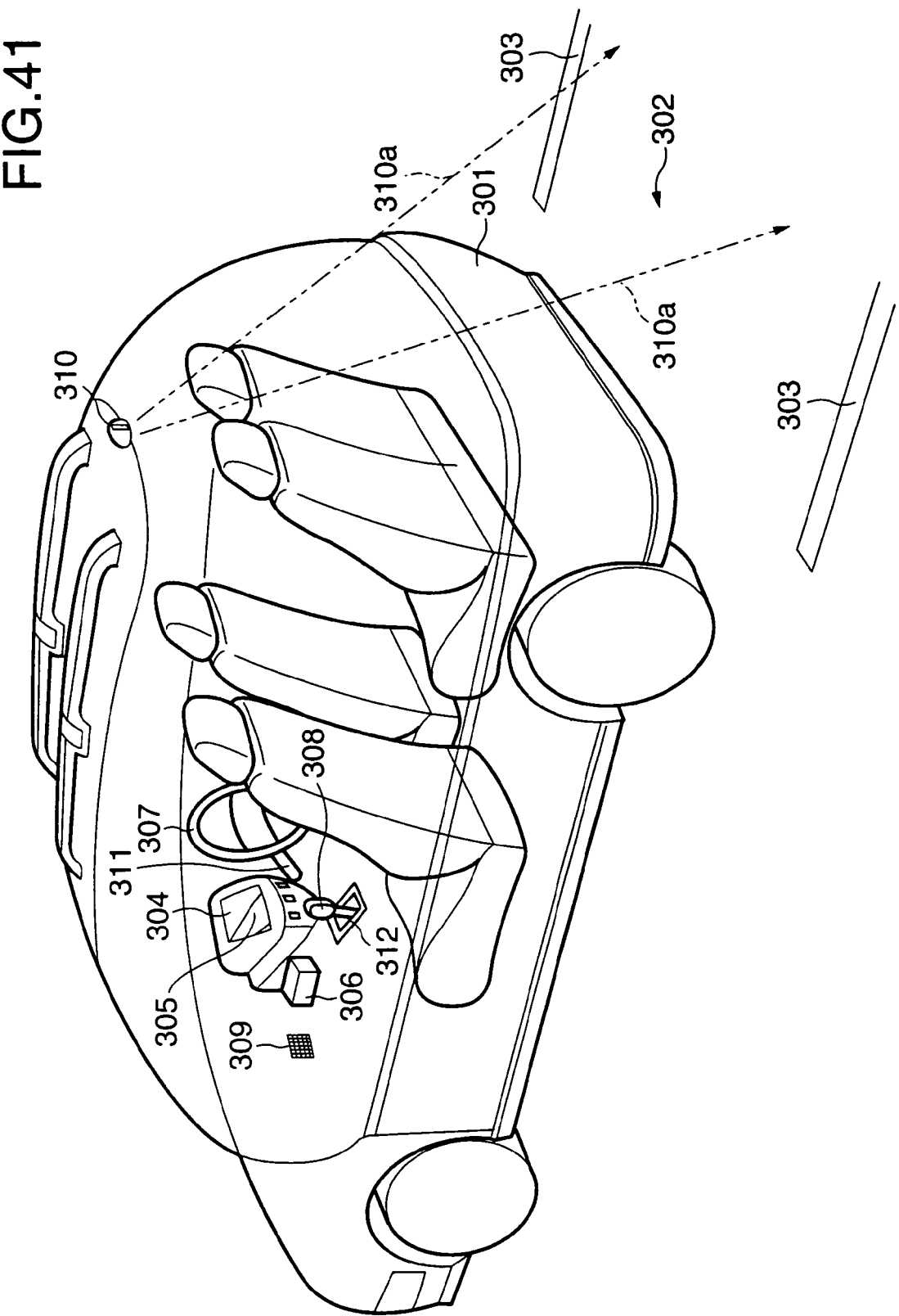
FIG. 41 is a block diagram showing a basic arrangement for a drive assist in each embodiment of the present invention.

FIG. 41 shows a basic arrangement for a drive assist in 13th to 18th embodiments of the present invention. When a driver of vehicle 301 a moves backward his car to a parking zone 302 and parks the car there, a vehicle parking assist device visually presents an image in a dead space for the driver and assists the driver in his driving on the screen of an information display device 304. A backward area image and a predictive traveling path curve 305 are also displayed so that the driver can correctly park the vehicle into a parking space marked off with white lines 303 or the like as a target. The information display device 304 may be a liquid crystal display device (LCD). The information display device 304 displays a drive assist image, which is generated by a parking assist ECU 306 as an electronic control unit (ECU) for drive assist. A steerage or steering angle of a steering wheel 307 is input to the parking assist ECU 306. In turn, the ECU 306 calculates a predictive traveling path curve 305 based on the steering angle, and the calculated predictive traveling path curve 305 is displayed on the screen of the information display device 304.

The parking assist ECU 306 starts the supplying of drive assist information in response to, for example, a shifting operation of a shift lever 308 of the transmission to an R position for moving the vehicle backward. The drive assist information is supplied in the form of visual or image information by the information display device 304 and acoustic information by a speaker 309 as well. A scene of a backward area of the vehicle 301 when the vehicle 301 backs is picked up by a camera unit 310. The camera unit 310 is installed at the rear part of the vehicle 301 so that its field 310a is directed to the parking zone 302 when the vehicle 301 moves backward. A steering angle of the steering wheel 307 is detected by a steering angle sensor 11. A shifting operation of the shift lever 308 to the reverse gear position is judged according to a back-lamp SW signal 312 as an on/off signal applied to a switch (referred to as an SW) for controlling a lighting condition of a back lamp.

Figure 42:
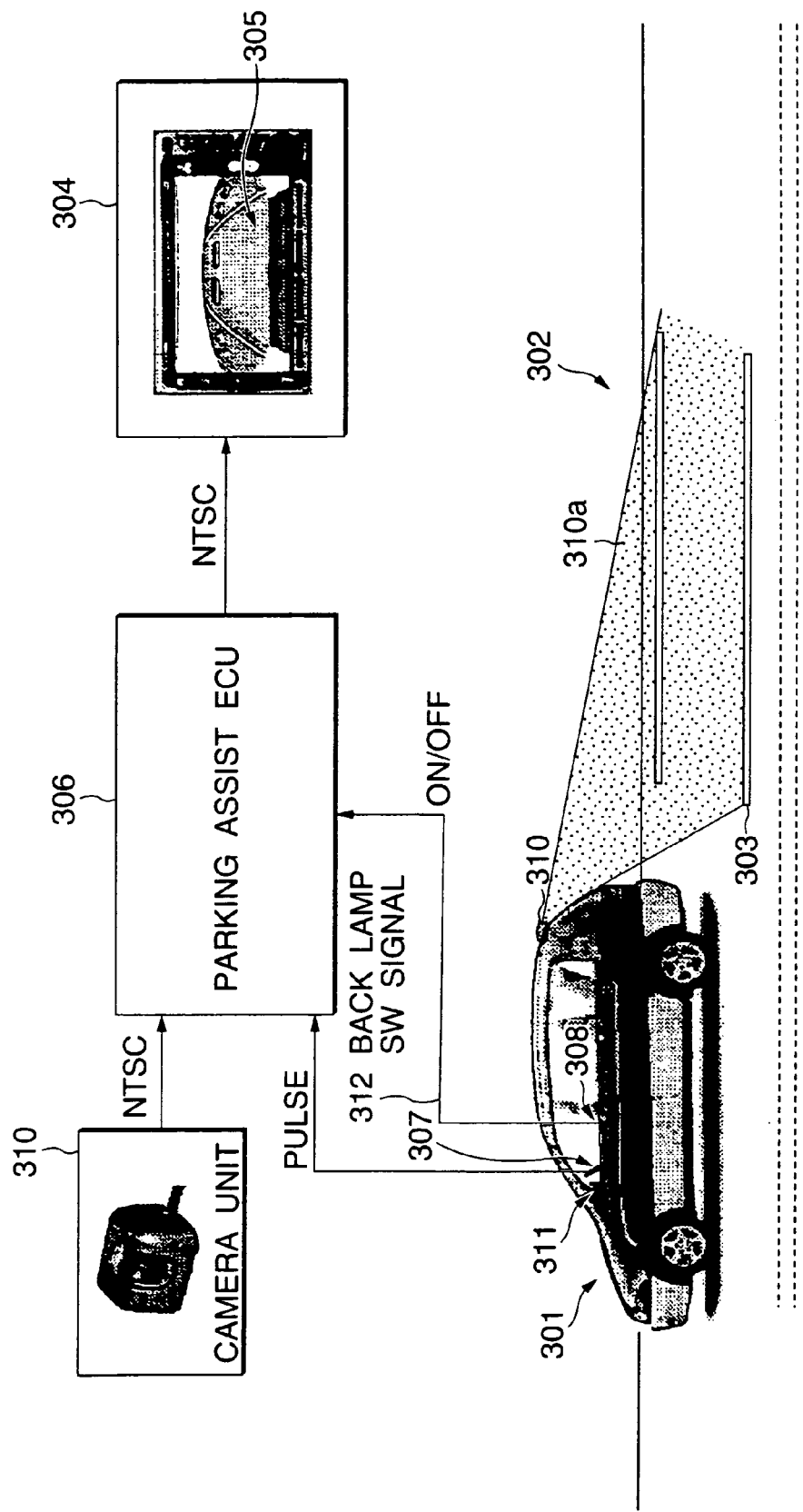
FIG. 42 is a diagram showing how a vehicle 301 of FIG. 41 backs to a parking zone 302 and parks therein.

FIG. 42 is a diagram showing a state that the vehicle 301 of FIG. 41 backs to a parking space marked off with white lines 303 in the parking zone 302. The camera unit 310 mounted on the rear part of the vehicle 301 picks up a scene of an area within the field 310a. The area within the field 310a is so selected as to contain portions, which are each within a dead angle to the driver to the vehicle 301, as many as possible. The parking assist ECU 306 also receives a pulse signal corresponding to a steering angle detected by a steering angle sensor 311, and a back-lamp SW signal 312, which is output from the transmission and put in an on state when the vehicle is backing.

The parking assist ECU 306 responds to a video signal of the NTSC system from the camera unit 310, a pulse signal corresponding to a turn of a steering angle, which is output from the steering angle sensor 311, and a back-lamp SW signal 312 of the back lamp which is turned on when the vehicle backs, and displays a predictive traveling path curve 305 of the vehicle 301 and a three-dimensional image generated along the predictive traveling path curve 305 on the screen of the information display device 304, thereby making a parking assist.

Figure 43:
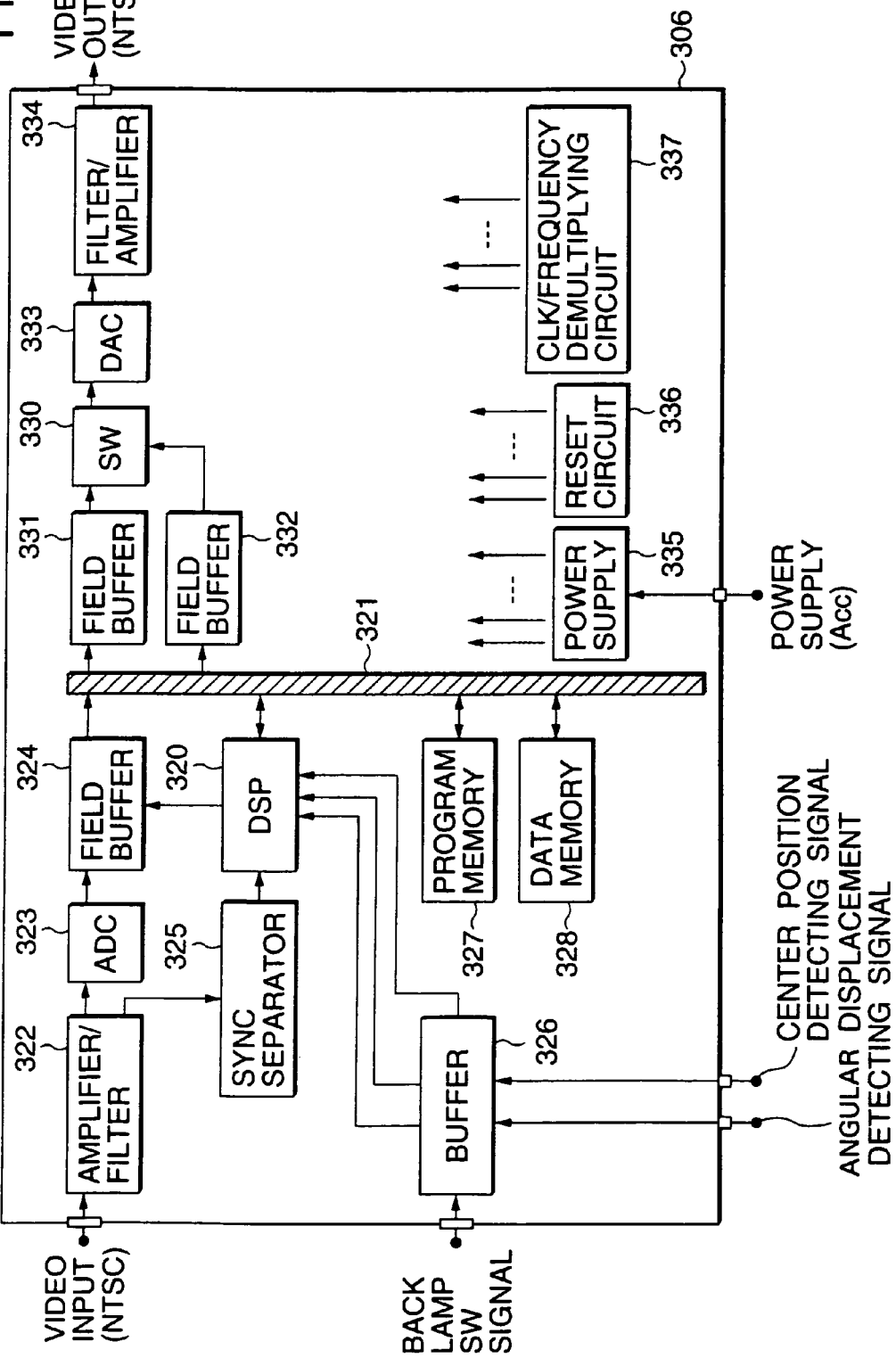
FIG. 43 is a block diagram showing an electrical arrangement of a parking assist ECU 306 in FIG. 41.

FIG. 43 electrically shows the innards of the parking assist ECU 306 shown in FIG. 41. The parking assist ECU 306 contains a digital signal processor (DSP) 320 for carrying out an overall control and calculations. Peripheral circuits are connected to the DSP 320 by a bus 321. A video signal from the camera unit 310 is input in the form of a composite video signal of the NTSC system to an amplifier/filter circuit 322. The amplifier/filter circuit 322 selectively amplifies an analog video component contained in the composite video signal. The output signal of the amplifier/filter circuit is applied to an analog to digital (ADC) 323 where its analog signal form is converted into a digital form. The thus digitized video signal is then stored into a field buffer circuit 324. The output signal of the amplifier/filter circuit 322 is also applied to a sync separation circuit 325 which in turn separates a horizontal sync signal and a vertical sync signal from the composite video signal. Those sync signals are input to the DSP 320. An angular displacement detect signal output from the steering angle sensor 311 and a center position detect signal generated when the center position of the steering wheel 307 is detected are also input to the DSP 320. A back-lamp signal is also applied to the DSP 320 by way of a buffer circuit 326.

The DSP 320 operates in accordance with a program pre-stored in the program memory 327, which is connected thereto by the bus 321. Data necessary for an operation based on the program of the program memory 327 is stored in advance in a data memory 328. The DSP 320 carries out a recognition process of the white lines 303 and the like in response to the video signal input thereto, and calculations for generating a predictive traveling path curve 305 based on an angular displacement operation of the steering wheel 307.

The generated image is stored into field buffers 331 and 332, either of which is selected according to an output signal of an SW circuit 30. Either of the field buffers 331 and 332 is selected by the SW circuit 330, and an output signal of the SW circuit is output as an NTSC video signal to the information display device 304, by way of a digital to analog converter (DAC) 333 and a filter/amplifier circuit 334. Electric power is supplied from a power supply 335 to the whole parking assist ECU 306. A reset circuit 336 supplies a reset signal to the parking assist ECU 306 to reset the latter to an initial state, and starts its operation according to the program. A CLK/frequency demultiplying circuit 337 supplies a clock signal defining a reference timing of the operation of the parking assist ECU 306, and signals formed by demultiplying a frequency of the clock signal.

Figure 44:
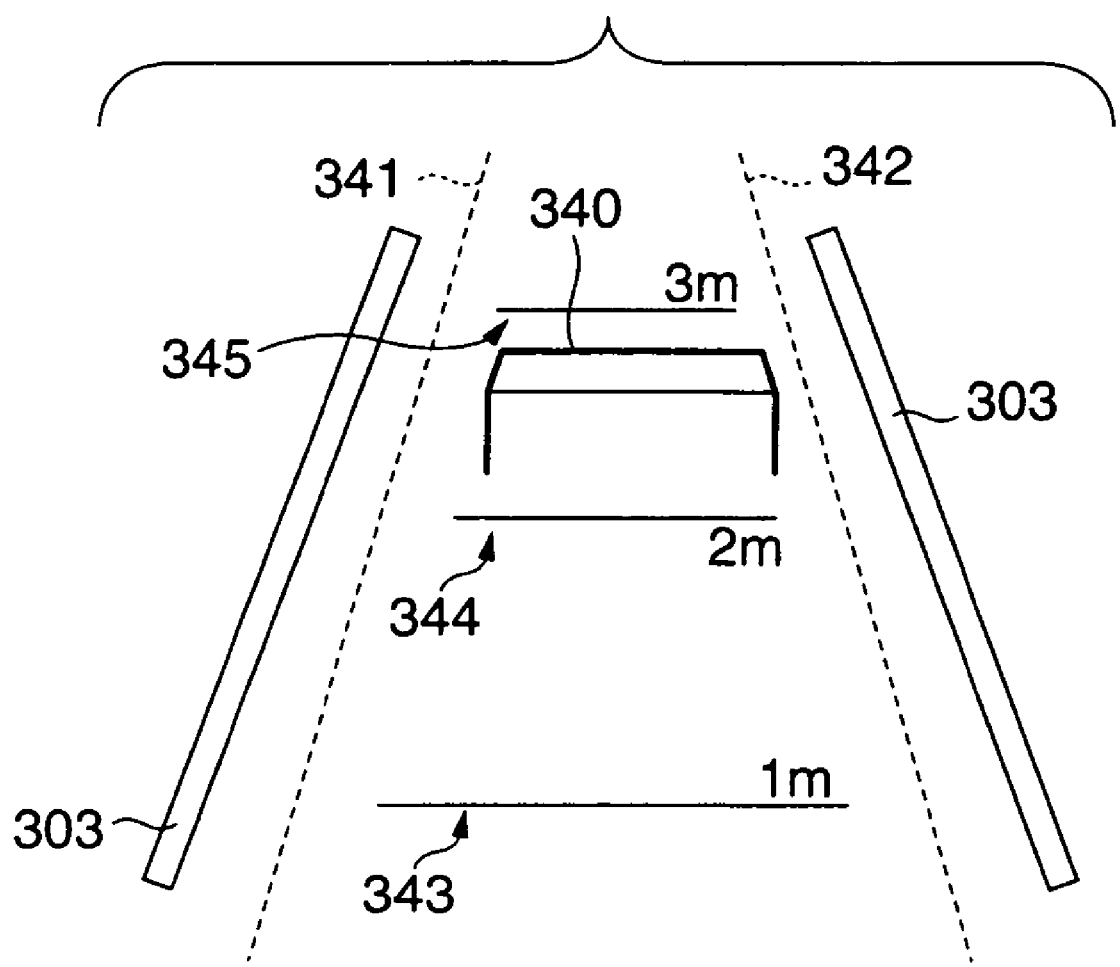
FIG. 44 is a diagram roughly showing an image displayed on the screen of an information display device 304 in a parking assist of the first embodiment of the invention.

FIG. 44 is a diagram roughly showing a display of a parking assist image in the 13th embodiment of the invention. In the 13th embodiment, guide lines 341 and 342, and distance lines 341, 342 and 345 are displayed in the backward area image picked by the camera unit 310 so as to provide an easy recognition of distance when an obstructive object, e.g., a parking stopper, is present. The guide lines 341 and 342 are rectilinear lines extending backward from both sides of the vehicle 301, and the distance lines 343 to 345 are lines for indicating distances from the rear end of the vehicle. A width of a space between the guide lines 341 and 342 corresponds to the width of the vehicle. Therefore, if those lines guide lines are parallel to the white lines 303 demarcating the parking space, all the driver has to do is to merely move back the vehicle straightly along the guide lines 341 and 342. Thus, the display of the FIG. 44 image makes it easy for the driver to easily grasp a rough distance to the obstructive object 340 when moving back the vehicle, and hence he easily sets the stop position.

Figure 45:
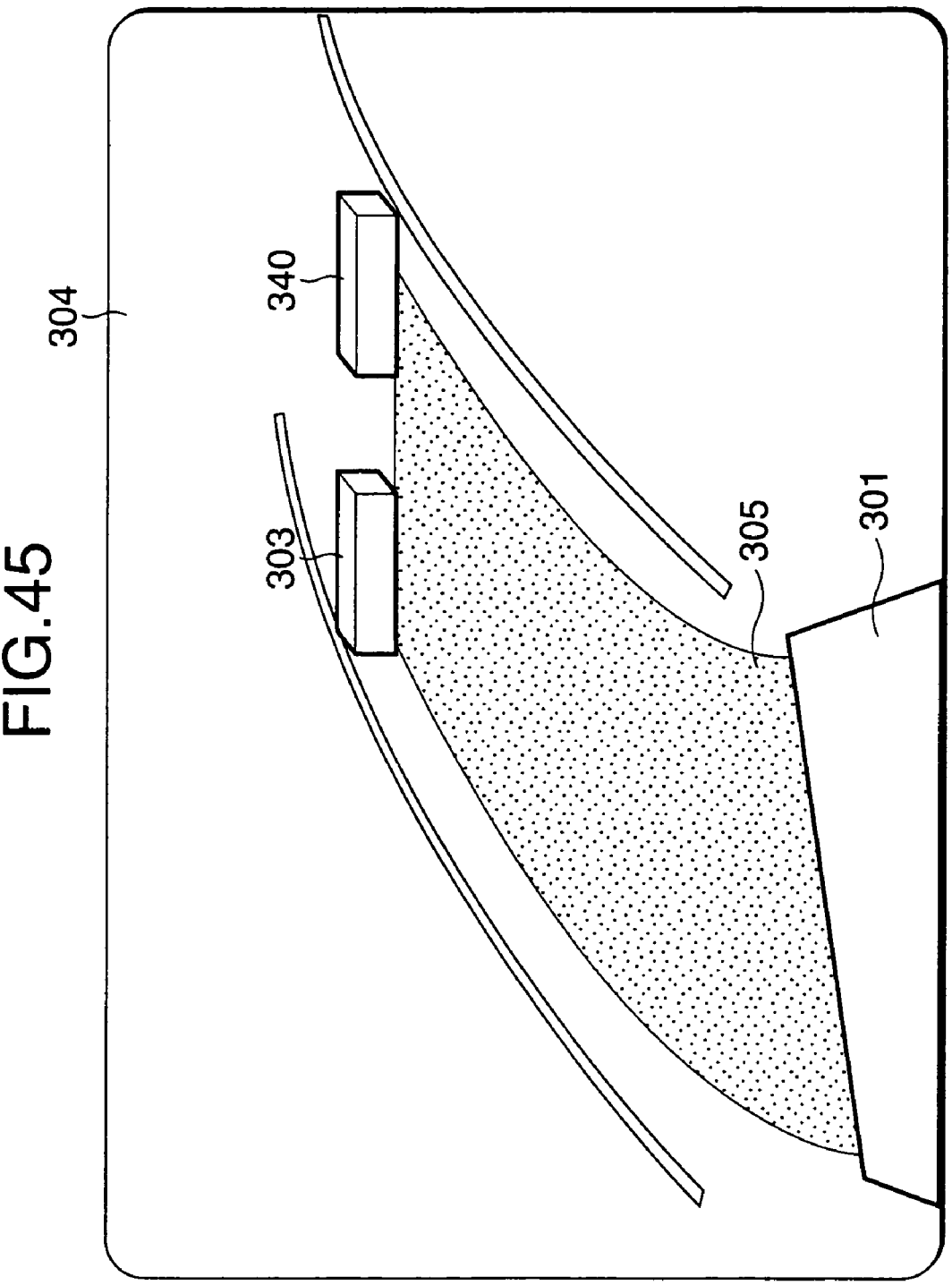
FIG. 45 is a diagram roughly showing an image displayed on the screen of an information display device 304 in a parking assist of the second embodiment of the invention.

FIG. 45 is a diagram roughly showing a display of a parking assist image in the 14th embodiment of the invention. In the 14th embodiment, a length of the predictive traveling path curve 305 is adjusted in accordance with a distance ranging to the parking position. The parking position may be set at a position of an obstructive object 340, such as a parking stopper. Accordingly, a length of the predictive traveling path curve 305 that is overlaid on the backward area image of the vehicle 301 is a distance from the rear end of the vehicle 301 to the obstructive object 340. Thus, the length of the predictive traveling path curve 305 may be adjusted in accordance with a distance to the parking position. Accordingly, an easy-to-understand display is presented to the driver.

Figure 46:
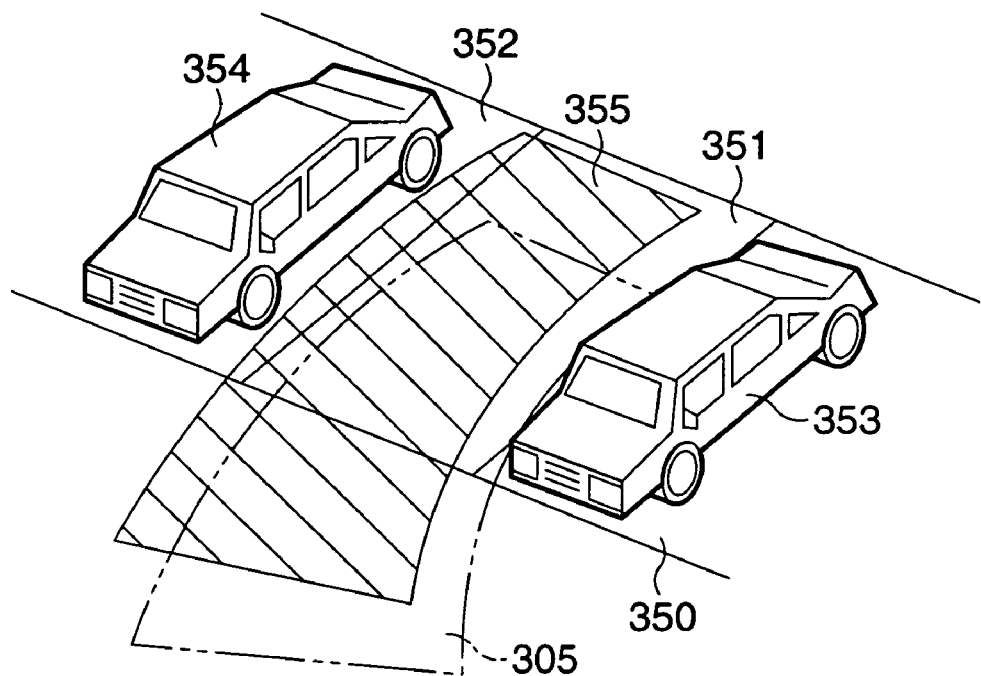
FIG. 46 is a diagram roughly showing an image displayed on the screen of an information display device 304 in a parking assist of the third embodiment of the invention.

FIG. 46 is a diagram roughly showing a display of a parking assist image in the 15th embodiment of the invention. In the 15th embodiment, it is assumed that three parking spaces 350, 351 and 352 are present side by side. The parking spaces 350 and 352, located on both sides of the parking space 351, are already occupied by other vehicles 353 and 354. When the moving vehicle 301 backs to the empty parking space 351 located between those vehicles 353 and 354, a roof predictive traveling path curve 355 is displayed to avoid colliding of the vehicle 301 with the roofs of the vehicles 353 and 354.

The vehicle 301 takes a three-dimensional configuration. When the predictive traveling path curve 305 corresponding to the bottom of the vehicle 301 is used, it is difficult to judge whether or not the roof portion of the self vehicle or the like will hit another vehicle 353 or 354 or an obstructive object at a portion of the self vehicle which is shaded by the adjacent vehicle 353 and forms a dead space to the driver. In this case, when the roof predictive traveling path curve 355 is used, the driver is successfully guided to the intended parking space in a state that the self vehicle does not hit the roof of the other vehicle 353 or 354.

Figure 47:
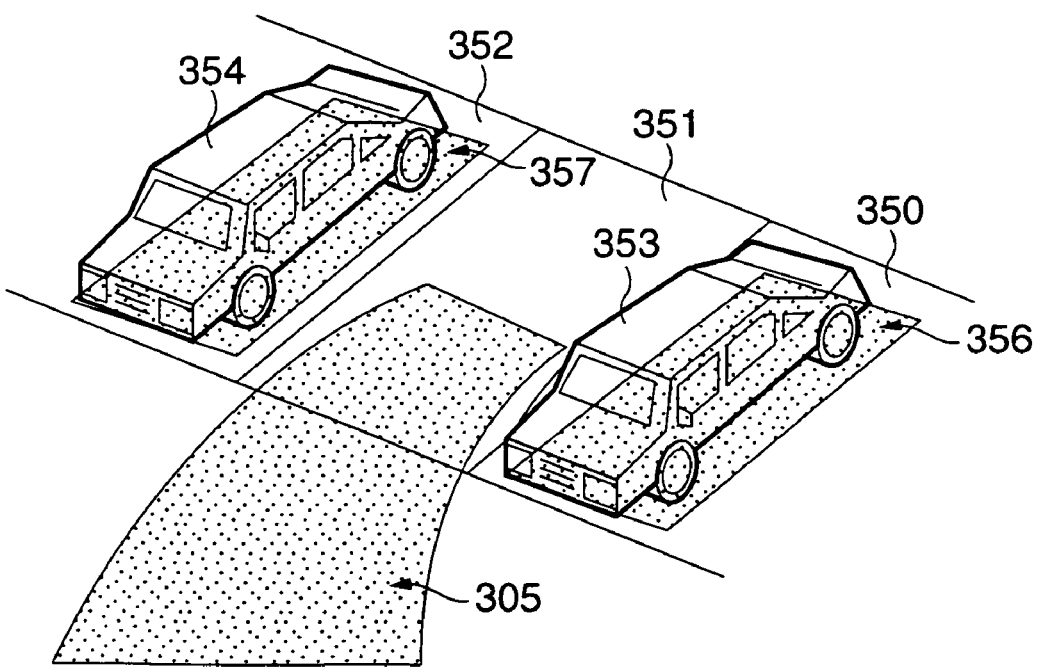
FIG. 47 is a diagram roughly showing an image displayed on the screen of an information display device 304 in a parking assist of the fourth embodiment of the invention.

FIG. 47 is a diagram roughly showing a display of a parking assist image in the 16th embodiment of the invention. Also in the 16th embodiment, as in the FIG. 46 embodiment, it is assumed that three parking spaces 350 to 351 are present, and of those parking spaces, two parking spaces 350 and 351 are already occupied by other cars 353 and 354. Projection lines 356 and 357 of the vehicles 353 and 354 to the ground are displayed. By displaying the projective lines 56 and 57 of the vehicles 350 and 351 parked in the parking spaces 350 and 351 located on both sides of the parking space 351, the vehicle 301 can accurately be moved into the parking space 351 irrespective of, in particular, the side portion of the vehicle 353 parked on this side of the parking space 351, which forms a dead space to the driver.

Figure 48:
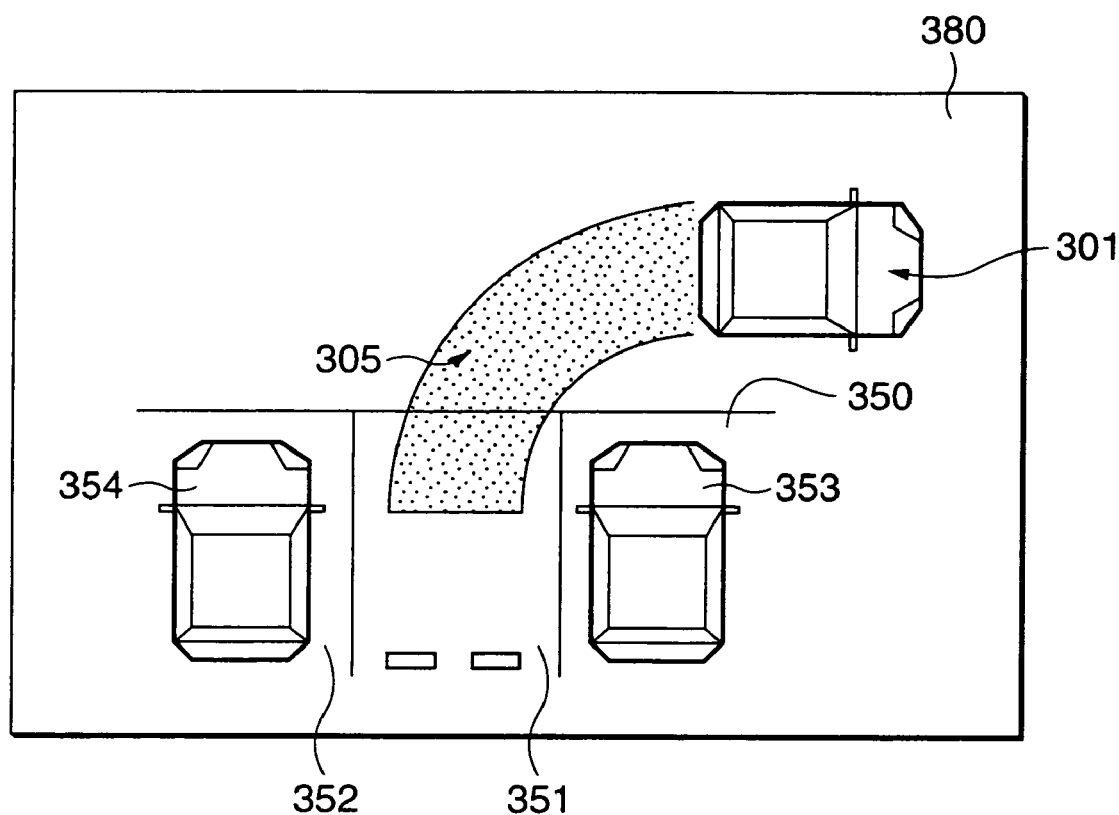
FIG. 48 is a diagram roughly showing an image displayed on the screen of an information display device 304 in a parking assist of the fifth embodiment of the invention.

FIG. 48 is a diagram roughly showing a display of a parking assist image in the 17th embodiment of the invention. Also in the 17th embodiment, as in the FIGS. 46 and 47 embodiments, it is assumed that three parking spaces 350 to 351 are present, and of those parking spaces, two parking spaces 350 and 351 are already occupied by other cars 353 and 354. In the 17th embodiment, a layout of other vehicles 353 and 354 parked side by side in the parking spaces on both sides of the parking space 351 and a self vehicle 301, when viewed from the top, is modeled and displayed in the form of a plane model 380. The plane model 380 is generated, by the DSP 320, on the basis of the rough configurations of the parking spaces 350 to 351 and the other vehicles 353 and 354, positions of the vehicle 301 relative to other things, and a configuration of the vehicle 301 that is already input. With the display of the vehicle 301 located relative to other vehicles and the like as viewed from the top, the driver can easily grasp a position of the self vehicle relative to the parking space 351 and the other vehicles 353 and 354 parked in the parking space between the parking space 351, and an orientation and advancing direction of the self vehicle 301.

Also in the plane display shown in FIG. 48, a direction in which the self vehicle 301 backs is oriented downward on the screen of the information display device 304. The plane display containing the thus oriented vehicle matches such a driver's feeling that he feels quiet after parking his car in the parking space 351. For the plane model 380, if a parking zone is the regularly or frequently used one, the shapes and the like of the parking spaces 350 to 351 may be input in the form of data in advance.

Figure 49:
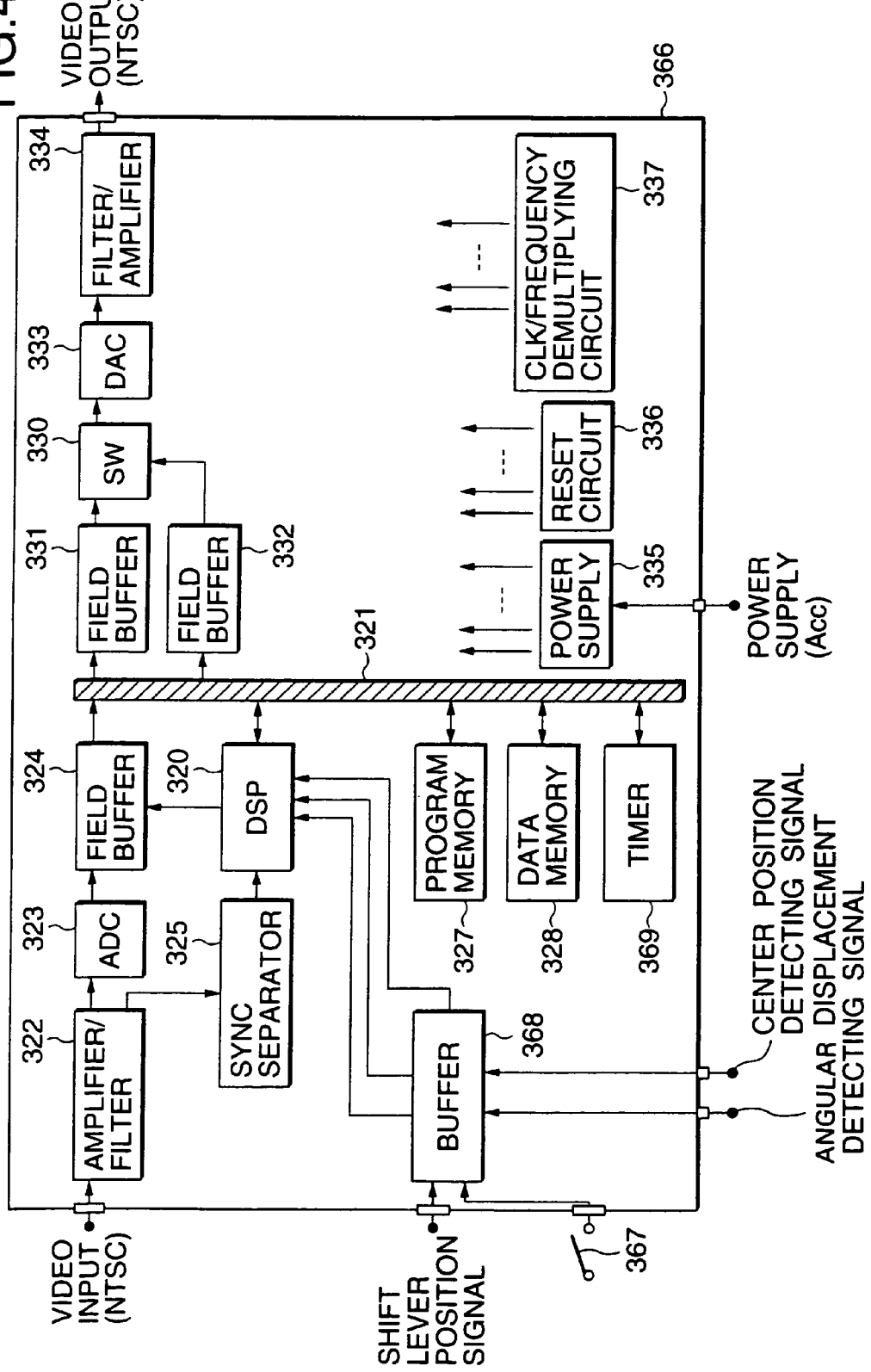
FIG. 49 is a block diagram showing an electrical arrangement of a parking assist ECU 366 used in a sixth embodiment of the invention.

FIG. 49 is a block diagram showing an electrical arrangement of a parking assist ECU 366 used in the 18th embodiment of the invention. The parking assist ECU 366 resembles the parking assist ECU 306 shown in FIG. 43, and hence like or equivalent portions in the figure are designated by like reference numerals in FIG. 43, for simplicity of explanation. An angular displacement detect signal and a center position signal, and a shift lever position signal representing a gear position of the shift lever 308 and a signal derived from the select switch 367 are input to the DSP 320 by way of a buffer circuit 368. A timer 369 is also connected to the bus 321. The timer 369 may be operated to count a time set by the DSP 320.

The select switch 367 is used for selecting a display of the plane model 380 as shown in FIG. 48 or a normal display of the backward area image as shown in FIG. 46 or 47. A driver of the vehicle 301 can appropriately select one of those displays according to parking space conditions by operating the select switch 337.

Figure 50:
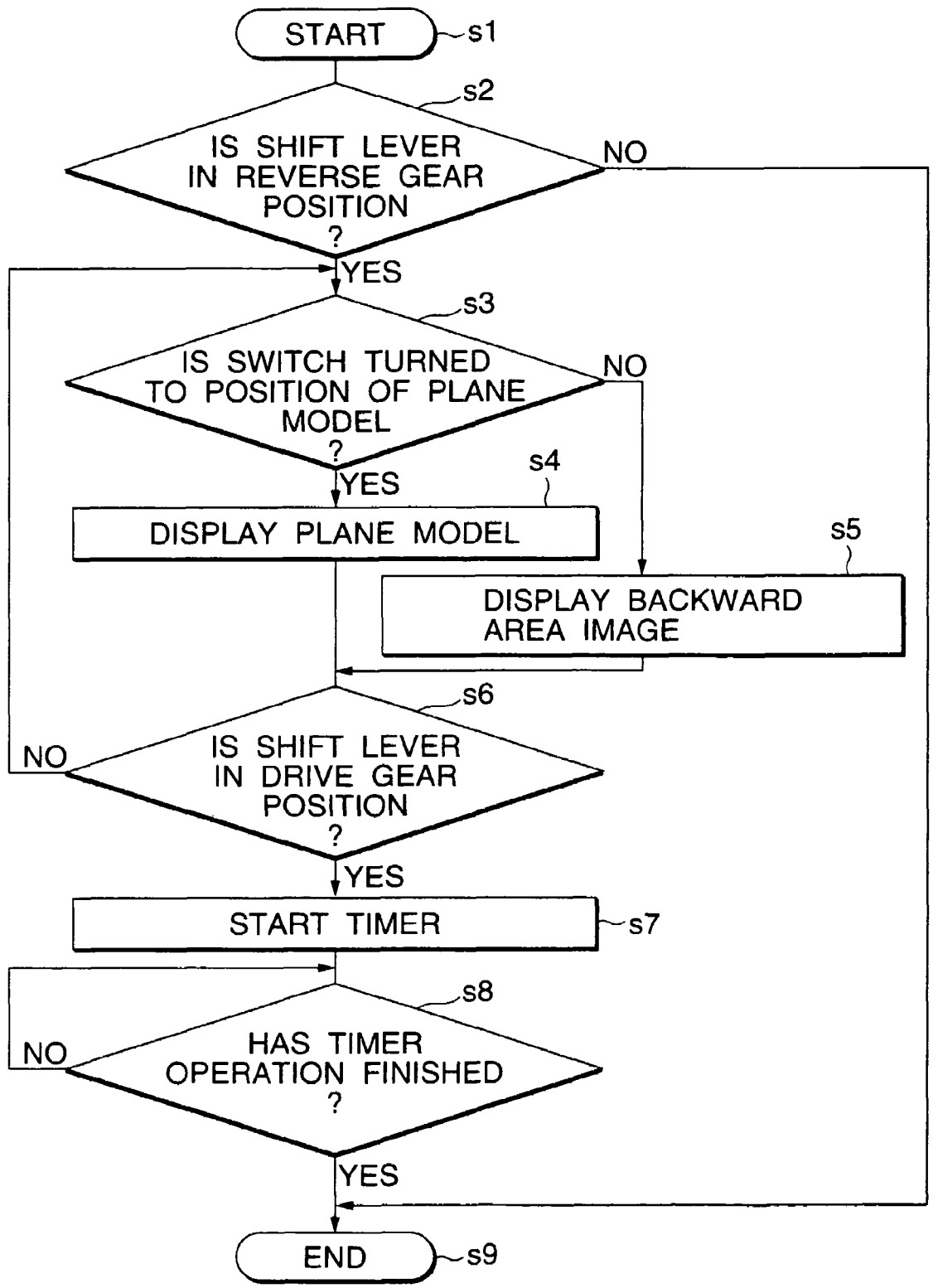
FIG. 50 is a flow chart showing a control procedural in the FIG. 50 embodiment.

FIG. 50 shows a parking assist procedural process in the FIG. 49 embodiment. The parking assist procedure starts at a step s1. In a step s2, what executes the procedural process, or the DSP 320, checks if the shift lever 308 is shifted to the reverse gear position, by use of a shift lever position signal. If it is at the reverse gear position, the DSP 320 judges that a parking assist mode is set up, and executes a step s3. In this step, the DSP 320 checks if the select switch 367 is turned to a position of the plane model 380. When it is turned to the plane model position, a step s4 is executed to display a plane model 380. When the select switch 367 is not turned to the plane model position in the step s3, a step s5 is executed to display a backward area image.

After the step s4 or s5 ends in its execution, a step s6 is executed to check if the shift lever 308 is shifted to a drive gear position. If it is not turned to the drive position, the DSP 320 considers that the backward movement for parking continues, and returns to the step s3. Subsequently, a sequence of the process execution from the step s3 to the step a6 is repeated.

When the shift lever 308 is shifted to the drive gear position, the vehicle advances. In the present embodiment, the parking assist is continued for a fixed time so as to perform an effective parking assist also when after moving back the vehicle, the driver slightly moves it forward for a reverse turn of the steering wheel, and then moves back it for parking. To this end, in a step s7, the counting operation of the timer 369 is started, and the parking assist is continued till the counting operation by the timer 369 ends in a step s8. When the counting operation by the timer 369 ends in the step s8 or the shift lever 308 is not at the reverse gear position in the step s2, the procedural process ends in a step s9. A fixed time, e.g., several tens seconds, is set in advance in the timer 369. When the shift lever 308 is shifted to the reverse gear position before this set time elapses, the DSP 320 may be returned to the step s3.

In each of the 13th to 18th embodiments mentioned above, the DSP 320 is used for the calculating process and control in the parking assist ECU 306 (366). If required, a general CPU may be used instead of the DSP. The DSPs or CPUs may be combined in use. For the image processing in the invention, a semiconductor integrated circuit designed to be used exclusively for the image processing may be used.

Figure 51:
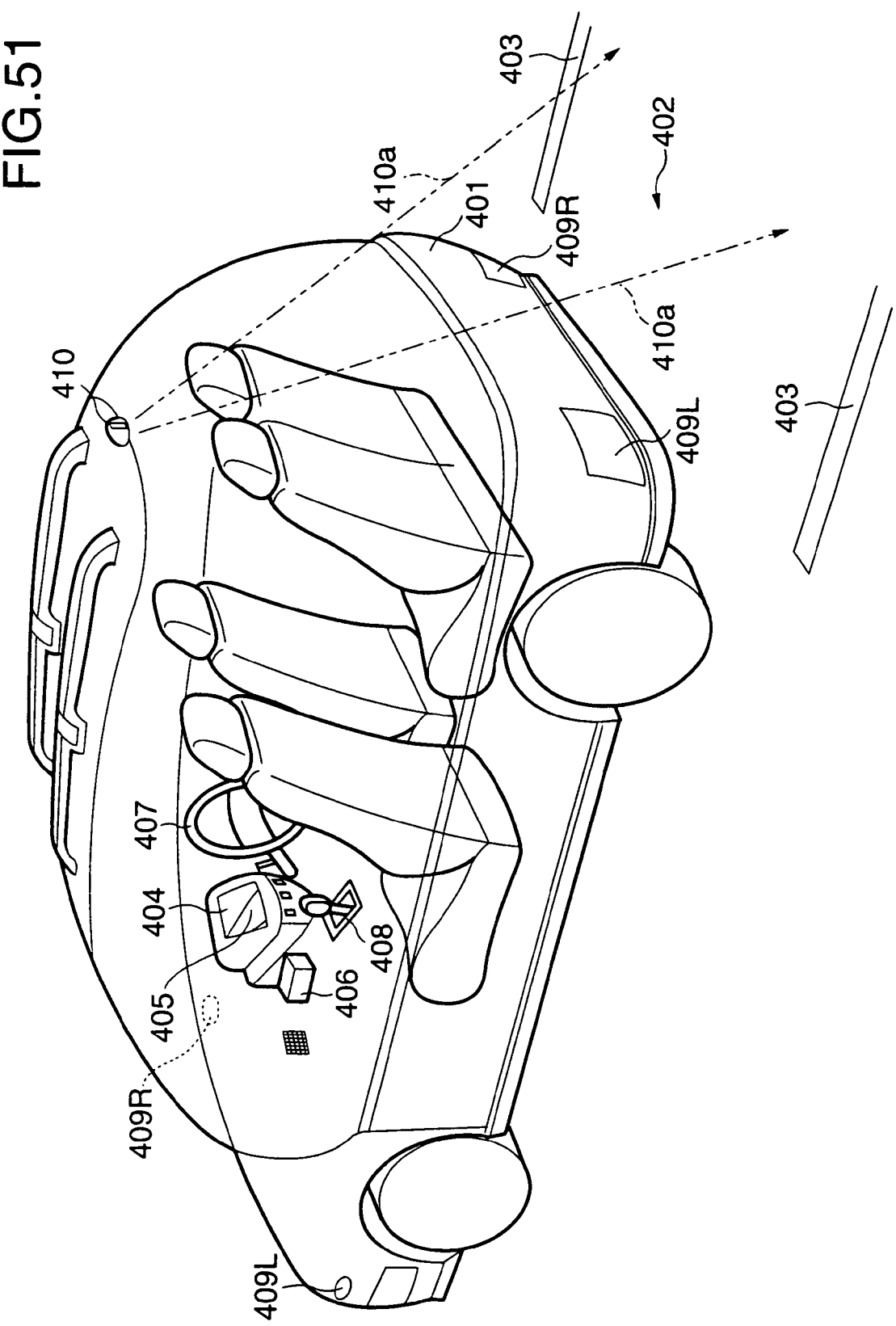
FIG. 51 shows an external appearance of a vehicle which will undergo a series parking assist in 19th and 20th embodiments of the present invention.

FIG. 51 shows an external appearance of a vehicle or vehicle 401 as an object which will undergo a series parking assist in 19th and 20th embodiments of the present invention which will be described hereunder. When the vehicle 401 moves on and along a traffic lane demarcated with white lines 403 on a road 402 and backs from the traffic lane to the shoulder edge of the road and parks in a location close to and along the shoulder edge of the road, image information for the series parking assistance is displayed on the screen of an information display device 404. The image information contain a predictive traveling path curve 405 depicted on the calculation based on a prediction of a traveling path of the vehicle 401, and others. The predictive traveling path curve 405 is calculated using a steering angle as an operation angle of a steering wheel 407 for steering the vehicle 401, by a parking assist ECU 406 as an electronic control unit (referred to as "ECU") for making a drive assist for the series parking. When a shift lever 408 of the transmission is shifted to the reverse gear position, for example, and a left winker lamp 409L of those right and left winker lamps 409L and 409R lights up, the display starts to assist a driver in parking the vehicle in a parking space along the left side of the load.

In moving the vehicle 401 backward for its parking, a backward area of the vehicle 401 is the dead space when viewed from the driver, and he cannot sufficiently watch a backward area of the vehicle. To cope with this, a camera unit 410 is attached to the upper part of the body of the vehicle 401, and picks up a scene of the backward area defined by a field 410a. The camera unit 410 produces a video signal of the NTSC type, for example, and the parking assist ECU 406 displays a predictive traveling path curve 405 overlaid on the backward area image on the screen of the display device 404.

Figure 52:
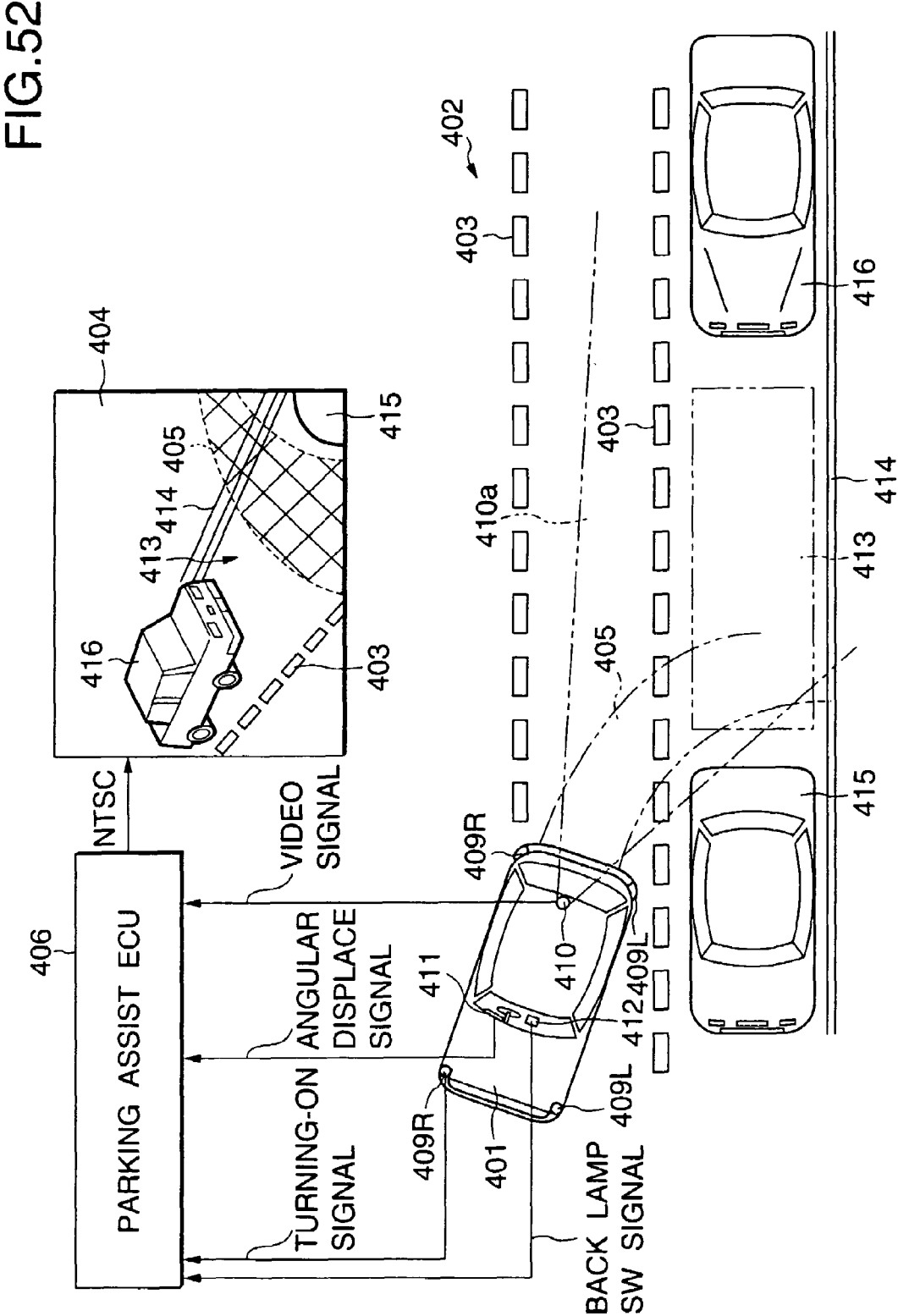
FIG. 52 is a plan view showing a basic arrangement for a drive assist when a series parking of the vehicle of FIG. 51 starts.

FIG. 52 is a diagrammatic illustration showing a basic arrangement for a drive assist when the driver starts a series parking of the vehicle 401 of FIG. 51. A video signal input from the camera unit 410 to the parking assist ECU 406 is of the NTSC type. A steering angle of the steering wheel 407 is detected by a steering sensor 411. The steering sensor 411 produces a pulse signal every angular displacement of the steering wheel 407 at a fixed angle, in the form of an angular displacement signal. When the shift lever 408 of the transmission of the vehicle 401 is operated to the reverse gear position, a back lamp SW signal 412 for turning on a switch (referred to as a SW) to light up a back lamp is produced and input to the parking assist ECU 406. A light-up signal for the winder lamps 409L and 409R is also input to the parking assist ECU 406. An image of a parking space 413 is displayed on the screen of the display device 404. At this time, a shoulder edge of the road 402 is also displayed. The parking space 413 is located between, or example, vehicles 415 and 416 preceding and subsequent to the self-vehicle.

Figure 53:
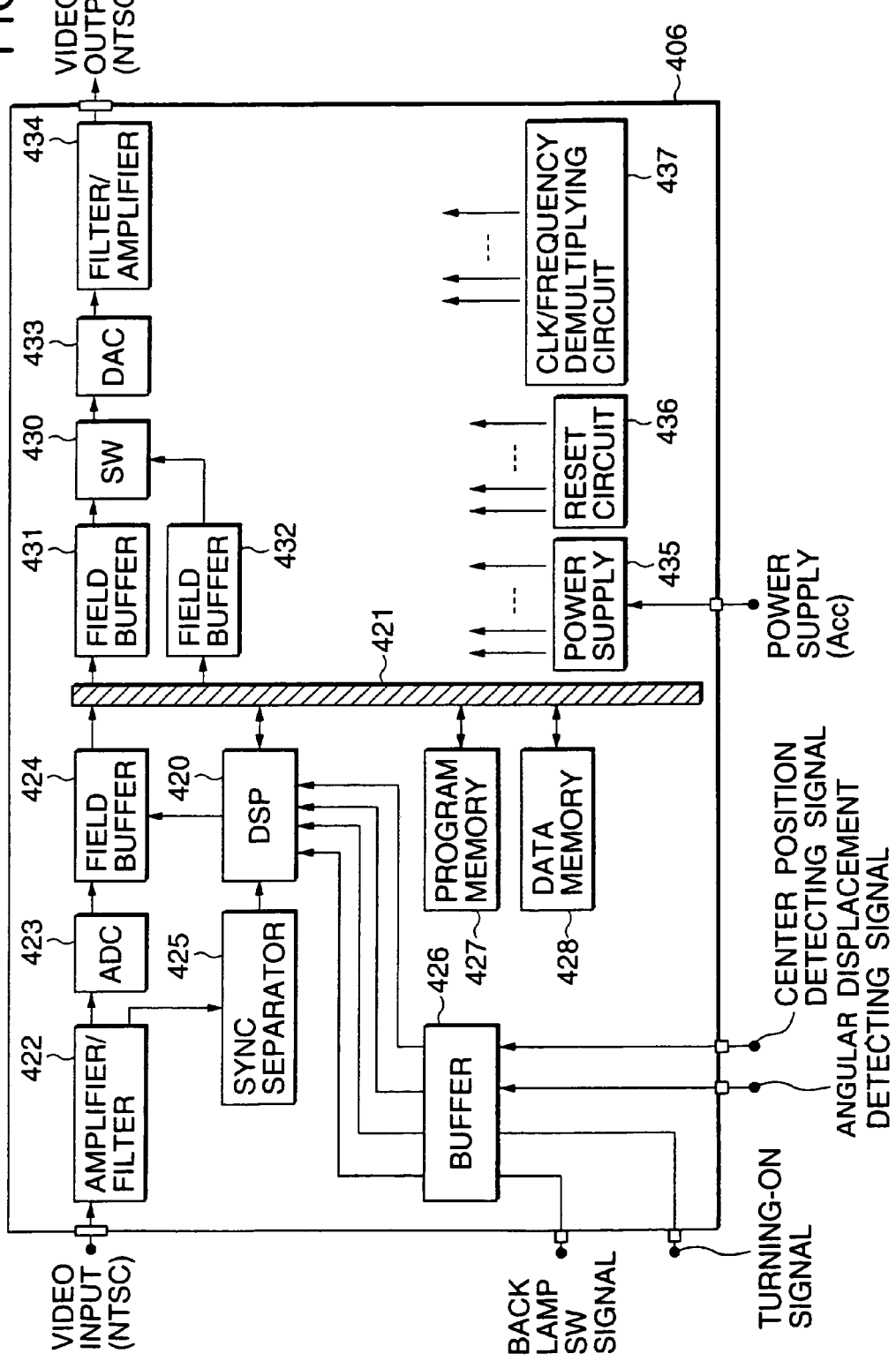
FIG. 53 is a block diagram showing an electrical arrangement of a parking assist ECU 406 shown in FIG. 51.

FIG. 53 schematically shows an electrical arrangement of the parking assist ECU 406 shown in FIG. 51. An overall control in the parking assist ECU 406 is executed by a digital signal processor (DSP) 420. The DSP 420 executes signal processing through a bus 421. The camera unit 410 produces an NTSC video signal, and the video signal is amplified by an amplifier/filter circuit 422. The amplifier/filter circuit 422 extracts a video component signal from the video signal, and a signal form of the video component signal is converted from an analog form to a digital form by an analog to digital converter (referred to as an ADC) 423. The digitized video component signal is stored into a field buffer circuit 424. The amplifier/filter circuit 422 also applies a video signal to a sync separation circuit 425 where horizontal and vertical sync components are separated from the video signal. And those sync signals are input to the DSP 420. An angular displacement detect signal, which is representative of an angular displacement of a steering angle, and a center position signal, which represents that the steering wheel 407 is at the center position, are input to the DSP 420 by way of a buffer circuit 426. A back lamp SW signal and a window lamp light-up signal are also input to the DSP 420 via the buffer circuit 426. The DSP 420 operates in accordance with a program that is stored in advance in a program memory 427, which is connected via the bus 421 to the DSP 420 per se. The DSP 420 is capable of reading out data necessary for the programmed operation form a data memory 428, and writes data into the same. The DSP 420 recognizes, in accordance with an incoming vide signal, the white lines 403 shown in FIG. 51, the shoulder edge of the road 402, and other parking vehicles. Further, it is also capable of calculating, on the basis of the recognition result, a target parking position of the vehicle 401, and an ideal traveling path or path curve along which the vehicle moves from the present position to the target parking position.

The DSP 420 generates it so that it is overlaid on the image derived from the camera unit 410, and stores them into field buffers 431 and 432 the outputs of which are selectively output through a SW circuit 430. The output signal of each of the field buffers 431 and 432, which is selected by the SW circuit 430, is output as a video output signal to the display device 404, through a digital to analog (DAC) 433 and a filter/amplifier circuit 434. Electric power is fed from a power supply 435 to the whole parking assist ECU 406. The parking assist ECU also receives a reset signal from a reset circuit 436, and a clock signal defining a base for the operation timings and signals of demultiplied frequencies from a CLK/frequency demultiplying circuit 437.

Figure 54:
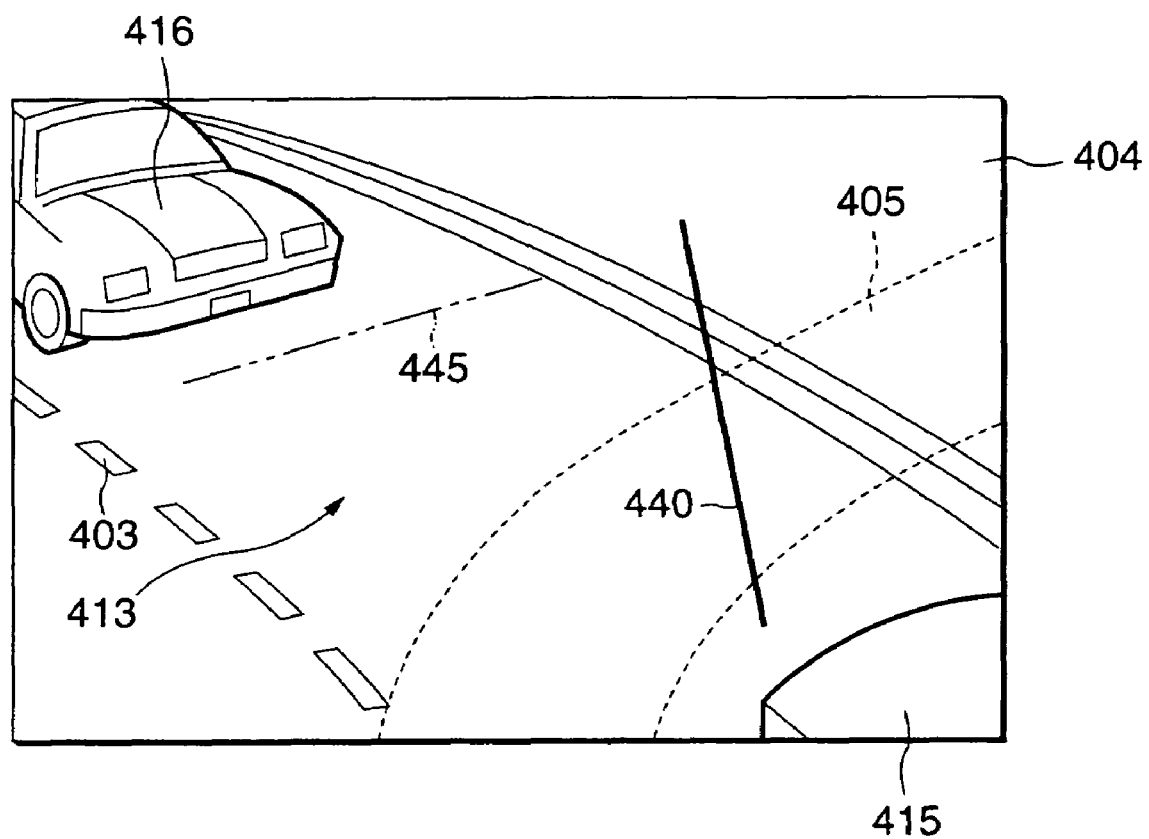
FIG. 54 schematically shows an image display for the series parking assist, which is carried out as the 19th embodiment of the present invention.

FIG. 54 shows, in a simplified form, an image display presented on the screen of the information display device 404, which the image display is carried out as the 19th embodiment of the present invention. A scene of the parking space 413 picked by the camera unit 410 is displayed on the screen of the display device 404. Other vehicles 415 and 416 and the like are present before and after the parking space 413. A predictive traveling path curve 405, which is calculated depending on the present steering angle, is displayed extending from the rear end of the vehicle 401 to the parking space 413. To properly park the vehicle 401 in the parking space 413, the steering wheel 407 must be reversely turned during the backward movement. The parking assist ECU 406 as timing judging means determines a vehicle position suitable for the reverse turn of the steering wheel 407 on the predictive traveling path curve 405, and draws a guide line 440 of an oblique line at the suitable position. The guide line 440 is drawn at a position varying with the backward movement of the vehicle 401 within an area within which the vehicle 401 may be parked at a target parking position 445 in the parking space 413 by operating the steering wheel 407. When the driver of the vehicle 401 reversely turns the steering wheel 407 at a position where the guide line 440 is coincident with the shoulder edge 414 of the road as a target in the parking space 413, the parking will be completed. When the predictive traveling path curve 405 will possibly come in contact with other vehicle or vehicles 415 and 416, the driver stops the backward movement for the series parking, and advances the vehicle 401. And if possible, the driver changes the direction of the vehicle 401 and tries to make the series parking.

Figure 55:
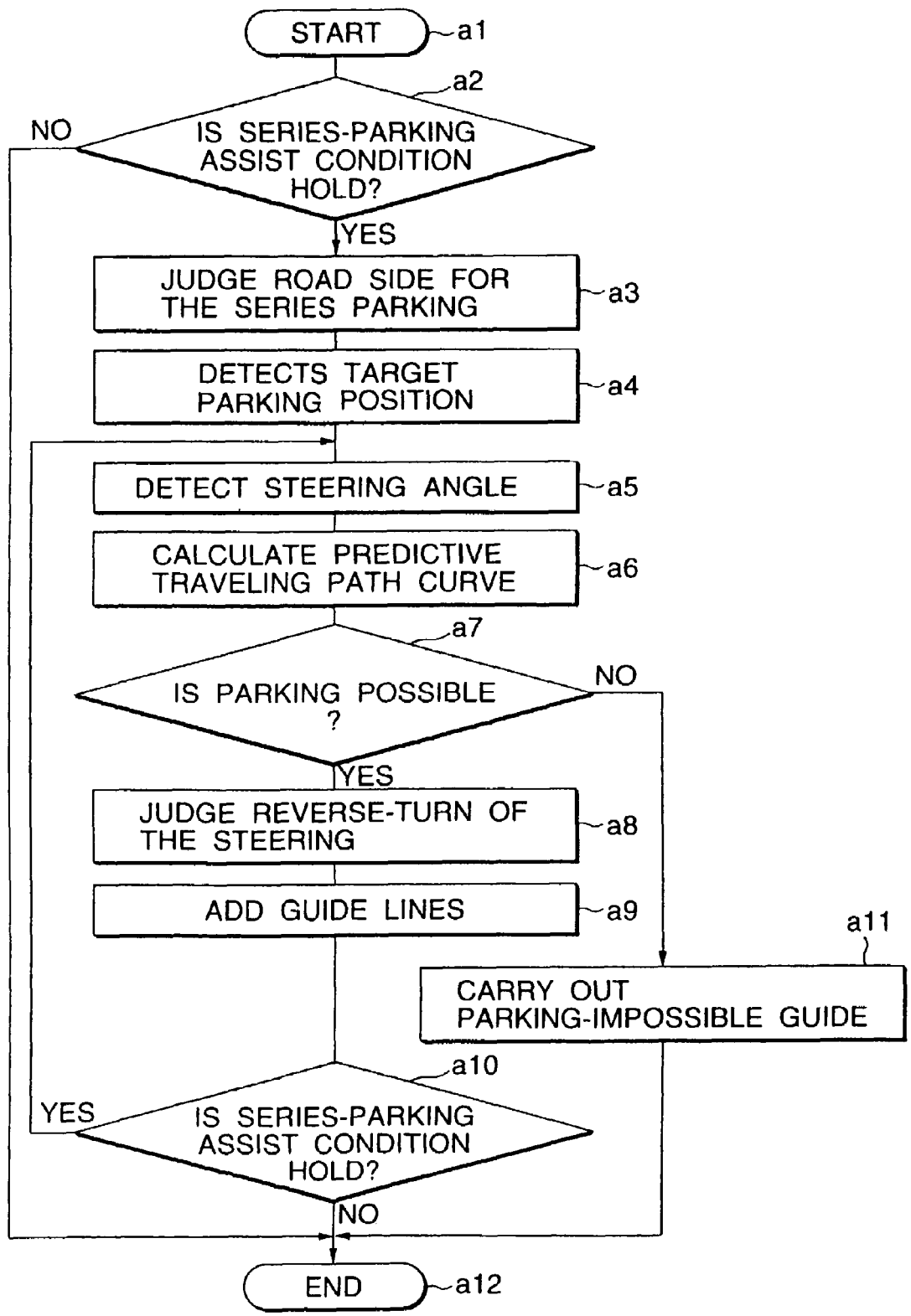
FIG. 55 shows a control procedure in the embodiment of FIG. 54.

FIG. 55 shows a control procedure in the embodiment of FIG. 54. The control procedure starts in a step a1. In a step a2, what executes the procedure, or the DSP 420 of the parking assist ECU 406, judges whether or not given series parking assist conditions hold. When the back lamp SW signal 412 is in an on state, and the left winker lamp 409L or the right winker lamp 409R is turned on, the DSP judges that the series parking assist conditions hold. When the winker lamps 409L and 409R are both turned on for the hazard lamp, the DSP may judge that the vehicle will be series parked on and along the left side of the road as usual. If the series parking assist conditions hold, the DSP judges which the sides of the road is used for the series parking in a step a3. In the next step a4, the DSP detects a target parking position 445 from the image picked up by the camera unit 410. In a step a5, the DSP detects a steering angle of the steering wheel 407 of the vehicle 401 by an angular displacement signal output from the steering sensor 411. In a step a6, the DSP calculates a predictive traveling path curve 405 depending on the steering angle. In a step a7, the DSP judges whether or not the vehicle 401 may be moved from the present position to the target parking position 445 by the steering operation. When possible, the DSP judges a timing of turning the steering wheel reversely in a step a8. After the reverse turn of the steering wheel, a position of the guide line 440 which is indicative of the reverse turn timing on the predictive traveling path curve 405 is determined and the resultant is added to the image. In a step a10, the DSP judges whether or not the series parking assist conditions hold, as in the step a2. When the series parking assist conditions hold, the DSP returns to the step a5, and continues the parking assist in a similar manner.

The judgement of the step a7 as to whether or not the parking is allowed is made on the basis of the gathering of position data of the parking space 413 for the vehicle 401 at the start of parking, comparison of it with the data of the guide line 440 when the vehicle 401 is put in parallel, which is stored in advance, and a minimum turn radius of the vehicle 401, and the like. When the step a7 judges that the parking is impossible, the DSP displays a guide of "parking impossible" by the information display device 404 in a step a11. When the step a2 or a10 judges that the series parking assist conditions do not hold, or that the step a11 displays the parking-impossible guide, the DSP ends its procedural process at a step a12.

Figure 56:
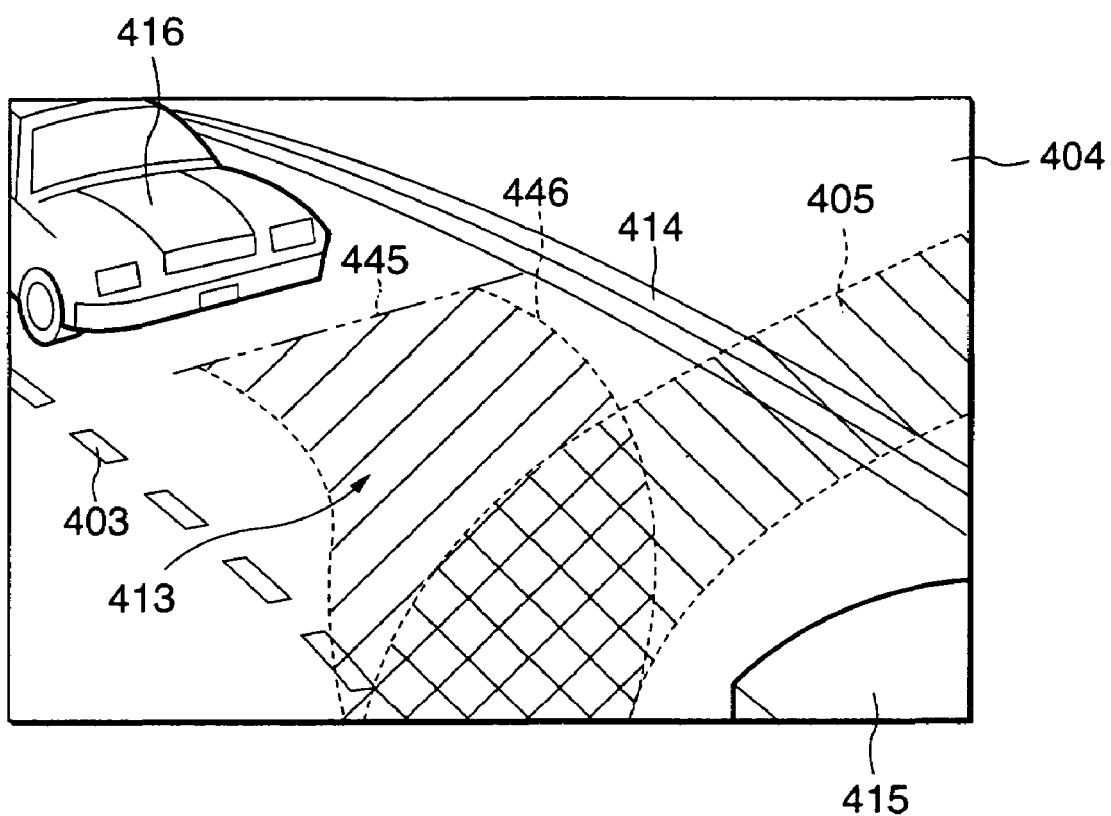
FIG. 56 is a diagram showing a series parking assist image in 20th embodiment of the present invention.

FIG. 56 shows an image for the series parking assist in 20th embodiment of the present invention. In the embodiment, like or equivalent portions are designated by like reference numerals in FIG. 54. A parking space 413 is located between other vehicles 415 and 416, and a target parking position 445 is detected. A predictive traveling path curve 405 is displayed, which is predictively generated on the basis of a steering angle of the present steering wheel 407, and an ideal traveling path curve 446 ranging from the present vehicle position to the target parking position 445 is displayed. Accordingly, the driver of the vehicle 401 can easily park the vehicle 401 in the target parking position 445 in a manner that he operates the steering wheel 407 so as to approximate the predictive traveling path curve 405 in shape to the ideal traveling path curve 446.

Figure 57:
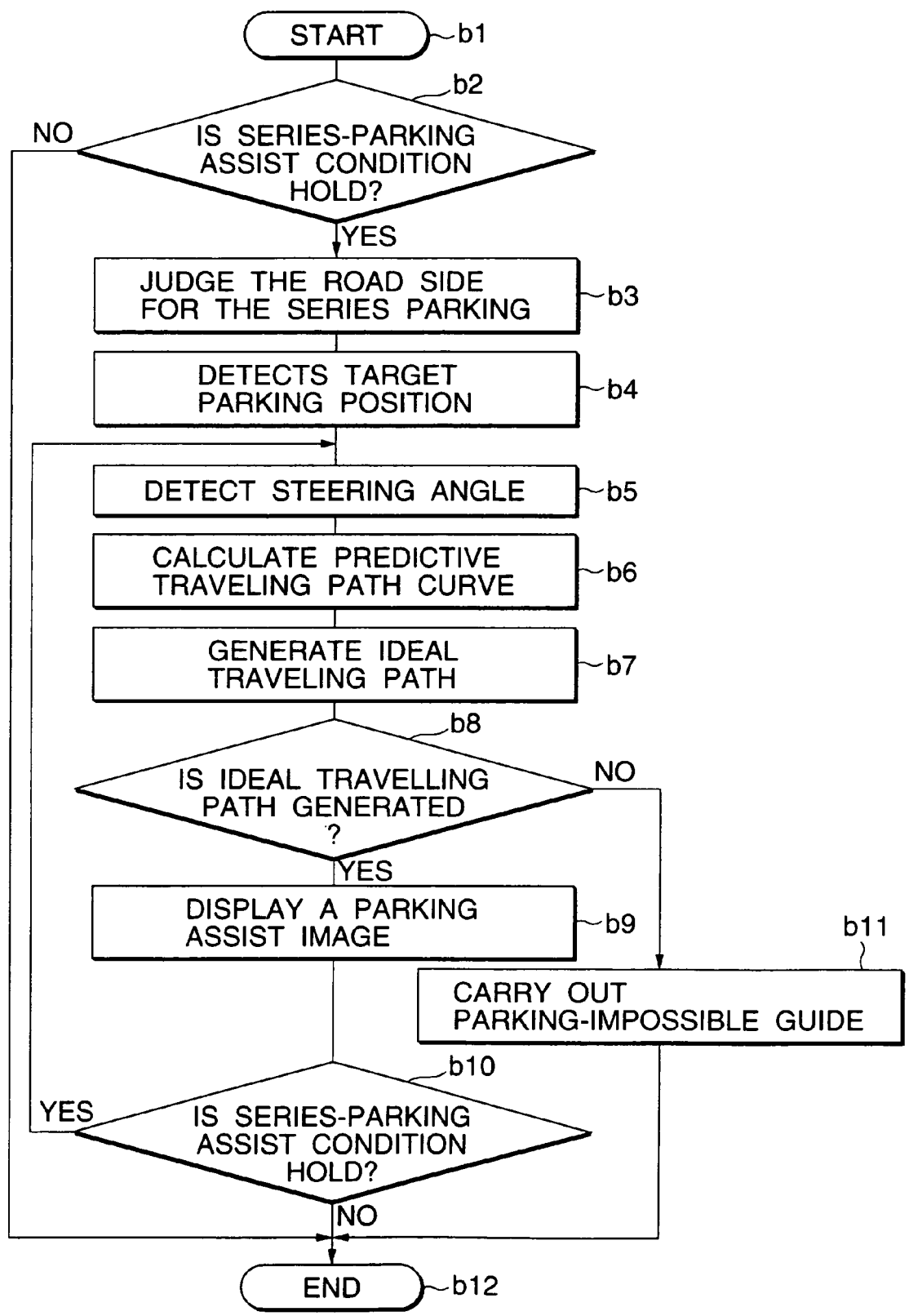
FIG. 57 is a flow chart showing a control procedure by the DSP in the FIG. 56 embodiment.

FIG. 57 is a flow chart showing a control procedure by the DSP in the FIG. 56 embodiment. A procedural sequence from steps b1 to b6 is equivalent to that from the steps a1 to a6 in the FIG. 55 flow chart. A step b7 is executed to generate an ideal traveling path curve 446 for moving the vehicle 401 from the present position of the vehicle 401 to the target parking position 445 detected in the step b4. The ideal traveling path curve 446 is generated on the basis of position data of the target parking position 445 in the parking space 413, which gathered at the present position of the vehicle 401 at the start of the parking, and a minimum turn radius of the vehicle, a speed of the backing vehicle, and the like. A step b8 is executed to check whether or not the generation of the ideal traveling path curve 446 ends. When the generation ends, a step b9 is executed to generate a parking assist image in which the predictive traveling path curve 405 calculated in the step b6 and the ideal traveling path curve 446 generated in the step b7 are overlaid on the backward area image output from the camera unit 410, and to display the parking assist image on the screen of the information display device 404. A step b10, like the step b2, is executed to judge whether or not the series parking assist condition holds. When the condition holds, the control by the DSP returns to the step b5. Subsequently, a procedural sequence of the steps b5 to b10 is repeated.

An ideal traveling path curve 446 based on a steering angle is displayed, if it is within a certain deviation of it from the ideal one, without operating the steering wheel 407 along the ideal traveling path curve 446, and the vehicle may be parked at the target parking position 445. When the step b8 judges that the generation of the ideal traveling path curve 446 does not end yet, a step b11 is executed to display the guide of "parking impossible". When the step b2 or b10 judges that the series parking assist condition does not hold, or when the process of the step b11 ends, a step b12 is executed to end the parking assist operation.

While in each of the above-mentioned embodiments, the camera unit 410 is used for taking a scene of the place behind the vehicle for the series parking, the camera unit 410 may also be used for an out-of-lane monitoring purpose. In this case, the camera unit constantly recognizes the white lines 403 and checks whether the running vehicle is within or out of the traffic lane. If the camera unit 410 is thus used for both the purpose of monitoring the place behind the vehicle for the series parking assist and the purpose of monitoring the out-of-lane of the vehicle, the required number of cameras installed on the vehicle is reduced, leading to cost reduction.

In the vehicle parking assist device, an image of the area existing in the vehicle advancing direction is displayed, and a vehicle predictive traveling path predicted on the basis of a steering angle of the steering wheel and guide lines prolonged from the lines defining the width of the vehicle body are overlaid on the image of the area existing in the vehicle advancing direction, whereby the drive assist is performed. When the vehicle is backed for parking, the guide lines prolonged from the lines defining the width of the vehicle body are overlaid on the image of the backward area. Therefore, the present direction of the vehicle is easily understood. Where white lines are drawn for the parking frame, the vehicle may easily be parked in parallel to the parking frame in a manner that when the white lines are parallel to the guide lines, the steering wheel is returned to the center position.

Where displays of the predictive traveling path and/or guide lines are selectively presented, the drive assist is performed in the display condition best for the driving by the driver.

In the vehicle parking assist device, a brightness of a display of the predictive traveling path and/or guide lines is varied in accordance with a brightness of the environment. The drive assist is performed in an easy-to-see display condition.

In the vehicle drive assist device, the drive assist means varies a color arrangement of a display of the predictive traveling path and/or guide lines in accordance with a color arrangement of the environment. A color arrangement of the display is changed to a color arrangement which is easy for the driver to understand in accordance with a brightness and a color arrangement of the environment, whereby an effective drive assist is carried out.

In the vehicle drive assist device, the vehicle includes a brightness sensor for sensing a brightness of the environment to select an illumination system, and the drive assist means varies a brightness or a color arrangement of a display of the predictive traveling path and/or guide lines in accordance with a brightness sensed by the brightness sensor.

Therefore, a display of the display means may be automatically changed to an easy-to-see display in accordance with a brightness and a color arrangement of the environment.

In the invention, a color arrangement of a display of the predictive traveling path and/or guide lines is varied in accordance with a background color of an image picked up by the camera. With this feature, when the background color is bright, the predictive traveling path curve and the guide lines may be displayed using a dark color. When the background color is dark, the latter displayed may be bright in color. Therefore, an easy-to-understand drive assist may be presented to the driver.

In the invention, the final display condition at the end of the parking assist is stored, and then the display condition is used for the next parking drive.

Therefore, the drive assist may be performed in the display condition suitable for the parking guide without setting anew, by the driver, anew the best display condition every time the drive assist is performed.

An image output from the camera of a wide angle field is distorted. In the invention, said guide lines, when displayed, are curved in accordance with a distortion of the image. Therefore, the guide lines exactly correspond to the lines respectively prolonged from the lines defining the width of the vehicle body, whereby an effective drive assist is formed.

The width of the predictive traveling path curve and the guide lines are not coincident with the width of an actual vehicle body at its bumper and its near portion because of the field angle of the camera has a field angle. Therefore, in the invention, the non-coincident portion is not displayed, and the driving for this portion depends on the driver's judgement, whereby an unnatural display is eliminated.

In the vehicle drive assist device, the drive assist means displays the predictive traveling path and/or guide lines such that the portions thereof near the vehicle are broadened. Therefore, the vehicle width is naturally contiguous to the predictive traveling path and the guide lines in the display. And a safety is secured.

In the invention, a line indicative of a stop position of the vehicle is displayed at a position on the predictive traveling path or the guide lines, which is located near the vehicle. Therefore, the line may be usefully utilized as such a mark that when the moving vehicle frame reaches the stop line, the vehicle is stopped.

In the invention, the guide lines are displayed when the driver operates the brake. In other words, when the braking operation is not performed, the guide lines are not displayed, thereby eliminating a complexity of the drive assist image. Therefore, such a drive assist that when necessary, the guide lines are displayed by the braking operation and the steering wheel is returned to the center position, is effectively performed.

In the invention, the guide lines are displayed by dotted lines, and hence are made unnoticeable. Therefore, the predictive traveling path is easy to see, and the drive assist is performed in an easy-to-understand fashion.

In the invention, a length of the guide lines is varied in accordance with a distance ranging to an obstructive object detected by the obstacle sensor, such as a back sonar. Therefore, the length of the guide line corresponds to the remaining driving distance. A drive feeling resembles an actual driving feeling, and a driver assist which is easy for the driver to understand is provided.

In the invention, the width of the guide lines, when displayed, is wider than the width of the vehicle. Therefore, such a drive assist that when the guide line lies on one side of the parking frame, the driver returns the steering wheel to the center position is readily performed if the width of the guide lines is wider than that of the actual vehicle width.

In the vehicle parking assist devices, an image of a backward area of the vehicle is picked up, and an effective drive assist is performed. When the transmission is set to the reverse gear mode, a display by the display means changes to inform the driver of the transmission being in a reverse gear mode. The display change informs the driver that the transmission is shifted to a reverse gear position, and the vehicle will back, in an easy-to-understand manner. Accordingly, the driver never makes a mistake of the fact that the advancing direction of the vehicle is a backward movement.

In the invention, when an obstructive object is detected by the obstacle sensor such as a back sonar or corner sensors, a display by the display means which displays a backward area image of the vehicle is changed to inform the driver of the presence of the obstructive object in an easy-to-understand manner, thereby preventing the vehicle from touching the obstructive object.

In the invention, the drive assist information is displayed in the form of character telop. Therefore, the driver is reliably informed of the contents of the display.

In the vehicle drive assist device, the drive assist means displays information of the reverse gear position and obstacle detection in the form of a color change of the entire display. The color change of the entire display reliably calls a driver's attention.

In the vehicle parking assist devices, a telop for urging the driver to make a safety check by the eye are displayed on the display for assisting the drive assist by use of an image picked up by the camera. Therefore, driver's attention is attracted to the front and side areas of the vehicle, which are not displayed on the display screen.

When the vehicle backs for parking, the vehicle parking assist device informs the driver of the end of the parking operation while being interconnected in operation with an obstacle sensor, such as a back sonar. Therefore, the driver can readily check the detection result of the obstacle sensor by the display means.

In the invention, when the vehicle is moving backward, a speed of the vehicle is limited to the preset upper limit of the vehicle speed or lower. Therefore, collision of the vehicle when it is moved backward is prevented or shock when the collision occurs is lessened.

In the invention, when the obstacle sensor detects an obstacle such as a back soar, the drive assist means limits a speed of the vehicle to the preset upper limit of the vehicle speed or lower. Therefore, collision of the vehicle when it is moved backward is prevented or shock when the collision occurs is lessened.

When the vehicle is moving backward, the drive assist means changes an illumination direction of a lamp illuminating a backward area of the vehicle, thereby effecting the drive assist. Therefore, when the parking lot is dark at night, the image picked up by the camera is increased in brightness, thereby increasing the visibility.

In the invention, the lamp is optionally attached to the device. Therefore, an appropriate illumination is performed in accordance with a coverage by the camera.

In the vehicle drive assist device, the vehicle is equipped with a car-carried device including a navigation device and/or audio device, and further it comprises select means for causing the display means to selectively display the image from the camera and the image from the drive assist means or the image from the car-carried device. Therefore, the driver selects the drive assist or the utilization of the car-carried device in accordance with his necessity.

In the vehicle parking assist devices, a scene of the area in the advancing direction of the vehicle is picked up by the camera, and a drive assist useful for the parking drive is performed. Particularly, a normal parking mode or a series parking mode may be selected. Therefore, the drive assist suitable for the parking mode may be effectively performed.

The parking mode is automatically changed to a series parking mode when the turning on of a winker lamp or a hazard lamp and the shifting of the transmission to the reverse gear mode are simultaneously performed. A proper drive assist is performed without a manual operation by the driver to change the parking mode change.

In the invention, the drive assist means judges whether a parking position in which the vehicle is to be parked is in a parking lot or on a road, on the basis of the present position of the vehicle derived from the navigation device. When the parking position is in the parking lot, the normal parking mode is automatically selected, and when the parking position is on the road, the series parking mode is automatically selected, whereby a proper drive assist is performed.

Since the normal parking mode or the series parking mode is selected depending on a change of steering angle of the steering wheel for steering the vehicle, the parking mode may be automatically changed to the series parking mode by a special steering operation, such as the reverse turn of the steering wheel, which is used for the series parking.

In the invention, an effective drive assist is carried out by use of images output from a plurality of cameras are disposed such that the photographing areas covered by the cameras are shifted so as to pick up a scene around the vehicle. A display screen of the display means is segmented into plurality of segmental display areas in accordance with the arrangement of the cameras. The images by the plurality of cameras are simultaneously displayed on those segmental display areas. Therefore, the driver may look a plurality of images on the same screen of the display means, whereby an effective drive assist is performed.

In the invention, a display on the screen is changed in accordance with a drive condition. Accordingly, a display of visual information which is easily understood by the driver may be presented through an automatic changing of a screen segmentation such that in the normal running, two images of the front left and front right areas of the vehicle are displayed, and in the backward running, three images of the front left and front right areas, and the backward area are displayed.

Also in the invention, a vehicle is displayed in a simplified form on a display of the images coming from the plurality of cameras. Therefore, a relationship of the vehicle relative to the images from the plurality of cameras is displayed in an easy-to-understand fashion.

In the vehicle drive assist device, a display position of the simplified displayed vehicle is moved according to an image from the camera. Therefore, the driver easily recognizes which camera picked up the image being displayed from the display.

When the vehicle is displayed in a simplified form, the directions and photographing areas covered by the cameras are also displayed. Therefore, the driver easily recognizes which camera picked up the image being displayed from the display.

In the vehicle drive assist device, the images from the plurality of cameras and an image from the car-carried device, such as a navigation device and/or audio device, are displayed on the segmental display areas.

Therefore, the driver may look both the image by each camera and the image by the navigation device or the audio device on the same display screen.

In the invention, the images by the plurality of cameras are changed one to another at predetermined time intervals, to thereby eliminate the manual work of the driver to change the images.

In the invention, the wipe is used for gradually changing the images from the plurality of cameras one to another. Therefore, there is no chance that the image is abruptly changed from one image to another.

In the vehicle drive assist device, a scene of a side area of the vehicle is displayed while being interconnected with an operation of the direction indicator. Therefore, an image taken in the vehicle advancing direction is automatically displayed, whereby the vehicle parking assist device effectively assists the driver to make a safety check.

In the invention, the images are changed one to another in accordance with a steering angle of turn of a steering wheel. Therefore, the image of the area existing in an actual vehicle advancing direction is automatically displayed, and the device assists the driver safely and effectively.

In the invention, the screen segmenting condition is changed in accordance with a steering angle of the steering wheel. Therefore, the image of the area located in the advancing direction is displayed on a wide display screen.

In the invention, when an obstructive object is detected by the obstacle sensor, e.g., a corner sensor, an obstacle sensing direction is displayed. The vehicle parking assist device calls driver's attention to the presence of the obstacle.

An image located in the obstacle sensing direction is displayed, it may be checked on the screen.

In the vehicle drive assist device, when an obstacle is detected, the drive assist means causes the display means to shift a display position of an image output from the camera which picks up the sensing direction of the obstacle sensor, to the center of the screen of the display means or to expand the display.

Therefore, the resultant display reliably attracts the driver's attention to the presence of the obstructive object and its state.

In the invention, an alarm is overlaid on a display of the sensing direction of the obstacle sensor. Therefore, the alarm reliably turns the driver's one's attention to the obstructive object.

In the vehicle drive assist device, when the images of the cameras adjacently disposed are simultaneously displayed, those images are continuously connected together into a single image. With the composed image, the image covering an expanse of area, which is easy for the driver to understand, is provided to the driver, to thereby effect an effective drive assist.

In the vehicle drive assist device, the camera are disposed so as to take he scenes of the front, front left, front right, back left and back right areas of the vehicle. Therefore, the driver can make a safety check on the entire circumferential area around the vehicle.

Further, the image of the entire circumferential area around the vehicle may effectively be used in accordance with an arrangement of the cameras.

Additionally, a necessary image is selected from those output from the cameras disposed around the vehicle, and is displayed in detail.

The images output from the cameras having the photographing areas successively disposed are scrolled into a single image. Therefore, the driver is able to readily check the image of a broad area around the vehicle in a natural fashion.

The driver can change a display condition of a desired image in simple and quick manner by use of the touch panel.

Further, the driver causes the display means to display a desired image for an elongated time in simple and quick manner.

In the vehicle parking assist device, an effective drive assist is performed by use of a camera for picking up a frontward scene of the vehicle. An image of the frontward scene is stored into the storing means, thereby acquiring information for the drive assist. Accordingly, the image by the camera may also be used as traffic congestion information, whereby it may be effectively used for grasping traffic conditions around the vehicle.

Since the frontward image picked up by the camera is displayed by the display means, it may be used for checking the frontward scene. Therefore, use of the single camera reduces the cost when comparing with a case where cameras are respectively provided for picking up the frontward and backward scenes.

In the invention, a vehicle forcibly running into a place in front of a self vehicle is detected by processing the image coming from said camera. Therefore, the camera may be used for detecting such a vehicle, and even if such a vehicle appears, the driver drives the vehicle in safe.

In the vehicle parking assist device, a camera is attached to the top of a vehicle and picks up a scene around a vehicle as viewed from the top of the vehicle. Display means displays the image picked up by the camera. A limit of a vehicle height is detected from the image picked up by the camera. Therefore, the driver can readily check whether or not the vehicle may pass under an elevated bridge, for example.

In the vehicle parking assist device, in accordance with the moving direction of the vehicle, in a backward running, the display means displays more brightly an image of the backward area than an image of the forward area. Therefore, the driver can watch the backward area in detail when backing the vehicle.

In the vehicle parking assist device, an image of the backward area from the camera is displayed reflecting an image on the back mirror. Accordingly, the image of the backward area is displayed in a display mode familiar to the driver. The drive assist is effectively carried out.

In the vehicle drive assist device, the drive assist means modifies a backward area image displayed in the display frame for the back mirrors into an image having a field angle equal to that of the back mirror.

Therefore, the driver looks the backward area image as if he looks the back mirror, whereby an effective drive assist is performed.

When a parking assist is carried out in a state that a predictive traveling path curve, which is calculated depending on a steering angle is overlaid on a display of the image which is picked up in the vehicle advancing direction, and a 3-three dimensional image containing the vehicle height is additionally displayed along the predictive traveling path curve, a display of the 3-dimensional image is changed at a position near an obstructive object detected by the obstacle sensor, from that at other positions. Therefore, it is easy to check a possibility that the vehicle will touch an obstructive object near the traveling path of the vehicle, and a touching position when it touches the obstructive object. Accordingly, the vehicle drive assist device can assist the driver in his driving operation such that the touching of his car with the obstructive object is avoided and the driving operation is easy.

In the invention, the drive assist means displays the 3-dimensional information image in the form of planes each having a predetermined shape which are arrayed at fixed distances along the predictive traveling path curve. Therefore, the driver readily checks from the displayed image a space occupied by the vehicle when it advances and a 3-dimensional touch possibility of the vehicle with an obstructive object existing along the traveling path.

In the invention, the 3-dimensional image containing the vehicle height moves as a plane of a predetermined shape, which represents a height of the vehicle, along the predictive traveling path curve. Therefore, the driver readily may check a possibility that the vehicle will touch an obstructive object located near the predictive traveling path curve and a touching position when it touches the object.

In the invention, a plane of a predetermined shape, which represents a height of the vehicle, is moved along the predictive traveling path curve, and is stopped at a position close to the obstructive object. Therefore, the driver 3-dimensionally may check in detail a possibility of touching of the vehicle with the obstructive object.

In the invention, the drive assist changes a color of the 3-dimensional information image at a position which is close to a position where the obstructive object is detected. Therefore, the driver readily may check, from a change of the color, a possibility that the vehicle will touch an obstructive object located near the predictive traveling path curve and a touching position when it touches the object.

In the invention, a display is presented such that a simulation image of the self vehicle moves in the image picked up by the camera. Therefore, the driver checks a possibility touching of the vehicle with an obstructive object in a simulation manner.

In parking the vehicle, a target parking position is detected, a steering angle necessary for the advancing of the car to the target parking position is calculated, a drive assist for parking is carried out with such a guide that a steering angle is approximate to the calculated one. Since the driver is supported so as to be able to more safely drive the vehicle, the driver can easily park the vehicle into a narrow parking space or a congested parking lot.

When the vehicle, which advances for its parking, cannot advance to a target parking position by a steering operation within a range of steering angles within which the steering wheel may be turned, or when it is judged that the vehicle will touch an obstructive object during its advancing, the driver is given an instruction to reverse an advancing direction of the vehicle. Accordingly, the drive assist can inform the driver of the parking being possible, and the necessity and timing of the reverse turn of the steering wheel. It never happens that the driver tries to advance the vehicle to a parking space which rejects its parking, and causes a trouble of touching of his vehicle with another vehicle. In this respect, the driver can safely drive the vehicle.

In a case that a parking stopper exists in the parking space, it is automatically detected and the driver is informed of the presence of the parking stopper. Therefore, the driver may drive the vehicle for parking while referring to the stopper.

A voice guide makes it for the driver to park the vehicle. In this case, the drive assist is easy to understand since the visual sensation of the driver is not directly utilized.

The drive assist of the invention gives the driver warning of watching vehicle environments, e.g., the front and side of the vehicle, when he parks the vehicle. Therefore, safe drive is ensured by turning his attention to the vehicle environmental conditions.

The drive assist for parking of the invention displays a parking guide image overlaid on the image of an area existing in the advancing direction, which is picked up by the camera. This parking guide display is easy to understand.

In the present invention, the guide lines prolonged from the lines defining the width of the vehicle and distance lines are overlaid on the backward area image, thereby providing a parking assist which is easy for the driver to understand.

The predictive traveling path curve 305 overlaid on the backward area image is adjusted in accordance with a distance to a stop position. Therefore, a path along which the vehicle runs till it parks is displayed in the backward area image such that the driver easily understands the path. Accordingly, the vehicle parking assist device of the invention appropriately assists the driver in his parking.

In the invention, a roof predictive traveling path curve of the self vehicle is displayed overlaid on the backward area image. Even if a portion of the self vehicle which will be a dead space to the driver because of the presence of another vehicle adjacent to the self vehicle, is present in the backward area image, the driver adjusts the predictive traveling path curve so as to avoid colliding of the self vehicle with the roof of the vehicle, and moves back the vehicle for parking, whereby an effective parking assist is performed.

Even if the predictive traveling path curve of the self vehicle is shaded by another vehicle parked in a parking space adjacent to a parking space in which the self vehicle is to be parked in the backward area image, a projective line of the other vehicle to the ground is displayed, and the vehicle parking assist device assists the driver in his parking by use of the predictive traveling path curve and the projective line to the ground. Therefore, even in an area forming a dead space in the image, it is possible to reliably check a positional relationship of the predictive traveling path curve of the self vehicle ranging to the parking space to other vehicles.

The vehicle parking assist device of the invention displays a layout of the self vehicle and other vehicles in the parking areas when viewed from the top by use of a plane model. Therefore, the driver can easily grasp a positional relationship of the self vehicle, a parking space, and other vehicles parked in other parking spaces, and an orientation and moving direction of the self vehicle.

In the vehicle parking assist device, a parking guide by the plane model or a parking guide by the backward area image is selected in use. For example, a parking assist may appropriately be selected according to parking space conditions and the like.

Further, in the vehicle parking assist device of the invention, after the movement of the vehicle is switched from a backward movement to a forward movement, the displaying of a parking assist image of the backward area is continued for a fixed time. Therefore, the driver can easily check the backward area of the vehicle for advancing the vehicle or reversely turning the steering wheel.

The present invention enables the driver to easily make a series parking when he moves back the vehicle and parks it in a space between other two adjacent vehicles parked in row since in such a situation, a predictive traveling path curve based on an steering angle is overlaid on an image of a place behind his vehicle on the screen of an information display device, and the display is added with guide information for a steering operation that is performed at the timing of the steering wheel reverse turn for the series parking.

In the invention, the timing of the steering wheel reverse turn is depicted in the form of a predictive traveling path curve. Accordingly, the driver can easily make a series parking by operating the steering wheel according to a relationship between an oblique line and a parking target.

In the invention, the series parking assist automatically commences by merely performing an operation necessary for the driving operation. Therefore, there is eliminated cumbersome switch operations which otherwise would be unavoidable in the series parking.

In the invention, judgement is made as to whether a place for the series parking is on the right side or the left side of the vehicle on the basis of the combination of lighting conditions of the hazard lamp and/or the winker lamp. Therefore, the series parking assist is automatically performed for a proper side of the road.

In the present invention, the image by the camera may also be used for the lane-off monitoring. Therefore, there is no need of providing cameras respectively for the series parking monitoring and the lane-off monitoring. A single camera may be used for both the purposes, resulting cost reduction.

In the invention, whether or not the series parking is possible is judged before the parking operation starts. If the series parking is impossible, the driver changes the direction of the vehicle traveling path, and will find another parking space.

What is claimed is:

1. A vehicle parking assist device comprising:
    a camera operable to pick up an image of an area around a vehicle;
    a display operable to display the image picked up by the camera; and
    a drive assist unit that automatically selects one of a normal parking mode and a series parking mode, the vehicle drive assist device mounted in the vehicle including a navigation device that determines a position of the vehicle,
    wherein the drive assist unit judges whether the vehicle is parking in a parking lot or on a road based on the position of the vehicle determined by the navigation device, and the drive assist unit selects the normal parking mode when the vehicle is parking in the parking lot or selects the series parking mode when the vehicle is parking on the road;
    wherein when the normal parking mode is selected, the camera is directed to backward of the vehicle so as to pick up an image of a backward area of the vehicle and the display displays the image of the backward area of the vehicle; and
    wherein when the series parking mode is selected, the camera is directed to sideward of the vehicle so as to pick up an image of a side area of the vehicle and the display displays the image of the side area of the vehicle.

2. The vehicle parking assist device according to claim 1,
    wherein the vehicle includes a light for illuminating an area around the vehicle;
    wherein the normal parking mode is selected, the light is directed to the backward of the vehicle to illuminate the backward area of the vehicle; and
    wherein the series parking mode is selected, the light is directed to the sideward of the vehicle to illuminate the side area of the vehicle.

* * * * *